US012562169B1

(12) United States Patent
Nagasubramanian et al.

(10) Patent No.: US 12,562,169 B1
(45) Date of Patent: Feb. 24, 2026

(54) SYSTEMS AND METHODS FOR IMPROVED MACHINE LEARNING-BASED INBOUND CALL MONITORING AND RESPONSE GENERATION

(71) Applicant: U.S. Bancorp, National Association, Minneapolis, MN (US)

(72) Inventors: Dhivya Nagasubramanian, Plymouth, MN (US); Monika Bartulovic, Minneapolis, MN (US); Katja Jeanneret, Chanhassen, MN (US); Andrea LeMaster, Forest Lake, MN (US); Nishanthini Ontivillu, Eagan, MN (US); Anitha Perumalla, Cottage Grove, MN (US)

(73) Assignee: U.S. BANCORP, NATIONAL ASSOCIATION, Minneapolis, MN (US)

( * ) Notice: Subject to any disclaimer, the term of this patent is extended or adjusted under 35 U.S.C. 154(b) by 0 days.

(21) Appl. No.: 19/330,670

(22) Filed: Sep. 16, 2025

(51) Int. Cl.
| | |
|---|---|
| *G10L 15/22* | (2006.01) |
| *G10L 15/02* | (2006.01) |
| *G10L 15/04* | (2013.01) |
| *G10L 15/26* | (2006.01) |
| *G10L 15/30* | (2013.01) |

(52) U.S. Cl.
CPC ............. *G10L 15/22* (2013.01); *G10L 15/02* (2013.01); *G10L 15/04* (2013.01); *G10L 15/26* (2013.01); *G10L 15/30* (2013.01)

(58) Field of Classification Search
CPC ......... G10L 15/22; G10L 15/02; G10L 15/04; G10L 15/30
See application file for complete search history.

(56) References Cited

U.S. PATENT DOCUMENTS

| | | | | | |
|---|---|---|---|---|---|
| 2004/0230637 | A1* | 11/2004 | Lecoueche | ........ | H04M 1/72445 |
| | | | | | 709/200 |
| 2005/0091059 | A1* | 4/2005 | Lecoeuche | ........ | H04M 1/72445 |
| | | | | | 704/270.1 |
| 2005/0203747 | A1* | 9/2005 | Lecoeuche | .............. | G06F 16/36 |
| | | | | | 704/270.1 |

(Continued)

*Primary Examiner* — Michael N Opsasnick
(74) *Attorney, Agent, or Firm* — FOLEY & LARDNER LLP

(57) ABSTRACT

Systems and methods for automated machine learning-based inbound call monitoring and structured response generation are disclosed. A server receives audio data of an inbound call and executes an acoustic feature extraction model to generate acoustic features for frames of the audio data. An audio transcription model generates a transcript segmented by speaker. The system identifies a plurality of question strings from a data repository, queries a mapping data structure to select a machine learning classification model or large language model for each question, and segments acoustic features and transcript text for each question string. The selected model is executed for each question string using the segmented data to generate a response. The system generates, in memory, a structured response object comprising the generated responses to the question strings. This approach enables efficient, transparent, and auditable quality assessment of voice interactions, supporting both deterministic and probabilistic analysis engines.

23 Claims, 16 Drawing Sheets

(56) References Cited

U.S. PATENT DOCUMENTS

| 2014/0067375 | A1* | 3/2014 | Wooters | G06F 40/35 |
| | | | | 704/9 |
| 2015/0025887 | A1* | 1/2015 | Sidi | G10L 17/02 |
| | | | | 704/245 |
| 2016/0217793 | A1* | 7/2016 | Gorodetski | G10L 17/04 |
| 2018/0137854 | A1* | 5/2018 | Perez | G06F 40/35 |
| 2018/0158464 | A1* | 6/2018 | Sidi | G10L 17/06 |
| 2021/0287661 | A1* | 9/2021 | Sharma | G10L 13/033 |
| 2022/0399006 | A1* | 12/2022 | Jin | G06N 3/0442 |
| 2023/0008613 | A1* | 1/2023 | Do | G10L 15/26 |
| 2024/0028838 | A1* | 1/2024 | Compton | G06F 40/40 |
| 2024/0119932 | A1* | 4/2024 | Khorshid | G06Q 50/01 |
| 2024/0347064 | A1* | 10/2024 | Li | G06N 3/045 |

* cited by examiner

200

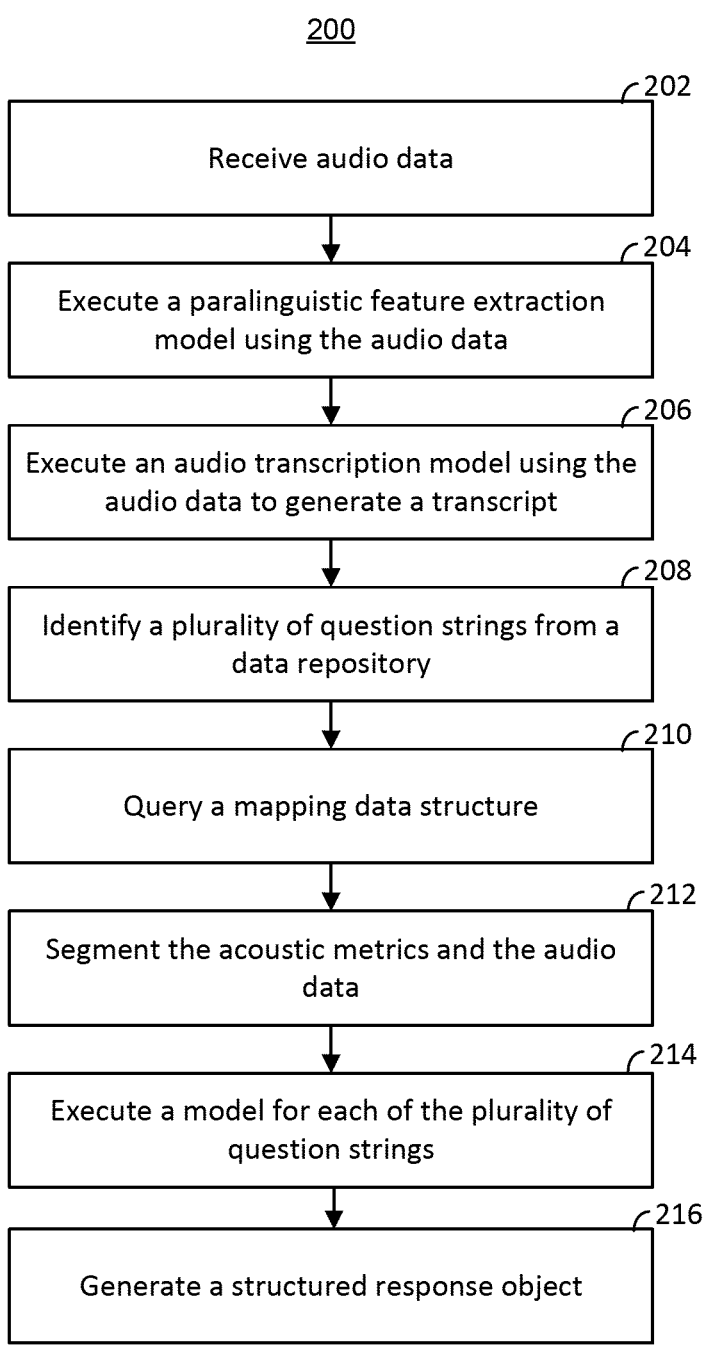

202

Receive audio data

204

Execute a paralinguistic feature extraction model using the audio data

206

Execute an audio transcription model using the audio data to generate a transcript

208

Identify a plurality of question strings from a data repository

210

Query a mapping data structure

212

Segment the acoustic metrics and the audio data

214

Execute a model for each of the plurality of question strings

216

Generate a structured response object

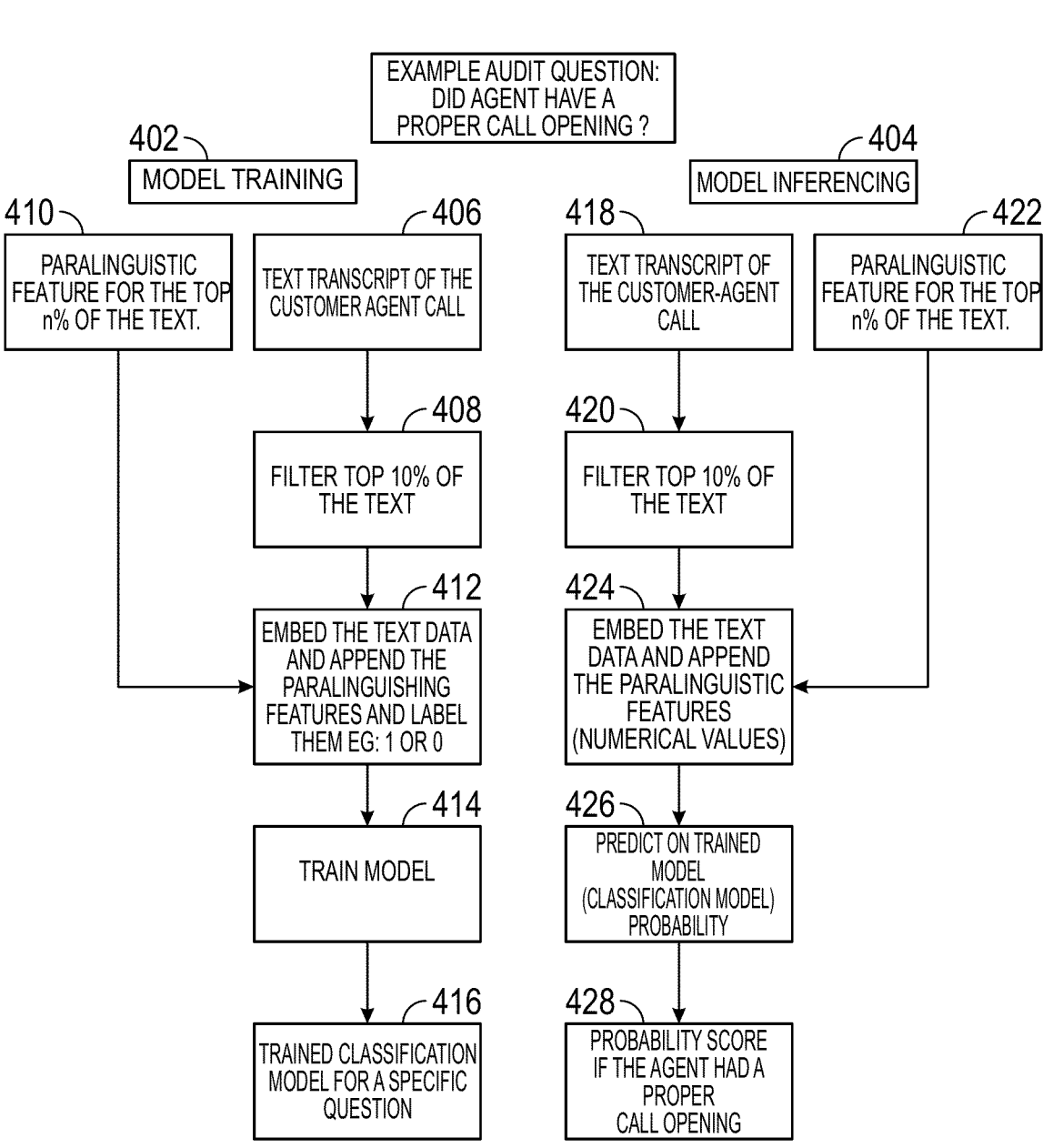

EXAMPLE AUDIT QUESTION:
DID AGENT HAVE A
PROPER CALL OPENING ?

402 MODEL TRAINING

404 MODEL INFERENCING

410 PARALINGUISTIC FEATURE FOR THE TOP n% OF THE TEXT.

406 TEXT TRANSCRIPT OF THE CUSTOMER AGENT CALL

418 TEXT TRANSCRIPT OF THE CUSTOMER-AGENT CALL

422 PARALINGUISTIC FEATURE FOR THE TOP n% OF THE TEXT.

408 FILTER TOP 10% OF THE TEXT

420 FILTER TOP 10% OF THE TEXT

412 EMBED THE TEXT DATA AND APPEND THE PARALINGUISHING FEATURES AND LABEL THEM EG: 1 OR 0

424 EMBED THE TEXT DATA AND APPEND THE PARALINGUISTIC FEATURES (NUMERICAL VALUES)

414 TRAIN MODEL

426 PREDICT ON TRAINED MODEL (CLASSIFICATION MODEL) PROBABILITY

416 TRAINED CLASSIFICATION MODEL FOR A SPECIFIC QUESTION

428 PROBABILITY SCORE IF THE AGENT HAD A PROPER CALL OPENING

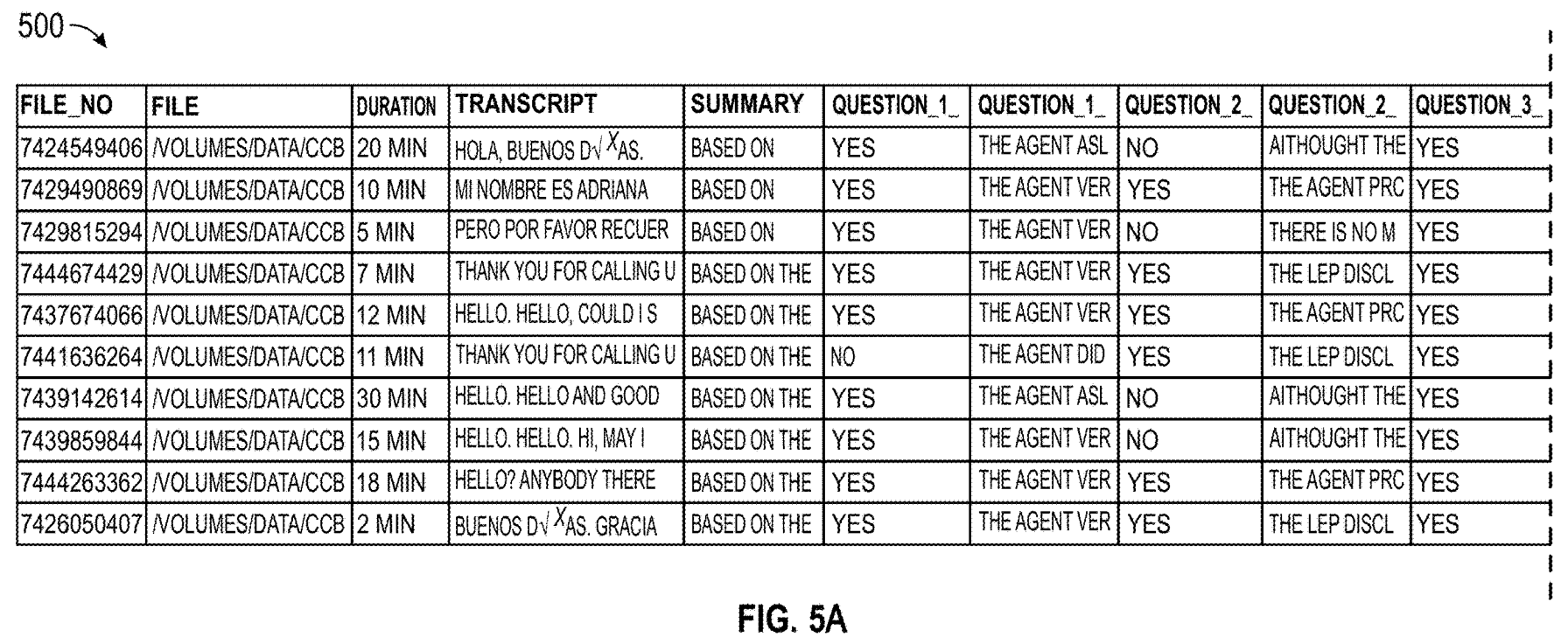

| FILE_NO | FILE | DURATION | TRANSCRIPT | SUMMARY | QUESTION_1_ | QUESTION_1_ | QUESTION_2_ | QUESTION_2_ | QUESTION_3_ |
|---|---|---|---|---|---|---|---|---|---|
| 7424549406 | /VOLUMES/DATA/CCB | 20 MIN | HOLA, BUENOS D√ˣAS. | BASED ON | YES | THE AGENT ASL | NO | ALTHOUGHT THE | YES |
| 7429490869 | /VOLUMES/DATA/CCB | 10 MIN | MI NOMBRE ES ADRIANA | BASED ON | YES | THE AGENT VER | YES | THE AGENT PRC | YES |
| 7429815294 | /VOLUMES/DATA/CCB | 5 MIN | PERO POR FAVOR RECUER | BASED ON | YES | THE AGENT VER | NO | THERE IS NO M | YES |
| 7444674429 | /VOLUMES/DATA/CCB | 7 MIN | THANK YOU FOR CALLING U | BASED ON THE | YES | THE AGENT VER | YES | THE LEP DISCL | YES |
| 7437674066 | /VOLUMES/DATA/CCB | 12 MIN | HELLO. HELLO, COULD I S | BASED ON THE | YES | THE AGENT VER | YES | THE AGENT PRC | YES |
| 7441636264 | /VOLUMES/DATA/CCB | 11 MIN | THANK YOU FOR CALLING U | BASED ON THE | NO | THE AGENT DID | YES | THE LEP DISCL | YES |
| 7439142614 | /VOLUMES/DATA/CCB | 30 MIN | HELLO. HELLO AND GOOD | BASED ON THE | YES | THE AGENT ASL | NO | ALTHOUGHT THE | YES |
| 7439859844 | /VOLUMES/DATA/CCB | 15 MIN | HELLO. HELLO. HI, MAY I | BASED ON THE | YES | THE AGENT VER | NO | ALTHOUGHT THE | YES |
| 7444263362 | /VOLUMES/DATA/CCB | 18 MIN | HELLO? ANYBODY THERE | BASED ON THE | YES | THE AGENT VER | YES | THE AGENT PRC | YES |
| 7426050407 | /VOLUMES/DATA/CCB | 2 MIN | BUENOS D√ˣAS. GRACIA | BASED ON THE | YES | THE AGENT VER | YES | THE LEP DISCL | YES |

FIG. 5A

Figure 5B:
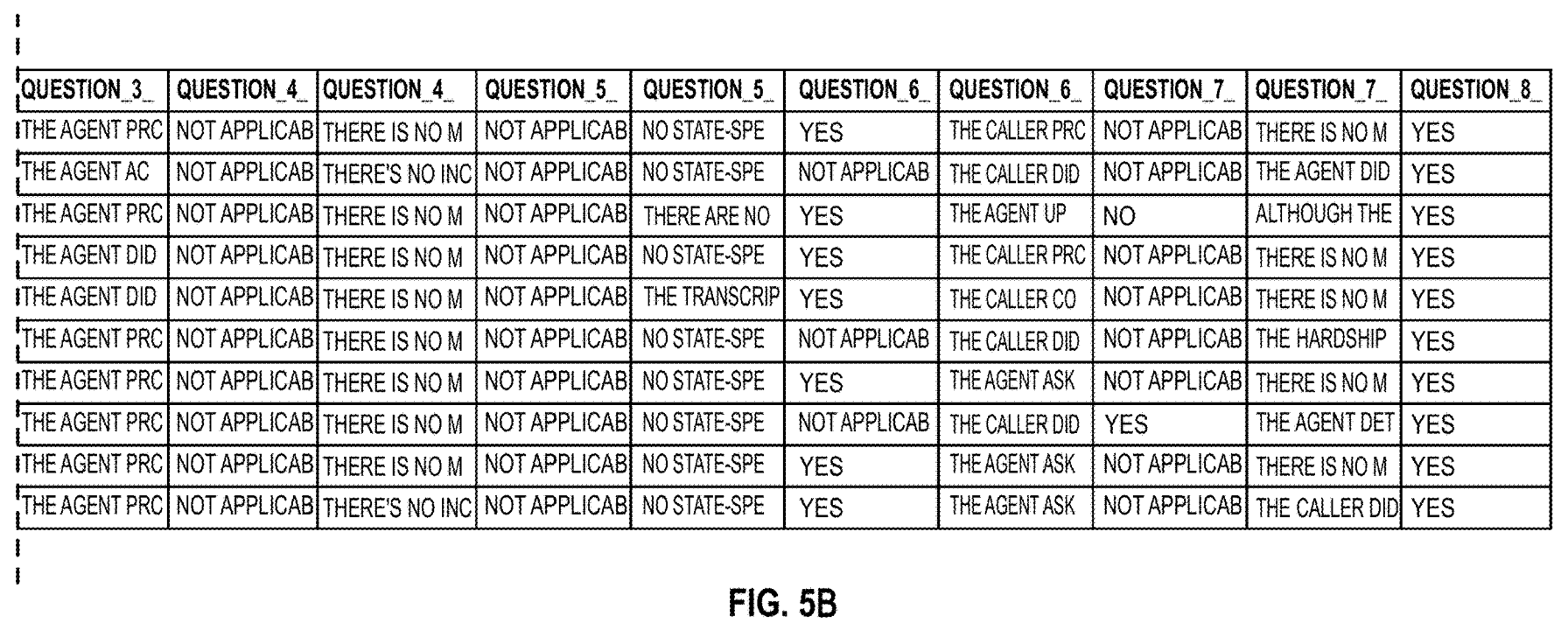

| QUESTION_3 | QUESTION_4 | QUESTION_4 | QUESTION_5 | QUESTION_5 | QUESTION_6 | QUESTION_6 | QUESTION_7 | QUESTION_7 | QUESTION_8 |
|---|---|---|---|---|---|---|---|---|---|
| THE AGENT PRC | NOT APPLICAB | THERE IS NO M | NOT APPLICAB | NO STATE-SPE | YES | THE CALLER PRC | NOT APPLICAB | THERE IS NO M | YES |
| THE AGENT AC | NOT APPLICAB | THERE'S NO INC | NOT APPLICAB | NO STATE-SPE | NOT APPLICAB | THE CALLER DID | NOT APPLICAB | THE AGENT DID | YES |
| THE AGENT PRC | NOT APPLICAB | THERE IS NO M | NOT APPLICAB | THERE ARE NO | YES | THE AGENT UP | NO | ALTHOUGH THE | YES |
| THE AGENT DID | NOT APPLICAB | THERE IS NO M | NOT APPLICAB | NO STATE-SPE | YES | THE CALLER PRC | NOT APPLICAB | THERE IS NO M | YES |
| THE AGENT PRC | NOT APPLICAB | THERE IS NO M | NOT APPLICAB | THE TRANSCRIP | YES | THE CALLER CO | NOT APPLICAB | THERE IS NO M | YES |
| THE AGENT PRC | NOT APPLICAB | THERE IS NO M | NOT APPLICAB | NO STATE-SPE | NOT APPLICAB | THE CALLER DID | NOT APPLICAB | THE HARDSHIP | YES |
| THE AGENT PRC | NOT APPLICAB | THERE IS NO M | NOT APPLICAB | NO STATE-SPE | YES | THE AGENT ASK | NOT APPLICAB | THERE IS NO M | YES |
| THE AGENT PRC | NOT APPLICAB | THERE IS NO M | NOT APPLICAB | NO STATE-SPE | NOT APPLICAB | THE CALLER DID | YES | THE AGENT DET | YES |
| THE AGENT PRC | NOT APPLICAB | THERE IS NO M | NOT APPLICAB | NO STATE-SPE | YES | THE AGENT ASK | NOT APPLICAB | THERE IS NO M | YES |
| THE AGENT PRC | NOT APPLICAB | THERE'S NO INC | NOT APPLICAB | NO STATE-SPE | YES | THE AGENT ASK | NOT APPLICAB | THE CALLER DID | YES |

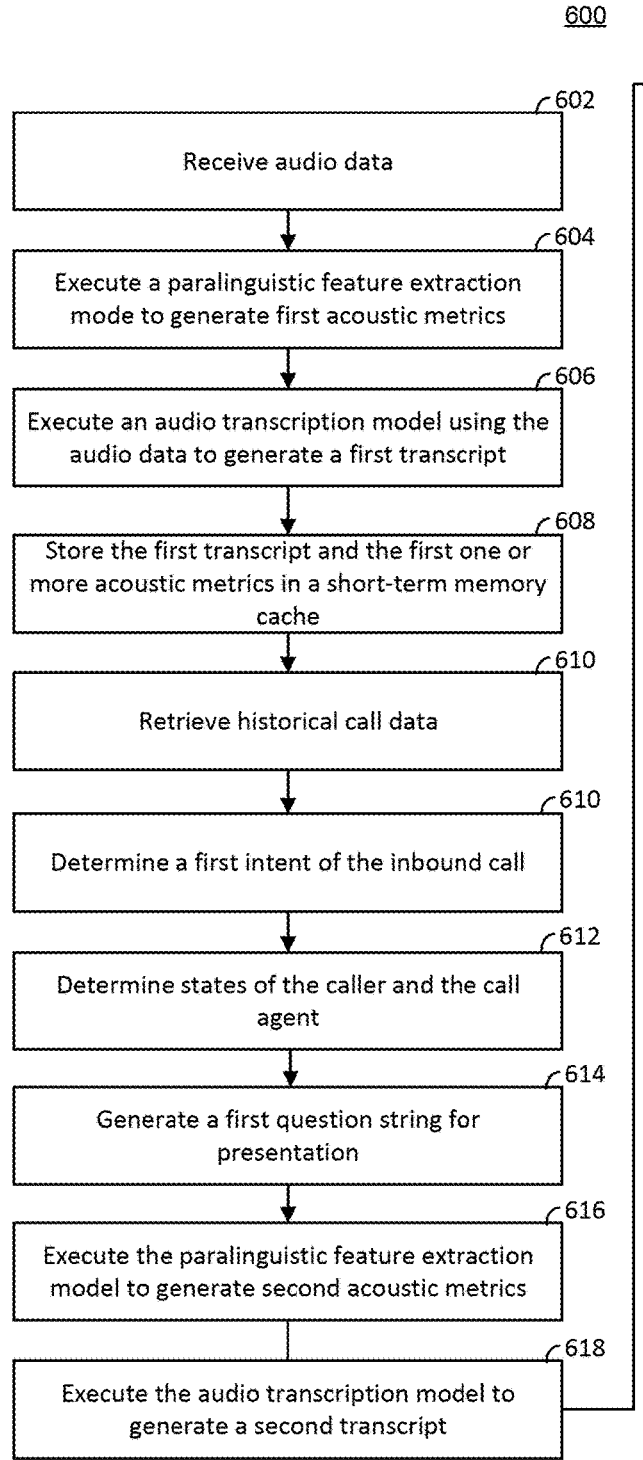

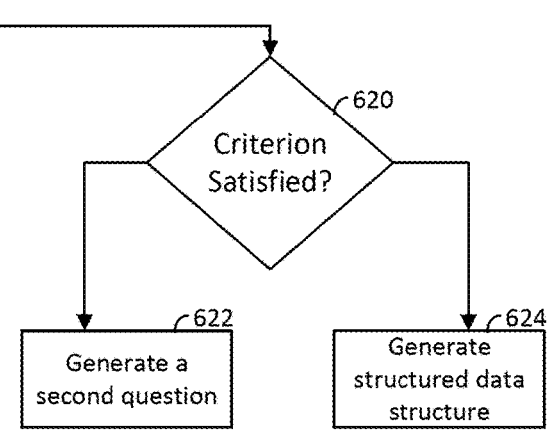

602

Receive audio data

604

Execute a paralinguistic feature extraction mode to generate first acoustic metrics

606

Execute an audio transcription model using the audio data to generate a first transcript

608

Store the first transcript and the first one or more acoustic metrics in a short-term memory cache

610

Retrieve historical call data

610

Determine a first intent of the inbound call

612

Determine states of the caller and the call agent

614

Generate a first question string for presentation

616

Execute the paralinguistic feature extraction model to generate second acoustic metrics

618

Execute the audio transcription model to generate a second transcript

620

Criterion Satisfied?

622

Generate a second question

624

Generate structured data structure

Figure 8:
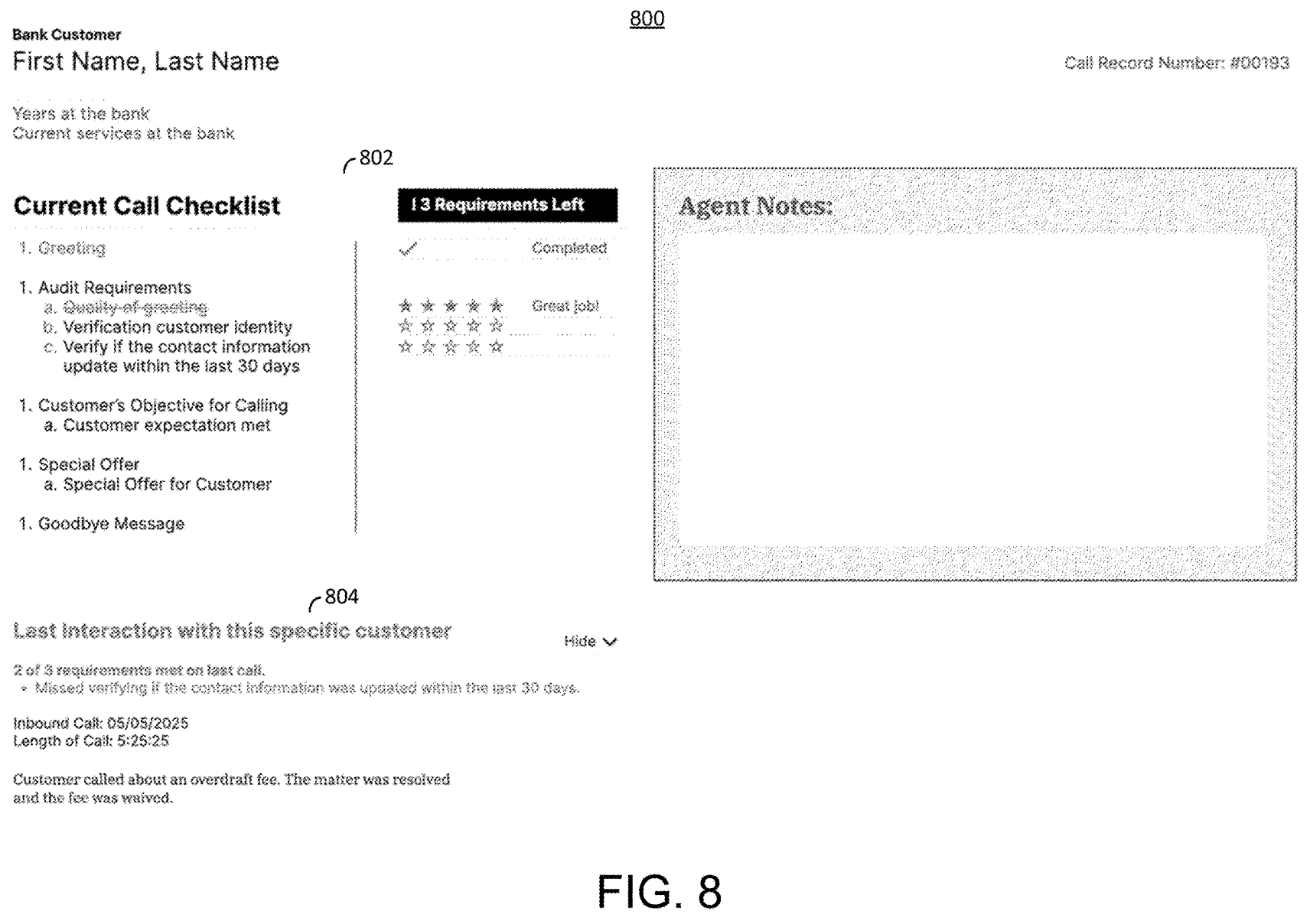

Call Record Number: #00193

Bank Customer
First Name, Last Name

Years at the bank
Current services at the bank

Current Call Checklist                    802

| 3 Requirements Left

1. Greeting                              ✓        Completed

1. Audit Requirements                    ★ ★ ★ ★ ★    Great job!
   a. Quality of greeting                ☆ ☆ ☆ ☆ ☆
   b. Verification customer identity     ☆ ☆ ☆ ☆ ☆
   c. Verify if the contact information
      update within the last 30 days 1. Customer's Objective for Calling
   a. Customer expectation met 1. Special Offer
   a. Special Offer for Customer 1. Goodbye Message Agent Notes:

Last interaction with this specific customer              Hide ∨        804

2 of 3 requirements met on last call.
• Missed verifying if the contact information was updated within the last 30 days.

Inbound Call: 05/05/2025
Length of Call: 5:25:25

Customer called about an overdraft fee. The matter was resolved
and the fee was waived.

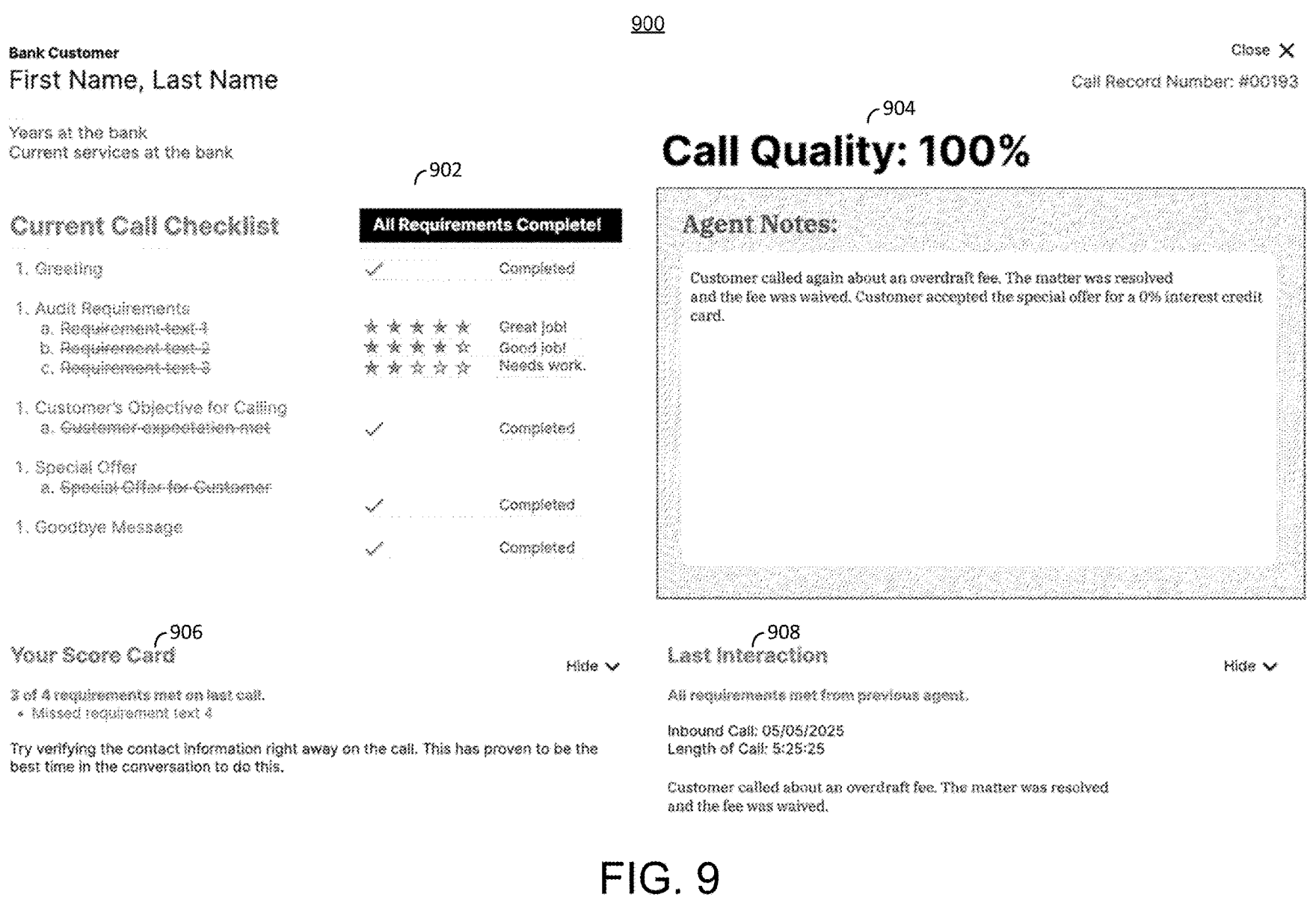

Bank Customer

First Name, Last Name

Years at the bank
Current services at the bank

Current Call Checklist — 902

1. Greeting                                          ✓ Completed

1. Audit Requirements
   a. ~~Requirement text 1~~          ★ ★ ★ ★ ★   Great job!
   b. ~~Requirement text 2~~          ★ ★ ★ ★ ☆   Good job!
   c. ~~Requirement text 3~~          ★ ★ ★ ☆ ☆   Needs work.

1. Customer's Objective for Calling
   a. ~~Customer objective not met~~            ✓ Completed 1. Special Offer
   a. ~~Special offer for Customer~~            ✓ Completed 1. Goodbye Message                                   ✓ Completed

Your Score Card — 906                            Hide ⌄

3 of 4 requirements met on last call.
• Missed requirement text 3

Try verifying the contact information right away on the call. This has proven to be the best time in the conversation to do this.

Call Quality: 100% — 904

Agent Notes:

Customer called again about an overdraft fee. The matter was resolved and the fee was waived. Customer accepted the special offer for a 0% interest credit card.

Hide ⌄

Last Interaction — 908

All requirements met from previous agent.

Inbound Call: 05/05/2025
Length of Call: 5:25:25

Customer called about an overdraft fee. The matter was resolved and the fee was waived.

FIG. 9

Close ✕

Call Record Number: #60193

1000

Your Dashboard
First Name, Last Name 1,310 Points

Great Job! Your average call quality is 90%.

—1002

Here is what you do well: —1004

- You're greeting is warm and welcoming.
- You do a good job at verification of customer.

★ ★ ★ ★ ★ Great job!
★ ★ ★ ★ ☆ Good job!

Here is where you can level up: —1006

- Remember to confirm the customer information in the first 30 seconds of the call. This ensures the user information is update and the flow of the conversation Call History Scores
Click can over to view full history

—1002

Table Filter ⌄

| Date | Time | Overall Score | Missed Call Reminders | Here is what you do well | What did you do well |
|------|------|---------------|----------------------|--------------------------|----------------------|
| 05/05/25 | 8:00 AM | ★ ★ ★ ★ ★ | 0 Missed | The call was quick and your tone was pleasant... | N/A |
| 05/05/25 | 8:38 AM | ★ ★ ★ ★ ★ | 0 Missed | Your tone was pleasant. The customer accepted... | The call ran over 20 minutes, try to... |
| 05/05/25 | 9:02 AM | ★ ★ ★ ★ ★ | 0 Missed | The call was quick and your tone was pleasant... | The call ran over 20 minutes, try to... |
| 05/05/25 | 9:16 AM | ★ ★ ★ ★ ★ | 0 Missed | The call was quick and your tone was pleasant... | N/A |
| 05/05/25 | 9:33 AM | ★ ★ ★ ★ ★ | 0 Missed | Your tone was pleasant. The customer accepted... | The call ran over 20 minutes, try to... |
| 05/05/25 | 9:51 AM | ★ ★ ★ ★ ★ | 0 Missed | The call was quick and your tone was pleasant... | The call ran over 20 minutes, try to... |
| 05/05/25 | 10:02 AM | ★ ★ ★ ★ ★ | 0 Missed | The call was quick and your tone was pleasant... | N/A |
| 05/05/25 | 10:36 AM | ★ ★ ★ ★ ★ | 0 Missed | Your tone was pleasant. The customer accepted... | The call ran over 20 minutes, try to... |
| 05/05/25 | 11:30 AM | ★ ★ ★ ★ ☆ | 1 Missed | Your tone was pleasant. The customer accepted... | The call ran over 20 minutes, try to... |
| 05/05/25 | 12:03 PM | ★ ★ ★ ★ ☆ | 1 Missed | Your tone was pleasant. The customer accepted... | The call ran over 20 minutes, try to... |

Page 1 of 30 « ‹ › »

Computing Environment 1400

Computer 1410

Processor(s) 1412

Memory 1414

Instructions 1416

Interfaces 1418

Network 1490

SYSTEMS AND METHODS FOR IMPROVED MACHINE LEARNING-BASED INBOUND CALL MONITORING AND RESPONSE GENERATION

BACKGROUND

Machine learning models are increasingly used to analyze voice-based communications in various technical environments. Processing voice data can present challenges due to variability in speech patterns, background noise, and differences in language or accent. Moreover, accurately evaluating and interpreting large volumes of voice interactions using machine learning models is technically complex and resource intensive.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 is a flowchart illustrating a process for improved machine learning-based inbound call monitoring and structured response generation, in accordance with one or more implementations;

FIG. 4 is a flowchart illustrating the process for training and evaluating a classification model to monitor call agent performance on specific questions, in accordance with one or more implementations;

FIGS. 5A and 5B is a diagram of the user interface or output for an inbound call support system, in accordance with one or more implementations;

FIG. 6 is a flowchart illustrating a method for real-time call analytics and call agent assistance, in accordance with one or more implementations;

FIG. 8 is a diagram of the user interface to view a video on the area of improvement for a call agent, in accordance with one or more implementations;

FIG. 9 is a diagram of a user interface displaying a detailed summary of a call monitor including checklist completion, call quality, call agent notes, score card, and/or last interaction details, in accordance with one or more implementations;

FIG. 10 is a diagram of a user interface displaying a call agent's call quality dashboard and call history scores, in accordance with one or more implementations;

FIG. 15 illustrates an example machine learning framework that techniques described herein may benefit from.

DETAILED DESCRIPTION

Figure 1:
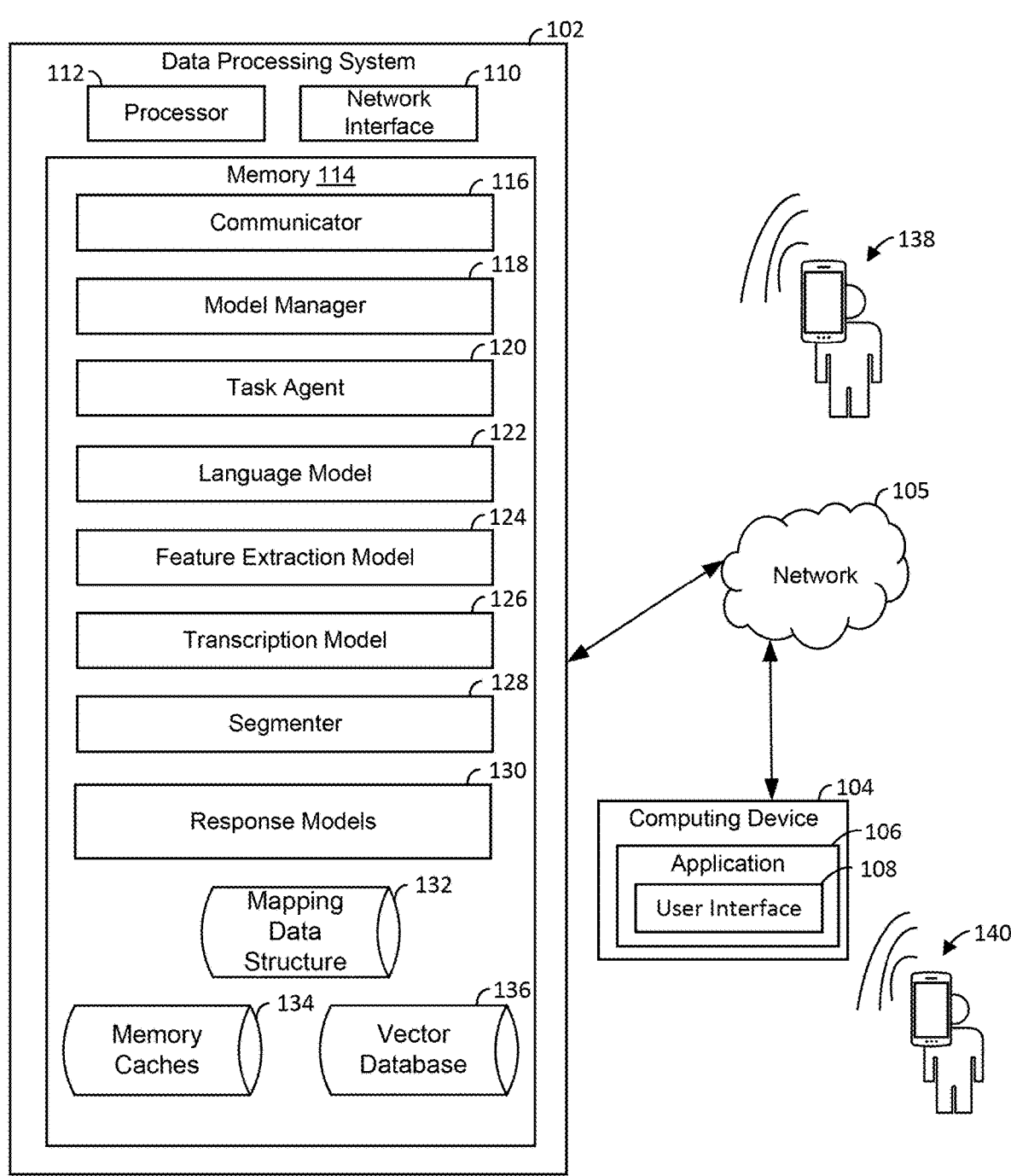
FIG. 1 is a block diagram illustrating components of a data processing system for improved machine learning-based inbound call monitoring and structured response generation, in accordance with one or more implementations.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

The present disclosure relates to techniques for machine learning-based processing of communications in the context of voice interactions. Institutions can record and store large volumes of audio data generated from customer service calls. Such audio data can be processed using machine learning models and other computational tools to extract information relevant to quality assurance, regulatory compliance, and operational performance. In a typical environment, institutions can maintain repositories of recorded calls and can employ various data processing systems to analyze these recordings.

Conventional approaches to processing recorded voice interactions can encounter several technical challenges. Review of audio recordings can be computer memory resource intensive and can introduce inconsistency due to improper model training and/or the sheer computing power that is required to process audio data. The scale of call volumes can make it infeasible to process more than a small subset of interactions given the time and memory resources that can be required to process audio. For example, processing audio data using machine learning techniques can require significant computational resources due to the high dimensionality and temporal nature of audio signals. Machine learning models can be sensitive to variations in speaker accent, background noise, or recording quality, which can degrade the accuracy of feature extraction or transcription. In some implementations, the need to segment, align, and annotate large volumes of audio data can introduce additional complexity to the training and inference workflows.

A system implementing the techniques described herein can address these challenges by providing a machine learning architecture for both post-call and real-time analysis of voice interactions. By implementing the techniques described herein, the system can enable voice interaction processing by applying a multi-stage processing pipeline to recorded or live audio data. For post-call analysis, the system, can route question text strings to different analysis engines using a configurable mapping, such that each question can be processed using the computational approach that uses the least computational resources, generates answers with the least latency, and/or that generates the most contextual answer. For real-time analysis of voice interactions, the system can use a combination of a short-term memory cache and a long-term memory cache to iteratively generate questions for a call agent to ask over the course of the call to obtain the voice data required to satisfy various criteria.

These approaches can improve voice interaction processing by reducing the computational resources needed and incurred latency for the processing using model selection techniques, reduce the memory that is required using selective memory storage, and improve the context of the answers to the questions using the appropriate model and data.

For example, a data processing system implementing the systems and methods described herein can use a computer model routing pipeline for post-inbound call question processing. To do so, the data processing system can receive audio data of a voice interaction (e.g., between a caller and a call agent) and execute a feature extraction model to generate acoustic features, such as pitch, intensity, speech rate, spectral flux, energy, pause duration, jitter, shimmer, and/or prosodic contours for each frame (e.g., defined time periods) of the audio data. The data processing system can further execute a transcription model to generate a time-stamped transcript of the utterances. The task agent can identify a plurality of question strings from a data repository, each mapped to a question identifier. The task agent can query the mapping data structure to determine, for each question, which analysis engine to invoke. For example, the mapping data structure can specify that a particular question is to be processed by a rule-based engine, a machine learning classifier, a large language model, or an agentic-AI subagent. The task agent can segment the transcript and the acoustic features according to the requirements of the selected analysis engine.

In some implementations, the rule-based engine (e.g., criteria-based model) can apply Boolean logic or pattern matching to identify the presence of required keywords or phrases in the transcript for simple questions, such as determining whether a language disclosure was provided when the language of communication is not English. For other questions, the task agent can invoke a machine learning classifier that has been trained on labeled examples to evaluate soft-skill behaviors, such as whether the call agent demonstrated empathy or performed a proper call opening. The classifier can ingest both text embeddings generated from relevant transcript segments and acoustic features extracted from the corresponding audio frames. For more nuanced questions, the task agent can prompt the large language model with the transcript segment and relevant policy excerpts to generate a structured response that includes a binary answer and explicit reasoning. For questions requiring validation against a system of record, the agentic-AI subagent can orchestrate transcript analysis, personally identifiable information extraction, source validation via authenticated application programming interface calls, compliance evaluation, and feedback generation.

The use of a described computer model routing pipeline can provide technical improvements over conventional post-call processing systems. The mapping data structure can externalize the routing logic, allowing for instant updates to criteria or analysis strategies without requiring changes to application code. The integration of acoustic features with textual analysis can increase the accuracy and consistency of processing outcomes by enabling the analysis engines to consider both acoustic and semantic information. The structured and immutable logging of every decision, including metadata such as question identifier, processing type, model or policy version, timestamps, and supporting data references, can facilitate traceability and reproducibility of processing results. The architecture can dynamically allocate computational resources by routing each question to the analysis engine that is most appropriate for the question type, thereby optimizing infrastructure cost and reducing processing latency.

In another example, a data processing system implementing the systems and methods described herein can process audio data of voice interaction in real-time to determine whether criteria (e.g., auditing or processing criteria) are satisfied from the voice interaction. To do so, the data processing system can receive audio data of an inbound call between a caller and a call agent (e.g., a person or a machine learning agent configured for speech processing and generation over an automated a call), where the call agent accesses a computing device during the inbound call. The data processing system can execute an acoustic feature extraction model using the audio data to generate, for a first time period of the inbound call, first one or more acoustic features selected from as pitch, intensity, speech rate, energy, spectral flux, pause duration, jitter, shimmer, or prosodic contours from the audio data of the inbound call. The data processing system can execute an audio transcription model using the audio data to generate a first transcript of utterances from the first time period of the audio data of the inbound call. The data processing system can store the first transcript of the audio data and the first one or more acoustic features from the first time period in a short-term memory cache. The data processing system can retrieve, using an identifier of the caller to query a long-term memory cache, historical call data generated from historical inbound calls by the caller. The data processing system can determine a first intent of the inbound call based on the first transcript generated from the inbound call. The data processing system can determine states (e.g., emotions) of the caller and the call agent based on the first one or more acoustic features.

The data processing system can generate a first question string for presentation at the computing device accessed by the call agent based on the historical call data, the intent of the inbound call, and the states of the caller and the call agent. To do so, the data processing system can identify a set of candidate question strings by querying a data repository containing processing or compliance questions mapped to specific call scenarios. The data processing system can evaluate the historical call data to determine whether particular criteria or objectives have been previously addressed or remain outstanding for the caller. The data processing system can select one or more candidate question strings by matching the determined intent of the inbound call to predefined intent categories associated with each question string. The data processing system can further refine the selection of the first question string by analyzing the states of the caller and the call agent, such that the selected question string corresponds to a question type, phrasing, or sequence that is contextually appropriate for the current emotional or conversational state. In some implementations, the data processing system can apply a rule-based or model-driven scoring function to rank the candidate question strings and select the highest-ranked question string for presentation at the client device. The data processing system can transmit the question to the computing device of the call agent, and the call agent can ask the question over the established call line.

The data processing system can execute the acoustic feature extraction model using the audio data to generate, for a second time period of the inbound call subsequent to the first time period, second one or more acoustic features from the audio data of the inbound call. The second time period can include the time in which the call agent asked the question presented on the call agent's computing device. The data processing system can execute the audio transcription model using the audio data to generate a second transcript of utterances from the second time period of the audio data of the inbound call. The data processing system can identify an answer to the first question string from the second time period. The data processing system can, responsive to determining that the answer to the first question string does not satisfy a criterion, generate a second question string for presentation at the computing device in place of the first question string using the second transcript, the second one or more acoustic features, and the answer to the first question string. The data processing system can iteratively repeat this process of generating questions using the different computer models until determining the criterion is met, at which point the data processing system can generate a record or flag indicating the criterion has been satisfied.

The described real-time call analysis system can provide technical improvements over conventional real-time call monitoring systems. The use of a multi-layered architecture can enable continuous processing of live audio data and incremental transcription, which can allow for immediate analysis of conversation segments as the call progresses. The coordination of multiple agent modules, including an intent and emotion detection agent, a personally identifiable information extraction agent, a source validation agent, and/or a compliance verification agent, can allow the real-time call analysis system to synthesize information from live transcripts, acoustic features, and historical records. The use of both short-term and long-term memory components can provide contextual awareness and enable the agent modules to reference historical data during live analysis. The real-time call analysis system can dynamically generate actionable feedback and compliance guidance for a call agent during an active call session, and can update a user interface with recommended questions, compliance reminders, or coaching prompts based on detected intent, emotional state, or compliance status. The real-time call analysis system can log all actions and decisions with associated metadata, including timestamps, agent module identifiers, and supporting data references, which can facilitate traceability and processing of real-time decisions. The architecture can further generate a structured feedback report at the conclusion of a call, including compliance adherence, intent and emotion summaries, and coaching points, which can be integrated with post-call processing data for continuous improvement of agent performance and regulatory compliance.

For example, FIG. 1 illustrates an example system 100 for supporting voice interactions, such as by providing automated support or quality processing of voice interactions, in accordance with one or more implementations. In brief overview, the system 100 can include a data processing system 102 and a computing device 104. The data processing system 102 or the computing device 104 can each include one or more aspects or features described elsewhere herein, such as with reference to FIGS. 14 and 15. In some implementations, the data processing system 102 can receive audio data of an inbound call from a caller 138 and execute an acoustic feature extraction model 124 using the audio data to generate acoustic features such as pitch, intensity, speech rate, energy, spectral flux, pause duration, jitter, shimmer, or prosodic contours for each of a plurality of frames. The data processing system 102 can execute a transcription model 126 to generate a transcript of utterances from the audio data. The data processing system 102 can identify a plurality of question strings from a data repository and query a mapping data structure 132 to determine which analysis engine, such as a rule-based engine, a machine learning classification model, an agent pipeline, or a language model 122, to use for each question string. The data processing system 102 can segment a set of the acoustic features and a set of text from the transcript for each question string and execute the identified analysis engine to generate a response to the question string or supporting material to facilitate a call agent answering the question string. The data processing system 102 can generate a structured response object in memory 114 comprising the generated responses to the question strings. For ease of understanding, the phrase "question string" is used, but it need not be limited to strings explicitly formed as questions. Rather, such strings can include broader issues or descriptions of a situation associated with the call whether explicitly formed as a proper question or not. In some implementations, the questions are based on information provided by the caller (e.g., are the caller's questions or are determined by what the caller is calling about) or are related to a more generic experience (e.g., whether the support agent complied with policies or requirements).

In some implementations, the data processing system 102 can perform real-time monitoring by receiving audio data of an inbound call, executing the acoustic feature extraction model 124 and the transcription model 126 to generate first acoustic features and a first transcript, and storing such data in memory caches 134. The data processing system 102 can retrieve historical call data from memory caches 134 using an identifier of the caller 138, determine a first intent of the inbound call, and determine states of the caller 138 and the call agent 140 based on the acoustic features. The data processing system 102 can generate a first question string for presentation at the computing device 104 accessed by the call agent 140 based on the historical call data, the intent, and the states. The data processing system 102 can execute the acoustic feature extraction model 124 and the transcription model 126 for a subsequent time period, identify an answer to the first question string provided by the system 102 or the agent, and, if the answer does not satisfy a criterion, generate a second question string or a follow-up answer string for presentation at the computing device 104 to the call agent. In addition or instead, the follow-up answer string can be provided to directed at the device of the individual receiving support. The system 100 may include more, fewer, or different components than shown in FIG. 1.

The data processing system 102 and/or the computing device 104 can communicate via a network 105. The network 105 can include computer networks such as the Internet, local, wide, metro, or other area networks, intranets, satellite networks, and other communication networks, such as voice or data mobile telephone networks. The network 105 can be used to access information resources such as web pages, websites, domain names, or uniform resource locators that can be presented, output, rendered, or displayed on at least one computing device (e.g., the data processing system 102 and/or the computing device 104), such as a laptop, desktop, tablet, personal digital assistant, smartphone, portable computer, or speaker.

The data processing system 102 and/or the computing device 104 can include (e.g., each include) or utilize at least one processing unit or other logic devices such as a programmable logic array engine or a module configured to communicate with one another or other resources or databases. As described herein, computers can be described as computers, computing devices, user devices, or client devices. The data processing system 102 and/or the computing device 104 may each contain a processor and a memory. The components of the data processing system 102 and/or the computing device 104 can be separate components or a single component. The system 100 and its components can include hardware elements, such as one or more processors, logic devices, or circuits.

The computing device 104 can be an electronic computing device (e.g., a cellular phone, a laptop, a tablet, or any other type of computing device). The computing device 104 can include a display with a microphone, a speaker, a keyboard, a touchscreen, or any other type of input/output device. A user can access a platform (e.g., a website or virtual desktop) provided by the data processing system 102 through the computing device 104. The platform may include chatbot functionality through which the user can communicate, such as to navigate through different pages of the platform and/or to ask questions regarding the platform.

The computing device 104 can host or store an application 106 in memory. The application 106 can be a browser, an application programming interface (API), or any other type of application that can connect with other applications or computing devices over the network 105. The application 106 can be executed by the computing device 104 and can be configured to connect with the data processing system 102 in an established connection. In one example, a user accessing the computing device 104 can access the platform provided by the data processing system 102 through the application 106.

The application 106 can include or be configured to generate a user interface 108 through which a user can provide input (e.g., via an input/output device) and/or view data that the data processing system 102 transmits to the computing device 104. For example, the user interface 108 can include a form into which a user can type text or natural language queries. In another example, the user interface 108 can be or include an audio interface into which a user can speak or provide an auditory input. The user can provide the input as a natural language query into the user interface 108 and select a submit button. Responsive to the selection of the submit button, the application 106 can transmit the natural language query to the data processing system 102. The data processing system 102 can receive the natural language query and generate a response to the natural language query using a language model. The data processing system 102 can transmit the generated response back to the computing device 104, which can display the generated response on the chat interface or otherwise on a user interface. The user can view the response and provide an input based on the response, repeating the process. Accordingly, through the user interface 108, the application 106 can facilitate a conversation between the user accessing the computing device 104 and the data processing system 102.

In some cases, the application 106 can display questions or advice generated or selected by the data processing system 102. The application 106 can display such questions or advice over the course of a call between the call agent 140 and the caller 138. For example, the call agent 140 can access the computing device 104 while on a call with the caller 138. The data processing system 102 can monitor the content of the call during the call. The data processing system 102 can determine questions for the call agent 140 to ask to satisfy some criteria (e.g., guidelines or criteria relating to application-related actions) and/or recommendations for changes in the tone of the call agent 140. The data processing system 102 can transmit such recommendations and/or questions to the computing device 104, and the application 106 can display the transmitted recommendations and/or questions on the user interface 108. The call agent 140 can view and/or process such data during the call and either ask the recommended questions on the user interface or adjust how the call agent 140 is talking based on the recommendation.

The system 100 can include at least one caller 138. The caller 138 can be an end user who may initiate an interaction with the call agent 140. In many implementations, the end user will be a human calling a support line, but in some implementations, the interaction may proceed over text or via other means. Further, the caller 138 may not be a human caller but rather an artificial agent seeking support sua sponte or on behalf of a human (e.g., it was delegated the task of receiving support for an issue by a human). In some implementations, the caller 138 can talk over the call and receive responses from the call agent 140 during the call session. The speech may be or include audio data or the data processing system 102 can convert the speech into audio data as sound waves representing the speech. The caller 138 can use a computing device to connect to the system 100 via the network 105. For example, the caller 138 may initiate a call using a mobile phone, a web application, or another network-connected device, among others. The system 100 can receive audio data of an inbound call from the caller 138 as an inbound audio stream. For instance, the data processing system can record or store the inbound audio stream in memory over the course of the call. In some implementations, the call is made using a phone application of the caller's device 138. In some implementations, the call is made from within another application running on the caller's device 138 (e.g., an app of the service for which the caller is calling about, such as a mobile banking application if the caller is attempting to reach their bank).

In some implementations, the system 100 can include at least one call agent 140. The call agent 140 can be a human operator or an automated agent that can interact with callers during voice interactions. In some implementations, the system 100 can facilitate the interaction between multiple agents and the caller across one or more mediums. For instance, the caller may initially seek support via an automated chat support feature of an app or website, which may then directly (e.g., via a link or other feature within the chat) or indirectly (being associated via a same ticket or issue number) transition to an initial support call with a human or artificial agent, which may then transition to a subsequent support call within the same session (e.g., being transferred to a human, a manager, or an appropriate department). The system 102 may facilitate each of these interactions individually or may synthesize the data of these interactions so as to improve the experience. For instance, the information from the initial interaction (e.g., with a chat bot) may be part of the data that is used by the system 102 when helping a manager with a later interaction with the same caller.

The call agent 140 can access the system 100 using the computing device 104. The call agent 140 can receive dynamic feedback, recommended questions, compliance reminders, or emotion-based coaching tips from the system 100 during a live call session. The feedback or recommendations can be generated by the data processing system 102 based on real-time analysis of the ongoing conversation, such as intent detection, compliance verification, or emotion analysis. In some implementations, the call agent 140 can adjust conversational behavior in response to prompts or notifications displayed on the user interface 108, for example, by modifying tone or asking specific questions as recommended by the system 100. The call agent 140 can receive processing results or performance evaluations after the call, which can be presented in the user interface 108 as structured feedback, performance scores, or assigned training resources.

The memory 114 may include a communicator 116, a model manager 118, a task agent 120, a language model 122, a feature extraction model 124, a transcription model 126, a segmenter 128, response models 130, a mapping data structure 132, memory caches 134, and/or a vector database 136. In some implementations, the communicator 116 can receive audio data of an inbound call from a caller or a computing device 104. The communicator 116 can transmit the audio data to the feature extraction model 124 and the transcription model 126. The feature extraction model 124 can process the audio data to generate one or more acoustic features, such as pitch, intensity, speech rate, energy, spectral flux, pause duration, jitter, shimmer, and/or prosodic contours, for each of a plurality of frames of the audio data. The transcription model 126 can process the audio data to generate a transcript of utterances, where the transcript can be segmented based on whether the caller is speaking. The segmenter 128 can segment a set of the one or more acoustic features and a set of text from the transcript for one or more of the plurality of frames of the audio data.

In some implementations, for post-call audio processing, the task agent 120 can identify a plurality of question strings (e.g., predetermined question strings) from a data repository, each question string corresponding to a question identifier. The question strings may have been stored in the data repository prior to the beginning of the audio processing for the call. The task agent 120 can query the mapping data structure 132 using the question identifiers to identify a particular machine learning classification model or a particular large language model for each question string. The response models 130 can include one or more machine learning classification models or large language models and can receive the segmented set of acoustic features and set of text for each question string as input to generate a response to the question string. The language model 122 can be used for nuanced or context-dependent questions, for example, by generating a structured response based on the transcript and policy excerpts. The components 116-130 can operate together such that, for each question string, the appropriate analysis engine is selected and executed, a response is generated, and a structured response object is created in memory 114, where the structured response object includes the generated responses to the question strings.

In some implementations, the communicator 116 can receive audio data of an inbound call between a caller and a call agent accessing computing device 104 during the inbound call. The feature extraction model 124 can execute an acoustic feature extraction process using the audio data to generate, for a first time period of the inbound call, first one or more acoustic features selected from pitch, intensity, speech rate, spectral flux, energy, pause duration, jitter, shimmer, and/or prosodic contours from the audio data of the inbound call. The transcription model 126 can execute an audio transcription process using the audio data to generate a first transcript of utterances from the first time period of the audio data of the inbound call. The task agent 120 can store the first transcript of the audio data and the first one or more acoustic features from the first time period in a short-term memory cache included in the memory caches 134. The task agent 120 can retrieve, using an identifier of the caller, historical call data generated from historical inbound calls by the caller from a long-term memory cache included in the memory caches 134. The task agent 120 can use the language model 122 to determine a first intent of the inbound call based on the first transcript generated from the inbound call. The task agent 120 can use the language model 122 to determine states of the caller and the call agent based on the first one or more acoustic features. The task agent 120 can generate a first question string for presentation at the computing device 104 accessed by the call agent based on the historical call data, the intent of the inbound call, or the states of the caller and the call agent. The feature extraction model 124 can execute an acoustic feature extraction process using the audio data to generate, for a second time period of the inbound call subsequent to the first time period, second one or more acoustic features from the audio data of the inbound call. The transcription model 126 can execute an audio transcription process using the audio data to generate a second transcript of utterances from the second time period of the audio data of the inbound call. The segmenter 128 can identify an answer to the first question string from the second time period. In response to determining the answer to the first question string does not satisfy a criterion, the task agent 120 can generate a second question string for presentation at the computing device 104 in place of the first question string using the second transcript, the second one or more acoustic features, or the answer to the first question string. The response models 130 can be used by the task agent 120 to generate responses to the question strings based on the segmented transcript or acoustic features.

In some implementations, the communicator 116 can be or include an application programming interface (API) that can connect with one or more computing devices, such as the computing device 104. The communicator 116 can receive requests or data packets transmitted from the computing device 104 over the network 105. The communicator 116 can parse the received data to identify audio data, user identifiers, and/or session metadata. The communicator 116 can transmit responses or event notifications to the computing device 104 based on the received data. The communicator 116 can maintain persistent or session-based connections with the computing device 104 using protocols such as Hypertext Transfer Protocol, WebSocket, or Transmission Control Protocol, among others.

In some implementations, the communicator 116 can monitor audio data of calls between users, such as the caller 138 and the call agent 140. The communicator 116 can receive streaming audio data or audio file uploads from the computing device 104 during an active call session. The communicator 116 can forward the received audio data to other components of the data processing system 102, such as the feature extraction model 124 or the transcription model 126. The communicator 116 can publish transcript updates or audio event notifications to downstream agents or user interfaces using a message queue or streaming bus, such as Apache Kafka. The communicator 116 can synchronize processing steps among system components by transmitting event-driven messages or invoking remote procedure calls based on the progression of the audio data or the detection of specific call events.

The data processing system 102 can include the task agent 120. The task agent 120 can be a software module configured to orchestrate the execution of models and processing steps for each voice interaction. The task agent 120 can coordinate the workflow for audio analysis, including feature extraction, transcription, question routing, and response generation. In some implementations, the task agent 120 can be or include a large language model, or the task agent 120 can communicate with the language model 122, to facilitate orchestration of the processes described herein.

The task agent 120 can invoke one or more models, manage memory resources, and/or interact with the mapping data structure 132 to select appropriate analysis engines for each question. The task agent 120 can determine, for each question string identified from a data repository, which analysis engine to execute by querying the mapping data structure 132. The mapping data structure 132 can include a rule-based mapping stored in a static database or table, which associates each question with a specific processing type, such as a rule-based engine, a machine learning classification model, a large language model, or an agentic-AI subagent. The task agent 120 can use the mapping data structure 132 to select the analysis engine and pass the relevant transcript segments and any extracted acoustic features to the selected engine.

In some implementations, the task agent 120 can manage the orchestration of multiple agent modules within the data processing system 102. The task agent 120 can coordinate the execution of the feature extraction model 124, the transcription model 126, and the response models 130 for each call. The task agent 120 can also manage the storage and retrieval of intermediate and final results in memory caches 134, and can aggregate the generated responses into a structured response object. The task agent 120 can interact with the language model 122 to generate structured prompts, to evaluate context, or to synthesize reasoning for processing outcomes, depending on the requirements of the selected analysis engine for each question.

The data processing system 102 can include at least one language model 122. The language model 122 can be a machine learning model that can be used for nuanced question answering and reasoning based on transcript data and policy documents. In some implementations, the language model 122 can be a transformer-based large language model, such as a model trained using a generative pretrained transformer (GPT) or Bidirectional Encoder Representations from Transformers (BERT) architecture, among others. The language model 122 can generate structured responses, provide reasoning, and/or perform compliance analysis for questions that require context-dependent or free-form evaluation. Other models may be used, such as diffusion models. In some implementations, the language model 122 is relatively minimal code that facilitates interaction with an externally hosted artificial intelligence model (e.g., via an API).

The language model 122 can process transcript segments and policy text to generate binary or categorical answers or responses with supporting rationale. In some implementations, the language model 122 can be prompted with one or more transcript utterances and corresponding policy excerpts. The prompt provided to the language model 122 can be formatted to instruct the language model 122 to generate a response based solely on the provided transcript and/or policy text and to explicitly respond with "No" or "No data found" when there is insufficient supporting evidence in the transcript. The output generated by the language model 122 can include a call identifier, a question, a binary answer, and/or a reasoning string that references the transcript or policy evidence used to generate the answer.

The data processing system 102 can include at least one feature extraction model 124. The feature extraction model 124 can be a software module or hardware-implemented model configured to process audio data. The feature extraction model 124 can be a machine learning model, such as a neural network trained for audio signal processing, configured to extract acoustic features from audio data. The feature extraction model 124 can process the audio data to generate acoustic features that can include pitch, intensity, speech rate, spectral flux, energy, pause duration, jitter, shimmer, and/or prosodic contours, among others. The feature extraction model 124 can apply signal processing algorithms or neural network-based models to individual frames (e.g., time periods) of audio data (e.g., audio or sounds) to compute or generate the acoustic features for that frame. In some implementations, the feature extraction model 124 can output a feature vector for individual frames, where each feature vector can represent the computed or generated acoustic features for that frame. The feature extraction model 124 can provide the generated acoustic features for downstream analysis in the data processing system 102.

The data processing system 102 can execute a task agent 120 to invoke an acoustic feature extraction model 124 using audio data of an inbound call (e.g., a previously completed inbound call). In doing so, the task agent 120 can execute the feature extraction model 124 to generate one or more acoustic features for each of a plurality of frames of the audio data. For each frame, the acoustic feature extraction model 124 can generate acoustic features selected from pitch, intensity, speech rate, spectral flux, energy, pause duration, jitter, shimmer, and/or prosodic contours, among others. The task agent 120 can cause the acoustic feature extraction model 124 to process each frame sequentially or in parallel, and can store the generated acoustic features for each frame in memory 114 for downstream processing.

In some implementations, the feature extraction model 124 can segment the audio data into frames of a predetermined duration. For example, the feature extraction model 124 can extract acoustic features for each 30-second frame of audio data, in some cases with an overlap between sequential frames (e.g., with a 10-second overlap between consecutive frames). The feature extraction model 124 can output a feature vector for each frame of an inbound call, where each feature vector can represent the computed acoustic features for that frame.

The feature extraction model 124 can be executed by the data processing system 102 as part of a pipeline for automated quality processing of voice interactions. In some implementations, the acoustic features generated by the feature extraction model 124 can be used for soft-skill evaluation or emotion detection. In some implementations, the feature extraction model 124 can operate in conjunction with other models or modules, such as a transcription model 126 or a segmenter 128, to enable comprehensive analysis of audio data. The feature extraction model 124 can be invoked by the task agent 120 to process audio data received from a caller 138 or a call agent 140.

The data processing system 102 can include at least one transcription model 126. The transcription model 126 can be an automatic speech recognition engine that may convert audio data into timestamped transcripts. In some implementations, the transcription model 126 can be a transformer-based automatic speech recognition engine that may generate word-level transcripts with confidence scores for each word. The transcription model 126 can select words that correspond to the highest confidence levels, in some cases. The transcription model 126 can generate text representations of spoken utterances. In some cases, the transcription model 126 can process audio input, apply diarization, and output speaker-attributed, punctuated transcripts. For example, the transcription model 126 can merge diarization labels that indicate speaker identity with the automatic speech recognition output to generate coherent records in which each utterance is attributed to a specific speaker and aligned with corresponding timestamps. The diarization process may provide timestamped speaker labels, which are merged with the automatic speech recognition outputs to generate coherent, punctuated, and speaker-attributed utterances.

The data processing system 102 can execute the task agent 120 to identify a plurality of question strings from a data repository. The data repository can include a database or data store that maintains a collection of question strings (e.g., questions as text), policy guidelines, or related metadata for use in automated call quality processing and compliance evaluation. Examples of question strings stored in the data repository can include "Did the agent perform a proper call opening?" or "Was a language disclosure provided when the language of communication was not English?", among others. In some implementations, the data repository can further store question strings such as "Did the agent verify the customer's identity?" or "Was the customer informed about recent account activity?".

The task agent 120 can access the data repository stored in memory 114 or in an external database accessible via the network interface 110. The data repository can store a set of question strings, each mapped to a unique question identifier. The task agent 120 can retrieve a list of question identifiers relevant to a particular processing context, for example, by referencing a mapping data structure or by receiving an input specifying the processing type, call scenario, or reason for the call. Examples of call scenarios can include a customer initiating contact to dispute a transaction, request account information, report a lost or stolen card, or inquire about loan application status, among others. Reasons for a call can further include fraud alerts, password reset requests, address changes, or questions regarding recent account activity, among others. The task agent 120 can determine the processing type, call scenario, or reason for the call by processing metadata associated with the audio data, such as call purpose codes, customer account information, or agent identifiers, among others. In some implementations, the task agent 120 can classify the call scenario or reason for the call by executing a classification model using features extracted from the transcript or acoustic features generated by the feature extraction model 124. The task agent 120 can determine the processing type based on predefined rules that map call metadata or an intent detected by the task agent 120 to a corresponding processing context. In some implementations, the task agent 120 can receive an explicit selection of a processing type, call scenario, or reason for the call from the computing device 104 or an administrative interface. The task agent 120 can use any of such rules or techniques to identify one or more questions to retrieve from the data repository to process the audio data of the inbound call (e.g., after the inbound call has completed).

The data repository can store associations between question identifiers and specific criteria, such as processing criteria, regulatory requirements, or internal policy guidelines, among others. Each question string represented in the data repository can correspond to a discrete criterion that reflects a procedural, compliance, or quality standard applicable to a voice interaction. For example, the data repository can associate a question identifier with a criterion requiring a language disclosure when the language of communication is not English, a criterion mandating verification of customer identity, or a criterion relating to the demonstration of empathy by a call agent, among others. In some implementations, the data repository can reference versioned policy documents or regulatory frameworks for each question identifier, enabling the data processing system 102 to determine which questions are relevant for a given call scenario and to route each question to the appropriate analysis engine based on the underlying criterion. The data repository can thereby externalize the linkage between questions and their corresponding criteria, allowing for dynamic updates to reflect changes in regulations or internal standards without requiring modification of application code.

The data processing system 102 can revise the data repository over time. For example, the data processing system 102 can receive a revision to a criterion corresponding to one or more questions represented by question strings in the data repository. The data processing system 102 can determine the question strings representing the one or more questions corresponding to the criterion based on a context of each of the question strings matching a context of the criterion. The data processing system 102 can generate or determine the contexts of the question strings and/or of the criterion by executing the language model 122 or an encoder using the question strings and/or the criterion as input, for example. The data processing system 102 can revise the question strings based on the revision to the criterion.

In some implementations, the data processing system 102 can generate a context label for each question string and for the criterion by executing a context classification model, such as the language model 122 or another machine learning model, using the question string and the criterion as input. The data processing system 102 can compare the context label for each question string with the context label for the criterion to identify question strings whose context matches the context of the criterion. The data processing system 102 can update the data repository to revise the identified question strings based on the received revision to the criterion. The data processing system 102 can store the revised question strings in memory 114 in association with the corresponding criterion and data repository.

The data processing system 102 can revise the identified question strings by applying one or more revision techniques using the language model 122 or a set of rules stored in memory 114. In some implementations, the data processing system 102 can provide a question string and a revised criterion to the language model 122, which may generate a revised version of the question string that reflects updated regulatory language or policy requirements. In some implementations, the data processing system 102 can determine that a terminology update is required for a set of question strings and may apply a rule to substitute all instances of a deprecated term with a new term across the relevant question strings. In some implementations, the data processing system 102 can receive a revision to a compliance guideline and may use the language model 122 to generate a context label for each question string and for the revised guideline, select question strings with matching context, and update those question strings to align with the new guideline. In some implementations, the data processing system 102 can apply a rule-based mapping to identify question strings associated with a particular processing category, such as "customer verification", and may append a clarifying phrase to each of those question strings to reflect a procedural change, for example, by adding "within the last 30 days" to questions about contact information updates, among others.

For processing of the inbound call, the task agent 120 can iterate over the retrieved question identifiers and, for each identifier, retrieve the corresponding question string from the data repository. In some implementations, the task agent 120 can filter or select question strings based on predefined criteria, such as the type of call, regulatory requirements, or policy version, among others.

In some implementations, the task agent 120 can generate a structured list or collection of question strings (e.g., predetermined question strings) and their associated question identifiers. The identification process can support dynamic updates, such that the set of question strings retrieved by the task agent 120 reflects the current contents of the data repository and any recent modifications to processing criteria. The task agent 120 can log the identification of each question string and its corresponding identifier, enabling traceability and processing capability of the question selection process. The identified question strings can serve as the basis for routing to appropriate analysis engines, such as rule-based engines, machine learning classifiers, large language models, or agentic-AI subagents, among others.

The task agent 120 can query the mapping data structure 132 stored in memory 114 to determine, for each question string of the plurality of question strings identified from the data repository, a corresponding processing engine of the response models 130. The mapping data structure 132 can take the form of a database or table, such as a static table associating each question identifier with a model type. The mapping data structure 132 can include mappings of question identifiers (e.g., numerical values unique to each question string) to one or more machine learning classification models and one or more large language models (e.g., such as the language model 122), among others. In some implementations, the mapping data structure 132 can maintain a versioned registry of questions, where each entry specifies a processing engine such as a rule-based engine, a machine learning classification model, a large language model, an agentic pipeline, or an agentic-AI subagent, among others. The mapping data structure 132 can enable the data processing system 102 to perform an in-memory lookup for each question to determine the appropriate analysis engine to invoke for generating a response.

The mapping data structure 132 can enable dynamic selection of processing engines for each question (e.g., audit question or processing question). The mapping data structure 132 may be updated externally to reflect changes in policies (e.g., audit policies) or the introduction of new criteria. In some implementations, the mapping data structure 132 can be external to application code, which can allow updates to question definitions or processing strategies to take effect without requiring code changes. The mapping data structure 132 can support dynamic routing of questions to different analysis engines, such as by enabling the rule-based dispatcher to route questions to the appropriate analysis engine based on a versioned question registry.

The task agent 120 can receive or identify a set of question identifiers, each corresponding to a different question string, and can perform an in-memory lookup for each question identifier in the mapping data structure 132. For each question identifier, the mapping data structure 132 can specify a particular machine learning classification model, a particular large language model, or another analysis engine, among others, to be used for generating a response to the corresponding question string. The task agent 120 can select, for each question string, a particular machine learning classification model or a particular large language model based on the mapping, and can store the mapping results in memory 114 for subsequent execution. In this way, the mapping data structure 132 can support dynamic routing of questions to different analysis engines, such as rule-based engines, machine learning classifiers, large language models, or agentic-AI subagents, among others, based on the type of question and optimization of computational resources, reduced latency, and/or improved contextual output.

The data processing system 102 can include the response models 130. The response models 130 can include a collection of machine learning models and/or computational engines that may generate answers to questions based on audio data or transcript data. The response models 130 can include a rule-based engine, one or more machine learning classification models, one or more large language models, and/or an agentic-AI subagent for system-of-record retrieval, among others. In some implementations, the response models 130 can include models that ingest text embeddings, acoustic features, or both, and generate binary or categorical outputs for each question. In some cases, the response models 130 can include the language model 122. The response models 130 can be selected based on the mapping data structure 132 that associates each question with a particular analysis engine.

The response models 130 can include rule-based models, machine learning classification models, large language models, and/or agent-AI subagents. The rule-based engine of the response models 130 can be configured to apply Boolean logic or pattern matching to identify the presence of required keywords, phrase structures, or contextual windows in the transcript for simple questions, such as language disclosure or mandatory statements. In some implementations, the machine learning classification models of the response models 130 can be trained to generate answers to specific questions (e.g., each machine learning classification model can be trained to generate an answer to a specific question) based on labeled examples and may ingest both textual features and acoustic features to generate confidence-weighted assessments for questions that require evaluation of soft skills or conversational tone. The large language models of the response models 130 can be prompted with transcript segments and/or policy excerpts to generate structured responses that include binary answers and explicit reasoning, for example, for nuanced or context-dependent questions.

The agentic-AI subagent of the response models 130 can orchestrate a multi-step pipeline for questions that require validation against a system of record. The agentic-AI subagent can include a transcript analyzer that extracts personally identifiable information, a source validation component that triggers authenticated application programming interface calls to backend databases, a compliance analyzer that fuses transcript and system-of-record context to evaluate questions, and/or a feedback generator that aggregates results and trace metadata. The response models 130 can generate structured outputs for each question, including a binary or categorical answer, supporting rationale, and/or references to transcript or audio segments, among others.

The data processing system 102 can include the model manager 118. The model manager 118 can select, communicate with, access, generate, train, and/or store one or more machine learning models used by the data processing system 102, including the response models 130 and the language model 122. The model manager 118 can generate a dedicated machine learning model for each question that requires a machine learning approach. For example, for a question such as "Did the agent perform a proper call opening?", the model manager 118 can generate a training dataset by extracting the first 10 percent (e.g., the time frame corresponding to the call opening) of each call's transcript, converting the extracted text into text embeddings, and labeling each embedding with a binary value such as 0 or 1 to indicate a negative or positive outcome. The model manager 118 can fine-tune a transformer-based model such as a BERT model or a RoBERTa model on the labeled dataset. During inference, the model manager 118 can process the first 10 percent of a new call's transcript in the same manner and provide the resulting embedding to the trained model for evaluation. For a question such as "Was there a proper call closing?", the model manager 118 can generate a training dataset using the last 10 percent (e.g., the time frame for the call closing) of each call's transcript and repeat the training process. For questions that require para-linguistic evaluation, such as "Was the agent empathetic?", the model manager 118 can generate a combined feature vector for each training example by concatenating text embeddings with acoustic features such as pitch, intensity, speech rate, spectral flux, energy, pause duration, jitter, shimmer, and/or prosodic contours, among others, and train a model using the combined feature vectors. The model manager 118 can train the language model 122 using a corpus of transcripts and policy documents and can fine-tune the language model 122 to generate structured responses and explicit reasoning for context-dependent questions. The model manager 118 can store the trained models in memory 114 for use by the task agent 120 and the response models 130 during post-call or real-time analysis.

In an example, the model manager 118 can train individual machine learning classification models to generate responses for specific question strings. To do so, the model manager 118 can determine (e.g., using a context machine learning model or a large language model configured or trained to generate context and/or relevant time periods for questions) a time period of inbound calls that is relevant to answering a particular question string by selecting, for example, a predefined percentage of the beginning or end of each call transcript or by referencing a time window asso-ciated with the procedural context of the question string. The model manager 118 can identify a plurality of training transcripts for a plurality of inbound calls by querying a data repository or database storing historical call data. The model manager 118 can extract a portion from each of the plurality of training transcripts that corresponds to the determined or predefined time period, for example, by selecting the first 10 percent or last 10 percent of transcript text for each call, among others. The model manager 118 can generate an embedding for each extracted portion of the plurality of training transcripts by processing the extracted text using a text embedding model, such as a neural network encoder or transformer-based model, among others. The model man-ager 118 can label each embedding with a binary value corresponding to an answer to the question string, for example, by assigning a value of 1 for a positive outcome or a value of 0 for a negative outcome, among others. The model manager 118 can train the machine learning classi-fication model using the labeled embeddings by supplying the embeddings and corresponding binary labels as input to a supervised learning process, such as fine-tuning a neural network or other classification architecture, among others.

In some cases, the model manager 118 can train the machine learning classification model to process acoustic features of audio data. To do so, the model manager 118 can generate, for each extracted portion of the plurality of training transcripts, an embedding by processing the extracted text using a neural network encoder or other embedding generation model. The model manager 118 can further generate, for each extracted portion, a set of acoustic features corresponding to the same portion of the transcript, such as pitch, intensity, speech rate, spectral flux, energy, pause duration, jitter, shimmer, and/or prosodic contours, among others. The model manager 118 can concatenate (e.g., attach or append) the embedding for each extracted portion with the acoustic features corresponding to that extracted portion to generate a concatenated embedding. The model manager 118 can label each concatenated embed-ding with a binary value or categorical value that corre-sponds to an answer to the question for which the machine learning classification model is being trained. The model manager 118 can train the machine learning classification model using the labeled concatenated embeddings as input, such that the model receives both the semantic information from the transcript and the paralinguistic information from the acoustic features for each training example.

The data processing system 102 can include at least one segmenter 128. The segmenter 128 can divide audio data or transcript data into relevant segments for targeted analysis. The segmenter 128 can generate transcript segments as frames or utterance windows for input to one or more models. The segmenter 128 can isolate portions of audio data or transcript data for input to specific models or for evaluation of questions. The segmenter 128 can segment a set of one or more acoustic features for one or more of a plurality of frames generated from audio data and a set of text from a transcript for one or more of the plurality of frames for each of a plurality of question strings. The segmenter 128 can use timestamps, speaker labels, or con-text windows to define segment boundaries. For example, the segmenter 128 can extract the first 10 percent or last 10 percent of a transcript for analysis of call opening or call closing, among others. In doing so, the segmenter 128 can identify only the frames that include the relevant portion (e.g., the first 10 percent of the call or the last 10 percent of the call, in some cases including a higher percentage to ensure the relevant portions or percentage is included). In some cases, the segmenter 128 can identify a defined num-ber or defined percentage of frames for a question. In some implementations, the segmenter 128 can generate segments that correspond to only relevant transcript portions or can generate segments that correspond to the entire transcript, for example, based on the requirements of a particular question. By segmenting the transcript in this way, the segmenter 128 can reduce the size of the context of the data for input into a machine learning classification model or language model, which reduces the processing requirements that are required to generate a response or answer to a question and/or the latency involved in generating the answer.

In one example, the data processing system 102 can execute the task agent 120 to invoke (e.g., identify, retrieve, and/or execute) the segmenter 128 to segment a set of the one or more acoustic features for one or more of the plurality of frames generated from the audio data of the inbound call and a set of text from the transcript for the one or more of the plurality of frames of the audio data of the inbound call for each of the plurality of question strings. The segmenter 128 can receive as input the acoustic features generated by the feature extraction model 124 and the transcript generated by the transcription model 126, each aligned (e.g., labeled or otherwise grouped together) to corresponding frames of the audio data. For each question string identified by the task agent 120, the segmenter 128 can determine one or more frames of interest based on the context or requirements of the question string, for example, by selecting frames corre-sponding to a particular time window or conversational segment. The segmenter 128 can generate, for each question string, a segmented set of acoustic features and a segmented set of text by extracting the acoustic features and transcript text associated with the selected frames. In some implementations, the segmenter 128 can apply predefined rules or mapping logic to identify which frames are relevant for each question string, such as selecting the first 10 percent of frames for a call opening question or the last 10 percent for a call closing question, among others.

In some implementations, the task agent 120 can generate a context label for each frame by processing the acoustic features and/or the corresponding transcript segment using a context classification model. The context for a frame can indicate, for example, whether the frame relates to a call opening, a customer verification, a compliance disclosure, a customer objective, a special offer, a call closing, or another procedural or conversational segment, among others. The task agent 120 can store the context label for each frame in memory 114 in association with the corresponding acoustic features and transcript segment. The segmenter 128 can use the context labels to segment sets of acoustic frames and/or text for individual questions.

In one example, the task agent 120 can determine the context for each of the one or more frames using a large language model (e.g., the language model 122). The task agent 120 can do so, for example, by providing audio data of each of the one or more frames to the language model 122 in a first prompt formatted to cause the language model 122 to generate a context label for each frame. The task agent 120 can use the audio data corresponding to each frame as input to the language model 122, where the first prompt specifies instructions to output a context classification for that frame, such as "call opening", "customer verification", "compliance disclosure", "customer objective", "special offer", or "call closing", among others. The language model 122 can process the context to generate the context classifications from the identified group of contexts.

In some implementations, the task agent 120 can determine context for question strings by providing (e.g., separately providing) the question strings to the language model 122 in one or more second prompts. Each second prompt can be formatted to cause the language model 122 to generate a context label for the question string. The task agent 120 can use the question string as input to the language model 122, where the second prompt specifies instructions to output a context classification for the question string, for example, by mapping the question string to one of the predefined context categories or otherwise using semantic analysis. The task agent 120 can compare the context label generated for each frame with the context label generated for the question string, and can identify those frames for which the context matches the context of the question string to use to identify features as use as input to generate responses to the question.

In some implementations, the task agent 120 can use the language model 122 to generate context embeddings for both audio frames and question strings. The task agent 120 can provide the input audio data corresponding to each frame to the language model 122. The language model 122 can process the input audio data and generate a frame embedding that represents the contextual characteristics of the frame, for example, by encoding acoustic and semantic features present in the audio segment. The language model 122 can do so using an encoder of the language model 122. The task agent 120 can store the generated frame embedding in association with the corresponding frame in memory 114. In addition, the task agent 120 can provide the input question string to the language model 122. The language model 122 can process the input question string and generate a question string embedding that captures the semantic context of the question. The task agent 120 can store the generated question string embedding in association with the question string in memory 114. The task agent 120 can compare the frame embedding and the question string embedding to determine whether the context of the frame matches the context of the question string, for example, by computing a similarity score (e.g., Euclidean distance or cosine similarity) between the embeddings. The task agent 120 can use the result of the comparison to identify frames whose context corresponds to the context of the question string (e.g., identify frames with a similarity score above a threshold and/or a defined number of frames with the highest similarity scores), among others.

In some implementations, the task agent 120 can identify, for each question string, one or more frames whose context matches a context associated with the question string. In some implementations, the task agent 120 can determine a context for the question string by querying the mapping data structure 132 or by processing the question string using a context classification model. The task agent 120 can compare the context label for each frame with the context of the question string and select those frames for which the context matches (e.g., matches within a threshold). The segmenter 128 can generate a segmented set of acoustic features and a segmented set of text for each question string that the task agent 120 identifies for processing the inbound call by extracting or identifying the acoustic features and transcript segments corresponding to the identified frames.

The task agent 120 can execute, for each question string of the plurality of question strings, the identified particular machine learning classification model or the particular large language model using the segmented set of acoustic features and set of text generated from the inbound call and selected or identified for the question string as input to generate a response to the question string. For question strings mapped to a machine learning classification model, the task agent 120 can generate a feature vector by concatenating the segmented set of text embeddings with the corresponding segmented set of paralinguistic (e.g., acoustic) features, such as pitch, intensity, speech rate, spectral flux, energy, pause duration, jitter, shimmer, and/or prosodic contours, among others. The task agent 120 can provide the feature vector to the identified machine learning classification model, which may be trained specifically for the question represented by the question string (e.g., different machine learning classification models may be trained to generate responses for specific question strings). In some implementations, the task agent 120 can select a segment of the transcript corresponding to a predefined portion of the call, for example, the first 10 percent of the transcript for a call opening question or the last 10 percent for a call closing question, and generate the feature vector from the selected segment and associated acoustic features. The machine learning classification model can process the feature vector and generate a confidence-weighted assessment or binary output, such as a Yes or No response, indicating whether the criterion corresponding to the question string is satisfied.

For question strings mapped to a large language model, the task agent 120 can construct a prompt comprising the segmented set of text and any relevant policy excerpts, and may include the segmented set of acoustic features when required for context. The task agent 120 can format the prompt to instruct the large language model to generate a response based solely on the provided transcript and policy text, and to explicitly respond with "No" or "No data found" when the transcript lacks supporting evidence. The large language model can process the prompt and generate a structured response that includes the call identifier, the question string, a categorical answer selected from Yes, No, No Data Found, or Not Applicable, and a rationale string referencing the transcript or policy evidence used to generate the answer.

In some implementations, the task agent 120 can generate an embedding from the set of text of a question string for input into the one or more of the response models 130. For example, the task agent 120 can generate an embedding by processing the set of text associated with a question string using a text embedding model (e.g., a neural network or an encoder, or the language model 122) stored in memory 114. The task agent 120 can receive the output embedding as a numerical vector that represents semantic features of the text. The task agent 120 can retrieve the set of acoustic features for the question string, for example, pitch, intensity, speech rate, spectral flux, energy, pause duration, jitter, shimmer, and/or prosodic contours, among others, generated by the feature extraction model 124 for one or more relevant frames. The task agent 120 can concatenate the embedding with the set of acoustic features to form a combined feature vector. The task agent 120 can provide the combined feature vector as input to the particular machine learning classification model or the particular large language model identified for the question string by the mapping data structure 132. In some implementations, the task agent 120 can generate the embedding from a transcript segment corresponding to the question string, concatenate the embedding with frame-level acoustic features, and supply the resulting vector to a response model 130 for inference.

For questions requiring (e.g., identified as requiring in memory or otherwise based on the mapping data structure 132) validation against a system of record, the task agent 120 can invoke an agentic-AI subagent to execute a multi-stage pipeline. The agentic-AI subagent can first execute a transcript analyzer to process the preprocessed transcript and extract personally identifiable information using a named entity recognition pipeline. The agentic-AI subagent can provide the extracted identifiers to a source-validation analyzer, which can initiate authenticated application programming interface calls to backend databases to retrieve account status, holdings, risk flags, compliance flags, or other attributes. The agentic-AI subagent can log each application programming interface (API) interaction, including request and response payloads, transaction identifiers, and timestamps, in an immutable record trail. If the transcript lacks sufficient information for validation, the agentic-AI subagent can flag the question as "Not able to be Processed" for the interaction. The agentic-AI subagent can execute a compliance analyzer to fuse transcript and system-of-record context, apply policy rule logic or large language model-based reasoning, and generate a structured response containing the original question, a computed verdict, supporting database values, a rationale string, and references to the relevant transcript spans and system-of-record fields. The agentic-AI subagent can transmit or provide the structured response to the task agent 120 for storage in memory 114.

The task agent 120 can repeat the execution process for each question string of the plurality of question strings, invoking the appropriate analysis engine as determined by the mapping data structure 132. The task agent 120 can aggregate the generated responses for each question string into a structured response object (e.g., a table, matrix, or other type of structured data object), which may include metadata such as the question identifier, processing type, model or policy version, timestamps, and supporting data references, among others. The structured response object can be stored in memory 114 or in an immutable record log for traceability and regulatory compliance.

The task agent 120 can generate, for each of the plurality of question strings, a log entry by recording every decision generated by the corresponding analysis engine in a durable store (e.g., involving ELASTICSEARCH) combined with object storage. The task agent 120 can store metadata for each decision, including the question identifier, the processing type (for example, rule-based, machine learning, large language model, or agentic subagent), the policy or model version, a timestamp, the raw utterance text, an audio snippet reference, and/or a rationale for the decision. In some implementations, the task agent 120 can capture and store additional data such as reasoning chains or top-k model outputs for rule-based methods, large language model-driven results, and System-of-Record-integrated questions. The task agent 120 can generate an immutable record trail by associating each decision and its supporting metadata with the corresponding call and question string, such that compliance officers and regulators may trace each outcome back to its underlying data and logic, thereby satisfying stringent transparency and explainability requirements.

In some implementations, the task agent 120 can further enrich each response with trace metadata. The trace metadata can include audio segment references, transcript span references, application programming interface call logs, and policy version identifiers, among others. The task agent 120 can retrieve or generate references to the precise audio frames or transcript windows that were used as input to the analysis engine for each question string. The task agent 120 can append any relevant application programming interface call logs generated by an agentic-AI subagent, including transaction identifiers and response payloads, to the structured response object. The task agent 120 can store policy or model version identifiers used for each response to facilitate traceability and reproducibility.

The task agent 120 can generate, in memory, a structured response object by aggregating the generated responses to the plurality of question strings. The task agent 120 can receive, from each analysis engine invoked for a respective question string, a response that includes a binary or categorical answer, a rationale string, and references to supporting data such as transcript segments or acoustic feature values. The task agent 120 can associate each response with the corresponding question identifier and can collect additional metadata, for example, the processing type used for the question string, the version of the policy or model applied, and a timestamp indicating when the response was generated.

The task agent 120 can construct the structured response object by assembling the aggregated responses and associated metadata into a data structure in memory 114. The structured response object can include, for each question string, the question identifier, the generated answer, the rationale, references to transcript or audio segments, processing type, policy or model version, and trace metadata. The task agent 120 can store the structured response object in an immutable record log for regulatory compliance. In some implementations, the structured response object can be retrieved for reporting, review, or downstream analytics, and can serve as a durable record of the automated quality review process.

In a non-limiting example, the data processing system 102 can execute a post-call processing pipeline that receives audio data of a voice interaction and generates a structured processing record. The data processing system 102 can apply a machine learning-based audio denoising algorithm to the received audio data to attenuate background noise and improve speech clarity. The data processing system 102 can execute a voice activity detection model to segment the audio data into speech and non-speech intervals, removing silences and extraneous sounds. The data processing system 102 can generate acoustic features such as pitch, intensity, speech rate, spectral flux, energy, pause duration, jitter, shimmer, and/or prosodic contours for each 30-second frame of the audio data with a 10-second overlap. The data processing system 102 can execute a speaker diarization process to assign speaker labels to each segment of the audio data, distinguishing between the caller 138 and the call agent 140. The data processing system 102 can execute an automatic speech recognition engine to generate a timestamped transcript of utterances with word-level confidence scores, and merge the transcript with speaker labels to produce a speaker-attributed record.

The data processing system 102 can identify a plurality of questions from a versioned question registry stored in a mapping data structure 132, where each question is mapped to a processing type such as rule-based engine, machine learning classifier, large language model, or agentic-AI subagent, among others. For example, the data processing system 102 can route a question such as "Did the agent perform a proper call opening?" to a machine learning classifier trained on the first 10% of each call's transcript, while routing a question such as "Was a language disclosure provided?" to a rule-based engine that applies Boolean logic to detect required phrases. For a question requiring nuanced reasoning, such as "Did the agent demonstrate empathy?", the data processing system 102 can prompt a large language model with the relevant transcript segment and policy excerpt to generate a binary answer and explicit rationale. For a question requiring validation against a system of record, such as "Is the account active?", the data processing system 102 can invoke an agentic-AI subagent to extract personally identifiable information from the transcript, perform authenticated application programming interface calls to backend databases, and generate a structured response with supporting rationale and references. The data processing system 102 can generate a structured record for each call, including the call identifier, question, binary answer, reasoning or provenance, and references to transcript or audio segments, and can store the record in an immutable record log for traceability and/or regulatory compliance.

By virtue of the implementation of the techniques described herein, a system can reduce computing processor and memory consumption. For example, the system can receive audio data, execute an acoustic feature extraction model to generate acoustic features, and use a mapping data structure to route each question to the most resource-efficient analysis engine, such as a rule-based engine, a machine learning classification model, or a large language model, depending on the complexity and context of each question. By segmenting only the relevant portions of audio and transcript data for each question and invoking only the necessary model, the system can avoid unnecessary processing of entire transcripts or redundant model executions, thereby conserving processor cycles and memory allocations. As a result, the system can achieve significant reductions in computational overhead compared to conventional approaches that process all data through a single, monolithic model.

In some examples, a system implementing these techniques can reduce network communication during the process. For example, by leveraging a mapping data structure to determine the optimal analysis engine for each question and executing models locally on the server, the system can minimize the need to transmit large volumes of audio or transcript data to multiple remote services or external engines. By generating and storing structured response objects in memory and only communicating essential results or logs across the network, the system can significantly decrease the volume and frequency of network transmissions. As a result, the system can operate with lower network bandwidth requirements and reduced latency, which can be particularly beneficial in environments with limited connectivity or high data transfer costs.

In at least some examples, the described system can improve accuracy when compared to other systems by combining multiple specialized analysis engines and integrating acoustic features with textual analysis. For example, the system can use a rule-based engine for deterministic questions, dedicated machine learning classifiers trained on specific tasks and relevant transcript segments, and large language models for nuanced questions requiring contextual reasoning, with each engine selected based on the mapping data structure. By segmenting input data to match the requirements of each analysis engine and incorporating both acoustic and semantic features, the system can generate more precise and contextually relevant responses to questions. As a result, the system can deliver higher accuracy and consistency in processing outcomes relative to solutions that rely solely on a single model or do not leverage acoustic features.

In examples where the system implements these techniques, the risk of malicious actors exploiting deficiencies is reduced. For example, by using a mapping data structure to externalize and version control the routing of questions, the system can quickly adapt to changes in compliance requirements and patch vulnerabilities in analysis logic without modifying application code. By logging every decision with metadata such as question identifier, processing type, model or policy version, timestamps, and supporting data references, the system can maintain a transparent and immutable record trail that deters tampering and facilitates forensic analysis. As a result, the system can provide enhanced resilience against attempts to manipulate processing outcomes or evade detection through adversarial inputs, which can be a limitation in less structured or less transparent systems.

Referring still to FIG. 1, in some cases, the data processing system 102 can perform real-time processing of audio data of inbound calls. For example, the communicator 116 can receive audio data of an inbound call transmitted from the caller 138 while the call agent 140 accesses a computing device during the inbound call. The communicator 116 can detect the initiation of the inbound call by monitoring the network interface 110 for incoming audio streams associated with a unique session identifier. The communicator 116 can receive the audio data as a digital signal in real time, for example, as a sequence of audio frames or packets transmitted over the network 105 from the computing device 104 or from another computing device or phone being accessed by the call agent 140. In some cases, the communicator 116 can detect the call from an interactive voice response (IVR) system that records a call in real-time and sends the recording to the data processing system 102 for processing. In some implementations, the communicator 116 can associate the received audio data with metadata such as a call identifier, a timestamp, a caller identifier, or an agent identifier, among others. The communicator 116 can store the received audio data in memory 114. In some implementations, the communicator 116 can receive audio data in a streaming format, such as via a persistent WebSocket connection or a telephony gateway protocol, and can buffer or forward the audio data for further processing by the data processing system 102.

The task agent 120 can execute (e.g., during and/or before termination of the inbound call) the acoustic feature extraction model 124 using audio data of the inbound call to generate, for a first time period of the inbound call, first one or more acoustic metrics selected from pitch, intensity, speech rate, spectral flux, energy, pause duration, jitter, shimmer, and/or prosodic contours from the audio data of the inbound call. The task agent 120 can segment the audio data into frames corresponding to the first time period, for example, by dividing the audio stream into non-overlapping or overlapping intervals of a predetermined duration. The acoustic feature extraction model 124 can process each frame of the audio data to generate acoustic metrics such as pitch, intensity, speech rate, spectral flux, energy, pause duration, jitter, shimmer, and/or prosodic contours, among others, for the frame of the first time period. In some implementations, the task agent 120 can store the generated acoustic metrics in memory 114 in association with the corresponding time period and frame identifiers.

The task agent 120 can execute an audio transcription model 126 using audio data of an inbound call to generate a first transcript of utterances from a first time period of the audio data. The task agent 120 can provide the audio data corresponding to the first time period to the audio transcription model 126. The audio transcription model 126 can process the audio data to convert speech signals into a text-based transcript. The audio transcription model 126 can segment the transcript based on detected utterances, where each utterance can be aligned to a specific time window within the first time period. In some implementations, the audio transcription model 126 can merge speaker diarization labels with the transcript to attribute each utterance to either the caller 138 or the call agent 140. The task agent 120 can receive the output of the audio transcription model 126 and store the first transcript in memory 114 in association with the corresponding first time period of the audio data. In some implementations, the first transcript can include time-stamped utterances and speaker labels.

The task agent 120 can store the first transcript of the audio data and the first one or more acoustic features from the first time period in a short-term memory cache included in the memory caches 134. The task agent 120 can associate the first transcript and the first one or more acoustic features with a session identifier, a timestamp, or a call identifier. The task agent 120 can write the first transcript and the first one or more acoustic features to the short-term memory cache such that the data processing system 102 can retrieve the stored transcript and acoustic features for subsequent real-time analysis or feedback generation. In some implementations, the task agent 120 can update the short-term memory cache incrementally as new transcript segments or acoustic features are generated during the call. The short-term memory cache can be configured to provide rapid access to the most recent conversation context for use by downstream agent modules or analysis engines.

The data processing system 102 can include the memory caches 134. The memory caches 134 can include storage areas configured to store short-term memory and/or long-term memory. In some implementations, the memory caches 134 can store short-term memory (e.g., as a short-term memory cache) that includes recent conversation context, such as a transcript or acoustic features generated during a current call session. In some implementations, the memory caches 134 can store long-term memory (e.g., long-term memory cache) that includes historical customer data, prior transcripts, or previous analysis outcomes. The memory caches 134 can provide rapid access to relevant data for real-time analytics or post-call analytics. For example, the memory caches 134 can store the first transcript of audio data and the first one or more acoustic features from a first time period of a call in a short-term memory cache. In some implementations, the memory caches 134 can store post-call analysis results for a customer as long-term memory, which can be used as input for real-time call assistance in subsequent calls.

The memory caches 134 can use fast-access storage technologies and indexing for efficient retrieval of stored data. In some implementations, the memory caches 134 can be indexed by call identifier, timestamp, or customer identifier. The memory caches 134 can allow the data processing system 102 to retrieve recent or historical data as needed for analysis, feedback generation, or compliance verification. In some implementations, the memory caches 134 can be used by one or more components of the data processing system 102, such as a task agent 120, to store or retrieve conversation context, processing results, or customer history. The memory caches 134 can thereby enable the data processing system 102 to maintain continuity between post-call and real-time analytics by making historical data available for use in subsequent interactions.

The task agent 120 can retrieve historical call data generated from historical inbound calls by a caller using an identifier of the caller. The task agent 120 can receive the identifier of the caller from a current call session or from a transcript segment associated with the inbound call. The task agent 120 can generate a query using the identifier of the caller. The task agent 120 can transmit the query to a long-term memory cache included in the memory caches 134. The long-term memory cache can store historical call data associated with a plurality of callers, where each record can be indexed by a caller identifier, a call identifier, or a timestamp, among others. The task agent 120 can execute a lookup operation in the long-term memory cache using the identifier of the caller as a key. The task agent 120 can retrieve one or more records corresponding to historical inbound calls by the caller, where each record can include transcript data, acoustic features, processing outcomes, compliance events, or other metadata associated with the prior calls. In some implementations, the task agent 120 can filter the retrieved historical call data based on a date range, a call type, or a compliance category. In some implementations, the task agent 120 can aggregate or summarize the historical call data to provide context for real-time analytics or agent assistance.

In one example, the task agent 120 can detect an identifier of the caller 138 by invoking a personal information extraction agent stored in memory 114 (e.g., in the response models 130 or in the agent pipeline of the response models 130). The task agent 120 can access the first transcript generated from the audio data of the inbound call. The task agent 120 can provide the first transcript as input to the personal information extraction agent. The personal information extraction agent can process the transcript to identify personally identifiable information associated with the caller 138. The personal information extraction agent can use a named entity recognition pipeline or a set of regular expression rules to extract entities such as account numbers, names, dates of birth, phone numbers, or email addresses, among others, from the transcript.

In some implementations, the task agent 120 can receive the output of the personal information extraction agent as a set of detected identifiers. The task agent 120 can store the detected identifiers in association with the current call session the short-term memory cache of the memory caches 134 in memory 114. The task agent 120 can use one or more of the detected identifiers (e.g., the account number or name) of the caller 138 to query additional data sources and/or retrieve historical call data for calls performed by the caller 138, such as from the long-term memory cache of the memory caches 134. The task agent 120 can log the detection of the identifier(s) and the corresponding transcript segment in a record, such as for traceability.

The task agent 120 can determine an intent (e.g., a first intent) of the inbound call between the caller 138 and the call agent 140. The task agent 120 can do so, for example, by using the language model 122 or another large language model. The task agent 120 can identify the first transcript generated from audio data of the inbound call. The task agent 120 can provide the first transcript as input to the language model 122. The language model 122 can process the first transcript to generate an intent label corresponding to the inbound call. The intent label can represent a category, such as fraud, dispute, account inquiry, lost or stolen card, or another domain-specific intent, among others. In some implementations, the task agent 120 can construct a prompt for the language model 122 that includes the first transcript or a portion of the first transcript, and can specify instructions to classify the intent of the inbound call according to a predefined ontology of intent categories. The language model 122 can analyze the semantic content of the first transcript and output the intent label. The task agent 120 can receive the output from the language model 122 and store the determined intent in memory 114 in association with the inbound call. In some implementations, the task agent 120 can use the determined intent to guide subsequent processing steps, such as selecting relevant questions or generating targeted feedback for the call agent 140.

In an example, the task agent 120 can retrieve a first transcript of utterances from a short-term memory cache included in memory 114. The first transcript generated from a portion of the audio data of the inbound call. The task agent 120 can provide the first transcript as input to the language model 122. The language model 122 can process the first transcript to generate a first intent corresponding to the inbound call. The first intent can correspond to performing an action with the application 106 hosted by the data processing system 102, such as initiating a funds transfer, disputing a transaction, requesting account information, or updating contact details, among others. In some implementations, the task agent 120 can construct a prompt for the language model 122 that includes the first transcript and instructions to classify the intent of the call according to a predefined set of application-related actions (e.g., update an aspect or setting of an account of the speaker of the inbound call). The language model 122 can output an intent label that identifies the specific action to be performed with the application 106. The task agent 120 can receive the intent label from the language model 122 and store the first intent in memory 114 in association with the inbound call, in some cases, in the short-term memory cache and/or the long-term memory cache of the memory caches 134.

The task agent 120 can determine states of the caller 138 and the call agent 140. The task agent 120 can do so based on the first one or more acoustic metrics generated from audio data of an inbound call. The task agent 120 can identify the first one or more acoustic metrics, which can include pitch, intensity, speech rate, spectral flux, energy, pause duration, jitter, shimmer, and/or prosodic contours, among others, for the first time period of the inbound call. The task agent 120 can process the first one or more acoustic metrics using a computing model (e.g., a machine learning model, such as a large language model, a neural network, a transformer, a support vector machine, etc.) stored in memory 114 to generate a set of states for the caller 138 and/or the call agent 140. The states can correspond to emotions of the respective speakers, such as anger, happiness, frustration, calmness, or neutrality, among others. The task agent 120 can associate each state with a corresponding speaker and a timestamp or time window of the audio data. In some implementations, the task agent 120 can execute an emotion detection model that receives the first one or more acoustic metrics as input and outputs a classification or probability distribution over a predefined set of emotional states for each speaker. The task agent 120 can store the determined states in memory 114 in association with the corresponding transcript segment, acoustic metrics, or time period, in some cases in the short-term memory cache and/or the long-term memory cache of the memory caches 134. In some implementations, the task agent 120 can use the determined states to inform downstream processing, such as generating recommendations for the call agent 140 or adjusting the selection of questions or otherwise the phrasing or how the questions are asked based on the detected emotional context of the conversation.

The task agent 120 can determine sets of states for the inbound call using different types of data and/or different computer models. For example, the task agent 120 can determine a set of states for the call agent 140 and the caller 138 by executing a computing model (e.g., a machine learning model, such as a neural network, a support vector machine, or a random forest) using the first one or more acoustic metrics generated from audio data of the inbound call. The computing model can receive as input the acoustic metrics, such as pitch, intensity, speech rate, spectral flux, energy, pause duration, jitter, shimmer, and/or prosodic contours, among others, and can generate a first set of states for the call agent 140 and the caller 138. The first set of states can include, for example, emotional or conversational states such as calm, frustrated, engaged, or neutral, among others. Concurrently, the task agent 120 can execute a large language model using the first transcript generated from the audio data as input to generate a second set of states for the call agent 140 and the caller 138. The large language model can process the transcript to detect semantic cues, sentiment, or conversational context, and can generate the second set of states, which may include, for example, sentiment polarity, intent alignment, or engagement level, among others. The task agent 120 can store the first set of states and the second set of states in memory 114 in association with the corresponding time period, speaker, or transcript segment, in some cases in the short-term memory cache and/or the long-term memory cache of the memory caches 134.

The task agent 120 can process a first transcript generated from audio data of an inbound call to determine a first set of intents for a caller 138 and a second set of intents for a call agent 140. Each intent of the first set of intents and the second set of intents can correspond to a different timestamp of the first transcript. The task agent 120 can segment the first transcript into utterance windows or frames aligned to timestamps and can provide each segment as input to a language model 122. The language model 122 can generate, for each segment, an intent label for the caller 138 and an intent label for the call agent 140, where the intent label can represent a category such as fraud, dispute, account inquiry, or lost card, among others. The task agent 120 can associate each generated intent label with the corresponding timestamp and speaker, and can store the first set of intents for the caller 138 and the second set of intents for the call agent 140 in memory 114 in association with the respective timestamps of the first transcript.

The task agent 120 can maintain a record of the states of the caller 138 and/or the call agent 140 of the inbound call. For instance, the task agent 120 can determine a first set of states for the caller 138 and a second set of states for the call agent 140. The states of the first set of states and the second set of states can correspond to matching timestamps of the first transcript. To generate the sets of states for the caller 138 and the call agent 140, the task agent 120 can process each segment of the first transcript and execute a computing model using acoustic features generated from the corresponding audio data to generate a state label for the caller 138 and/or a state label for the call agent 140 at each timestamp. The state label can indicate an emotional or conversational state such as calm, frustrated, engaged, or neutral, among others. The task agent 120 can generate, for each timestamp of the different timestamps in the first transcript, a record in structured memory, where each record contains the intent and the state of a speaker at the time of the timestamp of the record. The task agent 120 can store the generated records in memory 114, such that each record is indexed by timestamp and speaker, and contains the corresponding intent and state for the caller 138 or the call agent 140.

The task agent 120 can generate a first question string for presentation at the computing device 104 being accessed by the call agent 140. The task agent 120 can generate the first question string based on historical call data, the intent of the inbound call, and/or the states (e.g., the first set of states and/or the second set of states) of the caller 138 and the call agent 140. For example, the task agent 120 can retrieve historical call data from memory caches 134 using an identifier of the caller 138. The task agent 120 can determine the intent of the inbound call by processing a transcript generated from audio data of the inbound call using the language model 122. The task agent 120 can determine the states of the caller 138 and the call agent 140 by analyzing acoustic features generated by the feature extraction model 124 for the first time period of the inbound call and/or the transcript of the inbound call generated by the transcription model 126. The task agent 120 can identify a set of candidate question strings by querying a data repository containing processing or compliance questions mapped to specific call scenarios. The task agent 120 can evaluate the historical call data to determine whether particular criteria or objectives have been previously addressed or remain outstanding for the caller 138. The task agent 120 can select one or more candidate question strings by matching the determined intent of the inbound call to predefined intent categories associated with each question string. The task agent 120 can further refine the selection of the first question string by analyzing the states of the caller 138 and the call agent 140, such that the selected question string corresponds to a question type, phrasing, or sequence that is contextually appropriate for the current emotional or conversational state. In some implementations, the task agent 120 can apply a rule-based or model-driven scoring function to rank the candidate question strings and select the highest-ranked question string for presentation at the computing device 104. The task agent

120 can transmit the selected question string to the computing device 104 for display to the call agent 140 during the inbound call.

The data processing system 102 can transmit the first question string to the computing device 104. The application 106 executed by the computing device 104 can display the first question string on the user interface 108. The call agent 140 can access the computing device 104 and view the first question string presented on the user interface 108. The call agent 140 can ask the question corresponding to the first question string to the caller 138 over the established call. In some implementations, the transmission of the first question string from the data processing system 102 to the computing device 104 can occur over the network 105. The data processing system 102 can associate the first question string with a session identifier or a call identifier to maintain correspondence between the question and the ongoing call session.

In some cases, the task agent 120 can retrieve account data from a dedicated data structure for the caller 138. For example, the task agent 120 can receive or identify (e.g., via an identifier identified or extracted from the transcript) an identifier of the caller 138 and generate a query to retrieve account data from a data structure stored in the long-term memory cache. The task agent 120 can transmit the query to the long-term memory cache, which may store historical records and account attributes associated with the caller 138, such as account status, product holdings, risk flags, compliance events, or prior interaction summaries, among others. The task agent 120 can receive the account data in response to the query and store the retrieved account data in memory 114 (e.g., the short-term memory cache of the memory caches 134) in association with the current call session. The task agent 120 can process the account data to determine one or more attributes relevant to the ongoing call, for example, by extracting account status, last contact update, or recent compliance flags, among others. The task agent 120 can generate the first question string for presentation at the computing device 104 accessed by the call agent 140 based at least in part on the retrieved account data, the detected intent of the call, and the conversational context. In some implementations, the task agent 120 can select or construct the first question string by referencing a mapping between account attributes and predefined compliance questions, or by generating a contextually appropriate question using a language model 122, such that the question string addresses outstanding requirements or account-specific criteria identified from the account data. The task agent 120 can transmit the generated first question string to the computing device 104 for display on the user interface 108 during the ongoing call.

In some cases, the data processing system 102 can determine the first question string using the vector database 136. The vector database 136 can store and query vector embeddings generated from data such as quality assurance guidelines, policy documents, or transcript segments, among others. The vector database 136 can enable retrieval of relevant documents or guidelines based on embedding similarity. The vector database 136 can use approximate nearest neighbor search algorithms, such as those implemented by FAISS or Milvus, among others, to perform fast similarity matching for large-scale vector search. The data processing system 102 can leverage the vector database 136 to inform agent guidance and compliance checks by dynamically retrieving contextually relevant compliance and quality expectations based on the evolving conversation.

For example, the task agent 120 can query a vector database 136 by generating an embedding from the first intent and the first one or more acoustic metrics associated with a call session. The task agent 120 can generate the embedding by inputting the first intent and the first one or more acoustic metrics into an embedding generation neural network stored in memory 114. The task agent 120 can transmit the generated embedding as a query to the vector database 136. The vector database 136 can store a plurality of embeddings, each generated from a different set of guidelines relevant to quality assurance or compliance requirements. The task agent 120 can identify a set of guidelines relevant to the first transcript by retrieving, from the vector database 136, those guidelines whose stored embeddings satisfy a similarity threshold with the embedding generated from the first intent and the first one or more acoustic metrics. In some implementations, the similarity threshold can be determined based on a cosine similarity or other distance metric, such that only guidelines with embeddings sufficiently close to the query embedding are selected for further processing.

The task agent 120 can determine a deficiency in the first transcript in satisfying the set of guidelines identified from the vector database 136. To do so, the task agent 120 can compare the content of the first transcript with the requirements specified by the set of guidelines, for example, by executing a rule-based evaluation, a classification model, or a language model 122. Upon detecting that one or more guidelines are not satisfied by the first transcript, the task agent 120 can generate a first question intended to address the identified deficiency. In some implementations, the task agent 120 can generate the first question by providing the set of guidelines, the first transcript, and any relevant acoustic features as input to the language model 122. The language model 122 can output a question string that is contextually tailored to the call session and formulated to elicit information or responses necessary to satisfy the outstanding guideline.

The task agent 120 can determine whether the first transcript satisfies a set of guidelines identified from the vector database 136. For example, the task agent 120 can compare the first transcript to a guideline requiring the agent to provide a language disclosure when the language of communication is not English. The task agent 120 can search the transcript for the presence of a required disclosure statement, such as "This call may be monitored for quality assurance purposes" or a similar phrase, by executing a rule-based evaluation. If the required disclosure statement is not detected in the transcript, the task agent 120 can determine that the first transcript does not satisfy the guideline. Based on the determination, the task agent 120 can select the phrase (e.g., as a question) "This call may be monitored for quality assurance purposes" or a similar phrase and transmit the selected phrase to the computing device 104 of the call agent 140.

The data processing system 102 can continue monitoring the call for a second time period that is subsequent to the first time period or subsequent to the time of the transmission of the first question string. The data processing system 102 can execute the feature extraction model 124 using audio data of the inbound call to generate, for the second time period, second one or more acoustic features selected from pitch, intensity, speech rate, spectral flux, energy, pause duration, jitter, shimmer, and/or prosodic contours. The data processing system 102 can execute the transcription model 126 using the audio data corresponding to the second time period to generate a second transcript of utterances. The data processing system 102 can store the second transcript and the second one or more acoustic features in memory 114 or in the short-term memory cache included in the memory caches 134. The data processing system 102 can analyze the second transcript and the second one or more acoustic features to identify an answer to the first question string or to determine whether a criterion associated with the first question string is satisfied. In some implementations, the data processing system 102 can generate a second question string for presentation at the computing device 104 based on the analysis of the second transcript, the second one or more acoustic features, and/or the answer to the first question string. The data processing system 102 can repeat the monitoring, feature extraction, transcription, and analysis operations for additional time periods as the call progresses.

The task agent 120 can generate a second question string for presentation at the computing device 104 based on a determination of compliance risk. For example, the task agent 120 can identify an answer to the first question string from the audio data of the inbound call by processing (e.g., using the language model 122 or another machine learning model) the audio data of the inbound call and/or the second transcript generated from the audio data of the second time period. The task agent 120 can evaluate (e.g., against a defined rule or rule set) the answer to the first question string to determine whether the answer indicates a compliance risk. In some implementations, the task agent 120 can apply a rule-based logic, a scoring function, or a compliance verification model to the answer or to associated metadata, such as the rationale or supporting transcript segment, to detect the compliance risk. The task agent 120 can detect the compliance risk based at least on the answer to the first question string and/or based on additional contextual information retrieved from memory 114, the memory caches 134, and/or the mapping data structure 132. Responsive to detecting the compliance risk, the task agent 120 can generate the second question string by selecting from a set of candidate question strings stored in a data repository, or by constructing a new question string using a language model 122. The task agent 120 can select the second question string such that the second question string is configured to address the detected compliance risk, for example, by prompting the call agent 140 to obtain additional information, clarify a response, or satisfy a regulatory requirement that was not met according to the answer to the first question string. The task agent 120 can transmit the second question string to the computing device 104 for presentation to the call agent 140 during the ongoing call or analysis process. In some implementations, the task agent 120 can log the detection of the compliance risk and the generation of the second question string in a structured response object, including metadata such as the question identifier, compliance risk type, timestamp, and references to the relevant transcript or audio segment.

In some cases, the data processing system 102 can generate and provide recommendations for the call agent 140 during the course of the inbound call. For example, the task agent 120 can determine whether a set of one or more acoustic metrics generated from audio data of the inbound call satisfy a set of recommendation criteria. For instance, the task agent 120 can receive the first one or more acoustic metrics, which can include pitch, intensity, speech rate, spectral flux, energy, pause duration, jitter, shimmer, and/or prosodic contours, among others, for a time period of the inbound call. The task agent 120 can compare the first one or more acoustic metrics to a set of predefined thresholds or conditions stored in memory 114 that define the recommendation criteria. In some implementations, the task agent 120 can execute a rule-based evaluation or a machine learning model to determine whether the acoustic metrics indicate that the tone of speech of the call agent 140 satisfies or deviates from the recommendation criteria. The task agent 120 can generate a determination result indicating whether the set of recommendation criteria is satisfied.

In response to determining that the first one or more acoustic metrics satisfy the set of recommendation criteria, the task agent 120 can generate a recommendation for the call agent 140 to adjust a tone of speech for the inbound call. The task agent 120 can select a recommendation message from a set of predefined messages or can generate a recommendation message using a language model 122. The recommendation can specify an action for the call agent 140, such as lowering vocal intensity, increasing speech rate, or adopting a more empathetic tone, among others. The task agent 120 can transmit the generated recommendation to the computing device 104 accessed by the call agent 140. The application 106 executed by the computing device 104 can display the recommendation on the user interface 108 during the ongoing inbound call.

Responsive to termination of the inbound call between the caller 138 and the call agent, the task agent 120 can update the record stored in memory for the call. For example, the task agent 120 can detect termination of the inbound call by monitoring call session metadata stored in memory 114, such as telephony disconnect signals, call duration thresholds, or explicit session end events received via the network interface 110. Responsive to detecting the termination of the inbound call, the task agent 120 can generate a structured summary of the call by aggregating records stored in memory 114 that contain the intents and states of the caller 138 and the call agent 140 identified during the call session. The task agent 120 can retrieve, for each timestamped segment of the call, the detected intent and state for each speaker, and can assemble such data into a structured data object that includes a temporal sequence of intents and states, speaker identifiers, and corresponding timestamps. In some implementations, the task agent 120 can further include metadata such as call identifiers, session duration, and compliance outcomes in the structured summary. The structured summary generated by the task agent 120 can be stored in memory 114 for subsequent reporting, processing review, or integration with post-call analytics, among others.

In some cases, the task agent can 120 can stream (e.g., automatically stream) videos (e.g., training videos) to the computing device 104 based on how the call agent 140 performed on the call. For example, the task agent 120 can determine a call performance score for the call agent 140 of the inbound call based on states of the caller 138 and the call agent 140 retrieved from structured memory. To do so, the task agent 120 can access records in memory 114 that contain, for each timestamp of the call, an intent and a state of the caller 138 and the call agent 140, where the states may include, for example, emotional or conversational attributes such as calm, frustrated, engaged, or neutral, among others. The task agent 120 can process the sequence of states using a scoring algorithm that assigns weights or values to detected behaviors, compliance events, or conversational outcomes, and can aggregate such values to generate a call performance score for the call agent 140. The task agent 120 can compare the call performance score to one or more predefined criteria stored in memory 114, where each criterion corresponds to a particular video stream (e.g., a training video stream depicting training for performing calls with callers). Responsive to the call performance score satisfying a criterion (e.g., being below a threshold), the task agent 120 can automatically stream a video stream to the computing device 104 of the call agent 140. The video stream may include, for example, targeted training content, coaching material, or feedback resources.

In some cases, the task agent 120 can select the video stream based on a determined area of improvement for the call agent 140. For example, the task agent 120 can determine an area of improvement for the call agent 140 by processing the structured response object generated for the inbound call and identifying questions or criteria for which the call agent 140 did not achieve a satisfactory outcome. The task agent 120 can access the structured response object in memory 114, which may include, for each question, a binary answer, a rationale, and references to transcript or audio segments, among others. The task agent 120 can compare the binary answers to a set of expected outcomes stored in memory 114 and can flag any question for which the answer indicates non-compliance, incomplete procedural adherence, or suboptimal conversational behavior. In some implementations, the task agent 120 can aggregate the flagged questions and map each flagged question to a corresponding skill domain, procedural requirement, or behavioral competency by referencing a mapping data structure 132. The task agent 120 can rank the identified areas of improvement based on predefined priority rules, frequency of occurrence, or severity of the deficiency, among others. The task agent 120 can select the highest priority area of improvement and associate it with targeted training content, coaching material, or feedback resources stored in memory 114, such that the subsequent video stream or feedback provided to the call agent 140 addresses the most relevant area for performance enhancement. The task agent 120 can select the video stream to stream to the computing device 104 based on the video stream corresponding or mapping to the determined area of improvement.

By virtue of the implementation of the techniques described herein, a system for machine learning-based real-time inbound call monitoring can reduce computing processor and memory consumption. For example, the system can segment audio data into discrete time periods, extract only relevant acoustic features and transcripts for each period, and store these in a short-term memory cache, rather than processing or retaining the entire call data at once. By generating and presenting targeted question strings based on historical call data, detected intent, and conversational states, the system can avoid unnecessary model executions and redundant data storage, thereby conserving processor cycles and memory allocations. As a result, overall resource consumption is reduced, allowing the system to scale efficiently for high call volumes while maintaining responsive analytics.

In some examples, a system implementing these techniques can reduce network communication during the process of real-time call analytics and agent assistance. For example, the system can leverage short-term and long-term memory caches to locally store and retrieve conversation context and historical data, minimizing the need to transmit large volumes of audio or transcript data to remote servers or external services for each analytic step. By generating structured feedback and actionable guidance on the server and transmitting only essential results or notifications to the agent user interface, the system can decrease the volume and frequency of network transmissions. As a result, network bandwidth requirements and latency are reduced, supporting reliable operation even in environments with limited connectivity.

In at least some examples, the described system can improve accuracy when compared to other systems by combining multiple specialized analytic agents and integrating both acoustic and semantic features. For example, the system can use an intent and emotion detection agent to classify call intent and emotional tone using paralinguistic and textual features, a compliance verification agent to reference dynamic guidelines, and a source validation agent to confirm customer information against backend databases. By synthesizing these diverse analytic outputs and generating question strings or feedback tailored to the evolving conversation, the system can provide more precise, contextually relevant, and timely recommendations than approaches relying on a single model or static rule set. As a result, the system can deliver higher accuracy and consistency in real-time agent guidance and compliance monitoring.

In some examples, a system configured as described can reduce the chances of malicious actors exploiting deficiencies present in less robust systems. For example, by maintaining immutable record trails of all analytic decisions, including metadata such as timestamps, processing types, and supporting data references, the system can provide transparent traceability for every action and recommendation. By dynamically generating questions and compliance checks based on both live and historical data, the system can adapt to evolving threat patterns and prevent adversarial manipulation of static workflows. As a result, the system can provide enhanced resilience against attempts to evade detection, manipulate processing outcomes, or exploit gaps in compliance coverage that may exist in conventional solutions.

Referring now to FIG. 2, illustrated is a method 200 of providing improved audio call analytics using a routed machine-learning architecture, in accordance with some implementations. The method 200 can be executed, performed, or otherwise carried out by any of the computing systems or devices described herein, such as the data processing system 102. The method 200 can be or include more or fewer operations. The operations can be performed in any order. By performing the method 200, the data processing system can reduce computational resource consumption and latency using dynamic question routing to different computer models or agentic systems.

At operation 202, the data processing system receives audio data (e.g., streaming audio data during a live call or stored audio data from a previously recorded call) of an inbound call from a caller. The data processing system can receive the audio data as an electronic signal transmitted from a user device, a telephony gateway, or a storage repository, among others. In some implementations, the data processing system can receive the audio data in real time during a live call session or as a pre-recorded file retrieved from a call archive. The data processing system can store the received audio data in memory for subsequent processing. The data processing system can associate metadata with the audio data, such as a call identifier, timestamp, or caller identifier, among others.

At operation 204, the data processing system executes an acoustic feature extraction model using the audio data as input. The data processing system can execute an acoustic feature extraction model to generate one or more acoustic features based on the audio data. The acoustic features can include one or more features selected from the group comprising pitch, intensity, speech rate, spectral flux, energy, pause duration, jitter, shimmer, and/or prosodic contours for each of a plurality of frames of the audio data. In some implementations, the data processing system can segment the audio data into overlapping frames of a predetermined duration, such as 30 seconds per frame with a 10-second overlap, and generate a feature vector for each frame.

At operation 206, the data processing system executes an audio transcription model using the audio data as input to generate a transcript as output. The data processing system can execute a speech recognition engine to convert the audio data into a text transcript of utterances. The transcript can be annotated with information to improve its usefulness, such as by timestamping utterances and segmenting the utterances based on the speaker (e.g., whether the caller or the agent is speaking). In some implementations, the data processing system can merge speaker diarization labels with the transcript to generate a speaker-attributed record. The data processing system can store the transcript in memory and associate it with the corresponding audio data and acoustic features. While this operation 206 is shown as being performed sequentially after operation 204, it need not be. In some implementations, operation 206 is performed first or in parallel with operation 204.

At operation 208, the data processing system identifies a plurality of question strings from a data repository. The data processing system can access a data repository storing a collection of question strings, each mapped to a unique question identifier. In some implementations, the data processing system can retrieve a list of question identifiers relevant to a particular processing context by referencing a mapping data structure or by processing call metadata. The mapping data structure can store associations between question identifiers and processing contexts, such as call type, regulatory requirement, or policy version, among others. The data processing system can determine the applicable processing context for a given call by processing metadata such as call purpose, customer segment, or agent identifier, among others. The data processing system can select question strings whose identifiers correspond to the determined processing context. In some implementations, the data processing system can update the set of question strings dynamically in response to changes in the data repository or mapping data structure. In some implementations, one or more of the questions are not specific to the content of the instant call. For instance, the question would be chosen regardless of what the caller says. In addition or instead, one or more of the questions are predetermined prior to the instant call.

At operation 210, the data processing system queries a mapping data structure. The data processing system can query a mapping data structure comprising mappings of question identifiers to one or more machine learning classification models and one or more large language models using the question identifiers of each of the plurality of question strings. The data processing system can identify a particular machine learning classification model or a particular large language model for each of the plurality of question strings based on the mapping. The data processing system can store the mapping results in memory for subsequent execution.

At operation 212, the data processing system segments the acoustic features and the audio data. The data processing system can segment a set of the one or more acoustic features for one or more of the plurality of frames generated from the audio data and a set of text from the transcript for the one or more of the plurality of frames for each of the plurality of question strings. In some implementations, the data processing system can determine a context for each frame and identify frames whose context matches a context of a question string. The data processing system can generate a segmented set of acoustic features and a segmented set of text for each question string for downstream analysis.

At operation 214, the data processing system executes a model for each of the plurality of question strings. The data processing system can execute the identified particular machine learning classification model or the particular large language model for each of the plurality of question strings using the segmented set of acoustic features and set of text for the question string as input to generate a response to the question string. In some implementations, the data processing system can generate a feature vector by concatenating text embeddings with acoustic features and provide the feature vector to the selected model. The data processing system can receive a binary or categorical output from the model for each question string.

At operation 216, the data processing system generates a structured response object. The data processing system can generate, in memory, a structured response object comprising the generated responses to the question strings. The data processing system can associate each response with the corresponding question identifier and collect metadata such as processing type, model or policy version, and timestamps. In some implementations, the data processing system can store the structured response object in an immutable record log for traceability and regulatory compliance.

Figure 3:
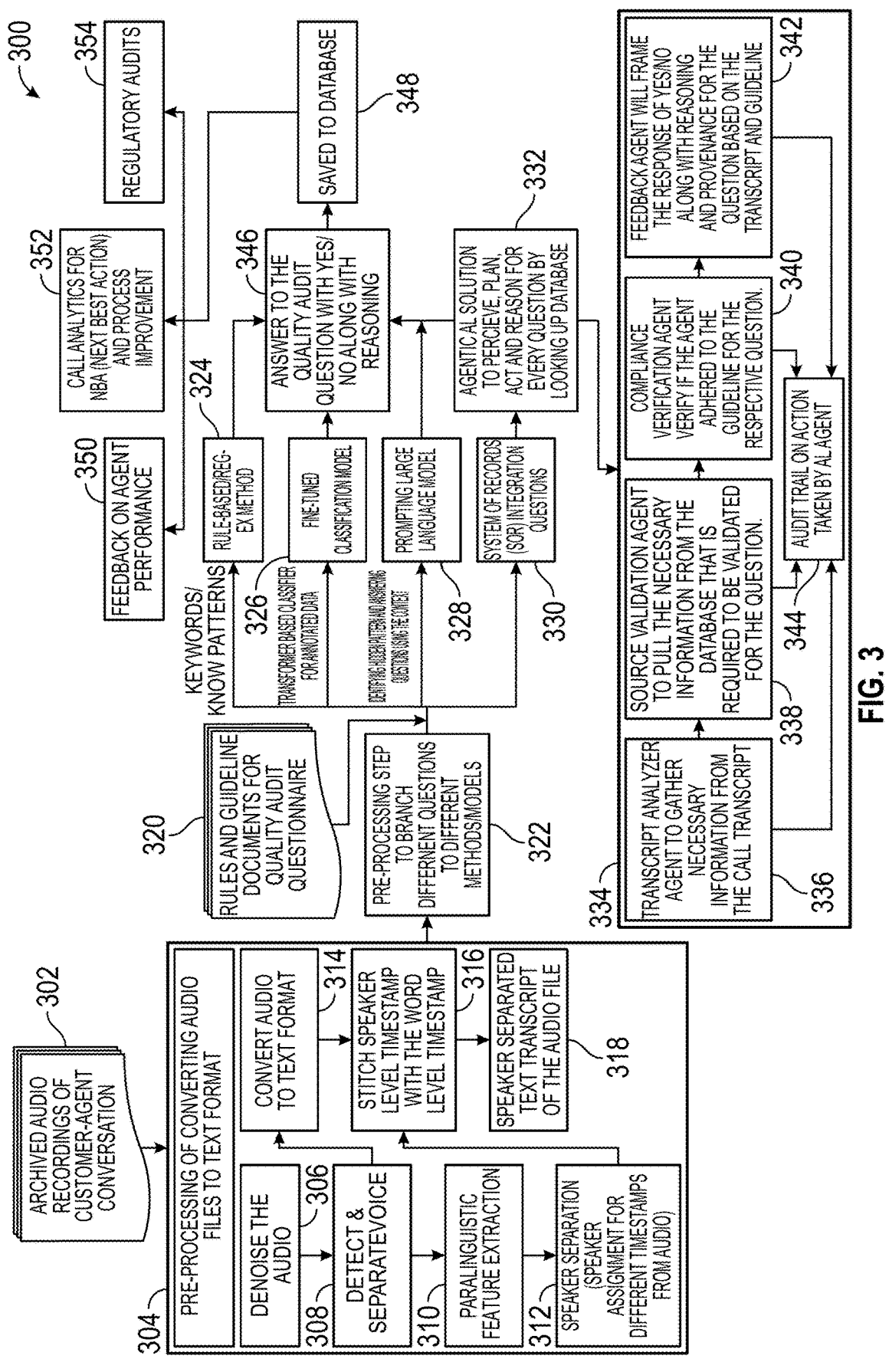
FIG. 3 is a block diagram illustrating an example sequence for improved machine learning-based inbound call monitoring and structured response generation, in accordance with one or more implementations.

Referring now to FIG. 3, illustrated is a block diagram of an example sequence 300 for improved machine learning-based inbound call monitoring and structured response generation, in accordance with one or more implementations. The sequence 300 can be executed, performed, or otherwise carried out by any of the computing systems or devices described herein, such as the data processing system 102. The sequence 300 can be or include more or fewer operations. The operations can be performed in any order. By performing the sequence 300, the data processing system can reduce computational resource consumption using dynamic question routing to different computer models or agentic systems.

The data processing system can receive archived audio of conversation 302 as a stored digital audio file representing a customer-agent interaction. The archived audio of conversation 302 can include, for example, waveform audio file format files (e.g., *.wav) of recorded inbound or outbound calls between a caller and a call agent. The data processing system can retrieve the archived audio of conversation 302 from storage systems or databases in which call recordings are maintained, such as a telephony system archive.

At operation 304, the data processing system can perform pre-processing for audio-to-text conversion using the archived audio of conversation 302. The pre-processing for audio-to-text conversion 304 can include a pipeline that prepares raw audio for transcription and analysis. The data processing system can apply audio denoising, voice activity detection, and format conversion, among others, to improve audio quality and segment speech for accurate transcription. The data processing system can use machine learning-based denoising algorithms and voice activity detection models to enhance the input audio prior to further processing.

At operation 306, the data processing system can denoise raw audio to remove background noise from the audio signal. The data processing system can apply trained denoising models to the raw audio waveform prior to further analysis. In some implementations, the data processing system can use deep learning models trained on noisy and clean audio pairs to attenuate background noise and improve speech clarity, thereby enhancing the clarity of speech. In an example, operation 306 is performed using a library, such as a speaker diarization toolkit (e.g., PYANNOTE by CNRS INNOVATION).

At operation 308, the data processing system can detect and separate speakers in the audio to identify and distinguish between speakers. The data processing system can use speaker diarization algorithms (e.g., as provided as part of PYANNOTE) to assign each speech segment as either call agent or caller. The data processing system can use voice embeddings and conversational turn patterns to separate speakers, enabling assignment of transcript segments to the correct participant.

At operation 310, the data processing system can perform acoustic feature extraction to compute acoustic features from the audio signal. The data processing system can extract features such as pitch, intensity, speech rate, spectral flux, energy, pause duration, jitter, shimmer, and/or prosodic contours, among others. The data processing system can apply signal processing and machine learning models to segmented audio frames, for example, by performing frame-level feature extraction every 30 seconds with 10 seconds' overlap. The acoustic features can provide input for soft-skill and tone analysis. In some implementations, this operation 310 can be performed using an audio analysis toolkit (e.g., PYAUDIOANALYSIS by Theodoros Giannakopoulos and the PYAUDIOANALYSIS community).

At operation 312, the data processing system can perform speaker separation and diarization 312 to assign speaker labels to each segment of the audio. The data processing system can use diarization models and merge speaker labels with automatic speech recognition output to enable coherent, speaker-attributed transcript generation. The data processing system can use timestamped speaker labels merged with automatic speech recognition transcripts to accurately distinguish The data processing system can use timestamped speaker labels merged with automatic speech recognition transcripts to accurately distinguish participants.

At operation 314, the data processing system can convert audio to text format by transcribing audio into text. The data processing system can use an automatic speech recognition engine, such as a transformer-based model, to generate timestamped transcripts with word-level confidence scores. The data processing system can produce a machine-readable transcript for analysis by generating word-level transcripts with confidence scores and timestamps. In some implementations this can be performed by a hosted service, such as WHISPER by OPENAI, AZURE SPEECH by MICROSOFT, others, or combinations thereof.

At operation 316, the data processing system can generate automatic speech recognition speaker-level timestamped text as the output of the automatic speech recognition engine with speaker and time information. The data processing system can combine automatic speech recognition output with diarization results to enable precise mapping of utterances to speakers and times. The data processing system can merge speaker and timestamp data with the transcript to produce text with speaker labels and timestamps.

At operation 318, the data processing system can generate a segregated text transcript as a structured transcript with speaker and time annotations. The data processing system can segment the transcript based on diarization and automatic speech recognition output, for example, by dividing the transcript by speaker turns and time intervals. The segregated text transcript can provide structured input for downstream processing analysis.

At operation 320, the data processing system can access a rules and guideline quality questionnaire as a set of questions mapped to compliance and quality criteria. The data processing system can maintain a registry or database of questions and associated processing types, such as a centralized, versioned question registry. The rules and guideline quality questionnaire can define the criteria for automated call evaluation, for example, by including questions such as "Did the agent perform a proper call opening?" among others.

At operation 322, the data processing system can perform pre-processing to branch questions to different methods by routing questions to the appropriate analysis engine. The data processing system can perform in-memory lookups and apply static mapping logic, for example, by using a static database or table mapping questions to engines. The pre-processing to branch questions to different methods can optimize resource usage and ensure correct analysis type by using rule-based mapping of questions to engines. The data processing system can identify the analysis engine to route the questions based on a mapping between the different engines and the different questions, for example.

At operation 324, the data processing system can execute a criteria-based model as an analysis engine that applies deterministic logic to generate responses or answers to questions. The data processing system can search the transcript for required phrases or structures, for example, by applying Boolean logic and pattern matching for keyword detection. The rule-based method 324 can automate simple yes/no questions, such as pattern matching for language disclosure.

At operation 326, the data processing system can execute a classification model (e.g., a BERT-based model) as a machine learning model trained to answer specific questions. The data processing system can use text embeddings and acoustic features as input to the classification model 326, for example, by using fine-tuned models on labeled datasets. The classification model can provide probabilistic answers to quality questions using learned patterns, such as classifiers trained on call opening, call closing, or empathy detection.

At operation 328, the data processing system can execute a prompting large language model as a large language model prompted with transcript and policy excerpts for nuanced questions. The data processing system can construct prompts with transcript and policy text and instruct the large language model to answer with reasoning. The prompting large language model can generate structured answers and explanations for complex questions, for example, by providing answers with explicit reasoning and provenance.

At operation 330, the data processing system can process system of record validation questions as questions requiring external data validation. The data processing system can delegate control to an agentic artificial intelligence subagent for system of record retrieval and validation. The data processing system can trigger the agentic artificial intelligence subagent for system of record retrieval and validation, for example, by delegating control for questions such as "Is the account active?" or "Is the contact information updated?" among others.

At operation 332, the data processing system can invoke an agentic artificial intelligence subagent for system of record validation as a component that orchestrates multi-step system of record validation. The data processing system can execute a sequential agentic reasoning workflow, for example, by performing transcript analysis, personally identifiable information extraction, system of record application programming interface calls, compliance analysis, and feedback generation. The agentic artificial intelligence subagent for system of record validation 332 can automate complex, multi-source questions.

At operation 334, the data processing system can execute agentic artificial intelligence workflow details as a breakdown of the agentic artificial intelligence subagent's internal processing steps. The data processing system can execute each agent in sequence and log actions, for example, by performing transcript analysis, source validation, compliance verification, feedback generation, and record trail creation. The agentic artificial intelligence workflow details can provide transparency and traceability for agentic artificial intelligence operations.

At operation 336, the data processing system can execute a transcript analyzer agent as a component that processes transcripts to extract relevant entities and information. The data processing system can use named entity recognition models fine-tuned for banking data to identify and tag sensitive information in the transcript, for example, by extracting account numbers, Social Security Numbers, or other personally identifiable information. In some examples, such sensitive information is censored or otherwise obfuscated.

At operation 338, the data processing system can execute a source validation agent as a component that performs authenticated application programming interface calls to backend systems for data validation. The data processing system can format and send application programming interface queries and log responses, for example, by verifying account status, retrieving customer profiles, and performing multi-step validation with transaction logging.

At operation 340, the data processing system can execute a compliance verification agent as a component that applies policy logic to evaluate compliance questions. The data processing system can apply rule logic or prompt a large language model with policy and transcript data, for example, by performing deterministic rule checks or large language model-based reasoning. The compliance verification agent can determine compliance status for each question and generate structured responses with rationale and references.

At operation 342, the data processing system can execute a feedback agent as a component that aggregates results and constructs structured response objects. The data processing system can combine outputs from prior agents and format the results for storage, for example, by compiling processing outcomes, trace metadata, and rationale into a structured response object with metadata.

At operation 344, the data processing system can generate a record trail for actions taken by agentic artificial intelligence agent as a log of all actions, decisions, and supporting data. The data processing system can store metadata, rationale, and references for every action, for example, by maintaining an immutable record log with timestamps, agent identifiers, and rationale in an object storage or search index.

At operation 346, the data processing system can generate an answer to the quality question with reasoning as the structured output for each question. The data processing system can aggregate results from all analysis engines with supporting evidence, for example, by generating a structured response object that includes call identifier, question, binary answer, reasoning, and transcript or audio references.

At operation 348, the data processing system can perform a saved to database operation by storing structured processing results in a persistent database. The data processing system can write structured response objects to a database or log store, for example, by storing processing outcomes for future reference and reporting in an immutable record log.

At operation 350, the data processing system can generate feedback on agent performance as actionable guidance and evaluation for call agents. The data processing system can use processing results to generate feedback and recommendations, for example, by delivering performance scores, coaching tips, and compliance feedback via dashboards or reports to support continuous improvement and agent development.

At operation 352, the data processing system can generate call analytics for process improvement by performing analysis of processing data for operational enhancements. The data processing system can aggregate and analyze processing data across calls, for example, by identifying trends, root causes, and improvement opportunities using analytics dashboards and reporting tools.

At operation 354, the data processing system can generate processing reviews (e.g., audits) by using processing data to demonstrate compliance to regulators. The data processing system can produce and deliver processing reports and logs as required, for example, by exporting record logs and structured outcomes for regulatory review to satisfy requirements for transparency and traceability.

Referring now to FIG. 4, illustrated is a method 400 of training and evaluating a classification model for generating responses to specific questions. The method 400 can be executed, performed, or otherwise carried out by any of the computing systems or devices described herein, such as the data processing system 102. The method 400 can include more or fewer operations. The operations of the method 400 can be performed in any order. By performing the sequence 300, the data processing system can reduce computational resource consumption using dynamic question routing to different computer models or agentic systems.

In a training phase 402, the data processing system can perform model training. The data processing system can receive a set of labeled training data that includes transcript segments and/or acoustic features associated with historical customer-agent calls. The data processing system can select relevant portions of each transcript, such as the first 10 percent or last 10 percent, based on the question being addressed. The data processing system can generate text embeddings from the selected transcript segments and may append paralinguistic features (e.g., acoustic features) such as pitch, intensity, speech rate, spectral flux, energy, pause duration, jitter, shimmer, and/or prosodic contours, among others, to form a feature vector. The data processing system can use the feature vectors and corresponding labels to train a classification model using a supervised learning process.

At operation 406, the data processing system can process a text transcript of the customer agent call. The data processing system can receive audio data of a customer-agent interaction and execute an automatic speech recognition engine to generate a transcript of the utterances. The data processing system can segment the transcript based on speaker labels and timestamps, distinguishing between the customer and the agent. The data processing system can store the segmented transcript in memory for downstream processing. The data processing system can associate the transcript with metadata such as call identifier, timestamp, or agent identifier.

At operation 408, the data processing system can filter the top n percent of the text (e.g., where n is 10, 15, 20, 50, 70, 90, 95 or another value). For instance, the top n percent may be the first n percent of the transcript. In some implementations, the transcript is filtered to remove filler words or other extraneous information to improve the data density of the top n percent. In addition or instead, the top n percent can be padded by including an AI generated summary of the entire text to ensure the remaining context is not lost. The data processing system can determine the total length of the transcript and calculate the number of tokens or utterances corresponding to the top n percent. The data processing system can extract the initial segment of the transcript that represents the top n percent for further analysis. The data processing system can store the filtered segment in memory and associate it with the corresponding question or model input. The data processing system can use the filtered segment as input for embedding generation or feature extraction.

At operation 410, the data processing system can extract acoustic features for the top n percent of the text. The data processing system can identify the audio segment corresponding to the filtered transcript segment. The data processing system can execute a paralinguistic feature extraction model to generate acoustic features from the identified audio segment. The data processing system can select features such as pitch, intensity, speech rate, spectral flux, energy, pause duration, jitter, shimmer, and/or prosodic contours, among others. The data processing system can store the extracted acoustic features in memory and associate them with the corresponding transcript segment and question.

At operation 412, the data processing system can embed the text and append acoustic features. The data processing system can process the filtered transcript segment using a text embedding model to generate a numerical representation of the semantic content. The data processing system can retrieve acoustic features, such as pitch, intensity, speech rate, spectral flux, energy, pause duration, jitter, shimmer, and/or prosodic contours, generated from the corresponding audio segment. The data processing system can concatenate the text embedding with the acoustic features to create a combined feature vector. The data processing system can store the combined feature vector for use in model training or inference. The data processing system can associate the feature vector with the relevant question or classification task.

At operation 414, the data processing system can train a classification model. The data processing system can use the combined feature vectors and corresponding labels as input to a supervised learning algorithm. The data processing system can optimize the model parameters to minimize classification error on the training data. The data processing system can validate the trained model using a separate validation dataset to assess performance. The data processing system can store the trained classification model in memory for use in subsequent inference tasks.

At operation 416, the data processing system can generate a trained classification model for a specific question. The data processing system can associate the trained model with the question for which it was developed. The data processing system can store the model in a model registry or memory structure that maps questions to corresponding models. The data processing system can update the registry as new models are trained or existing models are retrained. The data processing system can retrieve the appropriate model from the registry during inference based on the question being evaluated.

In an inference phase 404, the data processing system can use the trained machine learning classification model to generate a response for the specific question for which the machine learning classification model was trained. To do so, subsequent to training the machine learning classification model (e.g., iteratively or repeatedly training the machine learning classification model until the machine learning classification model is accurate to a threshold), the data processing system can generate acoustic features of audio data of a new inbound call. At operation 418, the data processing can receive or generate a new call transcript of the inbound call. At operation 420, the data processing system can extract the relevant segment of the transcript, such as the top n percent (e.g., the beginning 10%) for answering the question for which the machine learning classification model was trained to generate responses. At operation 422, the data processing system can generate acoustic features for the extracted top n percent by processing the corresponding audio segment using an acoustic feature extraction model. The data processing system can generate acoustic features such as pitch, intensity, speech rate, spectral flux, energy, pause duration, jitter, shimmer, and/or prosodic contours, among others, for the selected portion of the audio data. At operation 424, the data processing system can embed the text into an embedding and append acoustic features to the embedding to generate a feature vector.

At operation 426, the data processing system can make a prediction using the trained machine learning classification model (e.g., a machine learning model trained to generate a response as to whether a call agent had a proper call opening for an inbound call). The data processing system can identify the feature vector generated from the new call transcript and associated acoustic features. The data processing system can input the feature vector into the trained classification model to obtain a prediction output. The data processing system can interpret the prediction as a binary or categorical answer to the question. The data processing system can store the prediction result in memory for inclusion in the structured processing record.

At operation 428, the data processing system can generate a probability score if the call agent had a proper call opening. The data processing system can use the output of the trained classification model to determine the likelihood that the agent performed a proper call opening based on the input features. The data processing system can represent the probability score as a numerical value between zero and one. The data processing system can associate the probability score with the corresponding call identifier and question. The data processing system can store the probability score in memory for reporting, quality assurance, or downstream analytics.

Referring now to FIGS. 5A and 5B, illustrated are diagrams of a call analytics support user interface 500, in accordance with some implementations. The call analytics support user interface 500 can present a structured tabular view of post-call processing results, including columns for file number, file path, call duration, transcript, summary, and a series of questions with corresponding responses and rationales.

The call analytics support user interface 500 can be a graphical user interface that may display structured results of automated quality processing of voice interactions. The call analytics support user interface 500 can present structured processing results for post-call analysis, which may include call metadata, questions, responses, and supporting rationale. In some implementations, the call analytics support user interface 500 can display a tabular view in which each row corresponds to a call and each column can include data such as a file number, file path, call duration, transcript summary, and a series of question responses. The question responses may include binary answers such as Yes or No, supporting reasoning, and/or references to transcript snippets or audio segments, among others. The call analytics support user interface 500 can present the structured output generated by the automated post-call processing pipeline, which may include a call identifier, question, binary answer, reasoning or provenance, and relevant transcript or audio references.

The call analytics support user interface 500 can provide end-users with access to transparent and traceable results for each analyzed call. In some implementations, the call analytics support user interface 500 can enable users to review compliance and quality metrics for ongoing or recently completed calls. The structured processing data displayed by the call analytics support user interface 500 can be generated by the data processing system executing a post-call processing pipeline that includes audio preprocessing, question routing, analysis engine execution, and structured logging. The interface may aggregate outputs from multiple analysis engines, such as rule-based engines, machine learning classification models, large language models, and agentic-artificial intelligence subagents, among others. The call analytics support user interface 500 can display each call's responses to questions, supporting rationale, and references to transcript or audio segments.

In some implementations, the call analytics support user interface 500 can present the output from a large language model as a structured response that includes the call identifier, the question, a categorical answer selected from Yes, No, No Data Found, or Not Applicable, and a reasoning string that proves the provenance from the actual transcript. The structured output displayed by the call analytics support user interface 500 can be generated by the data processing system in accordance with instructions provided to the large language model. The data processing system may generate, in memory, a structured response object comprising the generated responses to the question strings. In some implementations, the data processing system can concatenate a segmented set of acoustic features and a set of text for a question string generated from the inbound call into a feature vector or prompt, and may provide the feature vector or prompt into a particular machine learning classification model or a particular large language model.

The call analytics support user interface 500 can display processing results generated by machine learning classification models trained to generate responses for specific question strings. In some implementations, the data processing system can generate an embedding for each extracted portion of a plurality of training transcripts, label each embedding with a binary value corresponding to an answer to the question string, and train the machine learning classification model using the labeled embeddings. The call analytics support user interface 500 can present processing results that include immutable record logging of every decision, including metadata such as question identifier, processing type, policy or model version, timestamp, utterance text, audio reference, and rationale. The interface may thereby provide a transparent and traceable record of automated quality processing for each voice interaction.

Referring now to FIG. 6, illustrated is a method 600 for real-time call analytics and agent assistance. The method 600 can be executed, performed, or otherwise carried out by any of the computing systems or devices described herein, such as the data processing system 102, shown and described with reference to FIG. 1. The method 600 can include more or fewer operations. The operations can be performed in any order. By performing the method 600, the data processing system can reduce computational resource consumption for automated call feedback.

At operation 602, the data processing system receives audio data of an inbound call. The data processing system can receive the audio data as a digital signal transmitted from a user device, a telephony gateway, or a storage repository, among others. The data processing system can associate metadata with the audio data, such as a call identifier, timestamp, or caller identifier, among others. In some implementations, the data processing system can receive the audio data in real time during a live call session. The data processing system can store the received audio data in memory for subsequent processing.

At operation 604, the data processing system executes an acoustic feature extraction model to generate first acoustic features from the audio data. The data processing system can segment the audio data into frames of a predetermined duration, such as 30 seconds per frame with a 10-second overlap, and process each frame to extract acoustic features. The acoustic features can include pitch, intensity, speech rate, spectral flux, energy, pause duration, jitter, shimmer, and/or prosodic contours, among others. The data processing system can generate a feature vector for each frame, where each feature vector represents the computed acoustic features for that frame.

At operation 606, the data processing system can execute an audio transcription model using the audio data to generate a first transcript. The data processing system can apply an automatic speech recognition engine, such as a transformer-based model, to convert the audio data into a transcript of utterances. The transcript can include timestamped and speaker-attributed segments, where each utterance is aligned with corresponding audio frames. The data processing system can merge speaker diarization labels with the transcript to generate a coherent record of the conversation. The data processing system can store the transcript in memory in association with the corresponding audio data and acoustic features.

At operation 608, the data processing system can store the first transcript and the first one or more acoustic features (e.g., the embeddings or feature vectors of the respective frames of the first transcript or the first time period of the first transcript) in a short-term memory cache. The short-term memory cache can provide rapid access to recent conversation context for real-time analytics. The data processing system can index the stored transcript and acoustic features by call identifier, timestamp, and/or speaker label, among others. In some implementations, the data processing system can update the short-term memory cache incrementally as new audio data and transcripts are generated during the inbound call.

At operation 610, the data processing system can retrieve historical call data. The data processing system can query a long-term memory cache or database using an identifier of the caller to access historical call data generated from previous inbound calls by the caller. The historical call data can include prior transcripts, account history, processing outcomes, or compliance records, among others. The data processing system can retrieve the relevant historical data and store it in memory (e.g., in the short-term memory cache) for use during the current call session. In some implementations, the data processing system can use the historical call data to inform agent guidance, compliance checks, or personalized recommendations. In some cases, the data processing system can retrieve account data for an account or profile of the caller.

At operation 612, the data processing system can determine a first intent of the inbound call. The data processing system can process the first transcript using a large language model or a classification model to generate an intent label for the call. The intent can correspond to a category, such as fraud, dispute, account inquiry, or lost card, among others. The data processing system can use structured prompt templates or zero-shot classification techniques to map the transcript to a predefined intent ontology. The determined intent can be stored in memory and used to guide subsequent question generation and agent assistance.

At operation 614, the data processing system can determine states of the caller and the call agent. The data processing system can execute a computing model using the first one or more acoustic features to generate a first set of states for the caller and the call agent, such as emotional tone or conversational engagement. In some implementations, the data processing system can concurrently execute a large language model using the first transcript as input to generate a second set of states for the caller and the call agent, such as sentiment or intent alignment. The data processing system can associate the determined states with corresponding timestamps and speakers in the transcript.

At operation 616, the data processing system can generate a first question string for presentation. The data processing system can identify a set of candidate question strings by querying a data repository containing questions mapped to specific call scenarios. The data processing system can evaluate the historical call data, the intent of the inbound call, and the states of the caller and the call agent to select one or more candidate question strings. The data processing system can apply a scoring function or matching algorithm to rank the candidate question strings and select the highest-ranked question string for presentation. The data processing system can transmit the selected question string to a computing device accessed by the call agent for presentation during the call.

At operation 618, the data processing system can execute the acoustic feature extraction model to generate second acoustic features from the audio data. The data processing system can process audio data of a second time period of the inbound call subsequent to the first time period, segmenting the audio data into frames and extracting acoustic features as described for the first time period. The data processing system can store the second one or more acoustic features in memory (e.g., in the short-term memory cache) for downstream analysis. In parallel, the data processing system can execute the audio transcription model using the audio data to generate a second transcript of utterances from the second time period. The data processing system can align the second transcript with the corresponding acoustic features and update the short-term memory cache with the new data.

At operation 620, the data processing system can determine whether a criterion is satisfied. The data processing system can identify an answer to the first question string from the second time period by processing the second transcript and/or the second one or more acoustic features. The data processing system can compare the identified answer to a predefined criterion, such as compliance with a guideline or completion of a required action. The data processing system can use rule-based logic, machine learning models, or large language models to evaluate whether the criterion is met. The result of the evaluation can be stored in memory for use in subsequent decision-making.

At operation 622, the data processing system can generate a second question. Responsive to determining that the answer to the first question string does not satisfy the criterion, the data processing system can generate a second question string for presentation at the computing device in place of the first question string. The data processing system can use the second transcript, the second one or more acoustic features, and the answer to the first question string to select or generate the second question string. The data processing system can transmit the second question string to the computing device accessed by the call agent for presentation during the call. The process of question generation and evaluation can be repeated iteratively until the criterion is satisfied.

At operation 624, the data processing system can generate a structured data structure. The data processing system can aggregate the generated responses to the question strings, the determined intents, the states of the caller and the call agent, and any compliance outcomes into a structured data structure in memory. The structured data structure can include metadata such as call identifier, timestamps, question identifiers, answers, rationale, and references to transcript or audio segments, among others. The data processing system can store the structured data structure in an immutable record log or database for traceability and regulatory compliance. The structured data structure can be retrieved for reporting, review, or downstream analytics.

Figure 7:
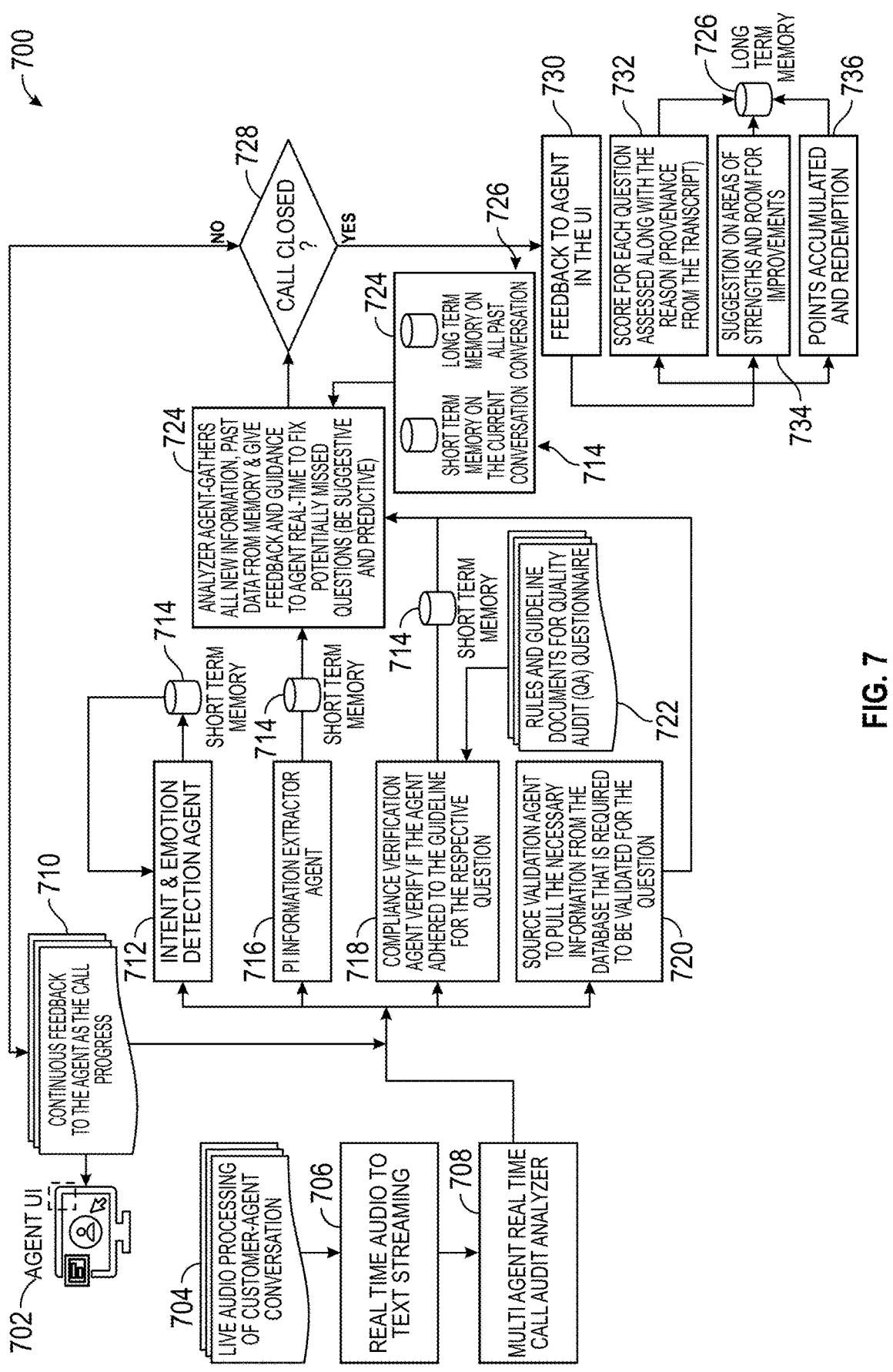
FIG. 7 is a flow diagram illustrating an example sequence for real-time call analytics support method, in accordance with one or more implementations.

Referring now to FIG. 7, illustrated is a flow diagram of an example sequence 700 for a real-time call analytics support method. A data processing system (e.g., the data processing system 102, shown and described with reference to FIG. 1) can perform the operations of the sequence 700. The sequence 700 can include more or fewer operations. The operations can be performed in any order. By performing the sequence 700, the data processing system can reduce computational resource consumption using dynamic question routing to different computer models or agentic systems.

The data processing system can generate and present an agent user interface 702 that may be accessible by a call agent during a live customer interaction. The agent user interface 702 can receive continuous updates from backend analytics components, such as real-time feedback, transcript updates, and actionable guidance generated by the data processing system. The data processing system can transmit streaming feedback, question prompts, compliance alerts, and emotion-based coaching tips to the agent user interface 702 as the call progresses. In some implementations, the data processing system can generate scored evaluations for each applicable guideline, highlight any identified gaps or violations, and assign an overall performance score for the call, which may be rendered by the agent user interface 702 in a user-friendly format. The agent user interface 702 can display recommended questions, compliance reminders, and coaching points, such as prompts to adjust tone or reminders to ask specific questions, based on the analysis performed by the data processing system.

The data processing system can receive a live audio conversation input 704 as a real-time audio stream of a conversation between a customer and a call agent. The live audio conversation input 704 can be captured using a telephony gateway, for example, Amazon Chime SDK, and transmitted to the data processing system via telephony integration and streaming protocols. The data processing system can receive the audio data through a persistent WebSocket connection, such as to Azure Cognitive Services for audio streaming. The received audio data can provide the raw audio input for downstream processing and analytics, including transcription, feature extraction, and real-time analysis. The data processing system can associate the live audio conversation input 704 with relevant session metadata, such as call identifiers or timestamps, for subsequent processing.

The data processing system can execute real-time audio to text streaming 706 by converting live audio input into incremental text transcripts. The data processing system can apply a speech-to-text engine, such as MICROSOFT AZURE Speech-to-Text (STT), to the audio data, generating partial and final transcription outputs as the call progresses. The real-time audio to text streaming 706 can use neural acoustic models and language models, for example, by employing a pipeline with voice activity detection, a Conformer architecture, and a beam search decoder. The data processing system can generate live transcripts for further analysis by downstream agents, such as intent and emotion detection or compliance verification. The generated transcripts can be timestamped and attributed to speakers for accurate alignment with the audio data.

The data processing system can execute a multi-agent real-time call analyzer 708 that may orchestrate multiple analytic and compliance agents for live call analysis. The multi-agent real-time call analyzer 708 can process live transcript data, coordinate agent tasks, and synthesize analytics for agent assistance. The data processing system can invoke and manage multiple agents, such as an intent and emotion detection agent, a compliance verification agent, and a source validation agent, among others. Each agent can perform a specific analytic or compliance function, and the multi-agent real-time call analyzer 708 can aggregate their outputs to generate actionable feedback and guidance for the call agent. The data processing system can use the outputs of the multi-agent real-time call analyzer 708 to update the agent user interface 702 and to maintain a real-time record trail of the call.

At operation 710, the data processing system can generate continuous frontend transcript updates for the agent user interface 702 by streaming live transcript changes to the agent's interface. The data processing system can use streaming protocols, such as WebSocket or Kafka-based streaming, to push transcript changes to the agent user interface 702 as new utterances are transcribed. The resulting live transcript can be published to a streaming bus and presented via a real-time dashboard, ensuring that the agent has up-to-date visibility into the ongoing conversation. The data processing system can store the first transcript of the audio data in a short-term memory cache and update the transcript incrementally as the call progresses. The continuous frontend transcript updates for agent user interface 710 can enable the agent to monitor the conversation context and respond appropriately in real time.

The data processing system can execute an intent and emotion detection agent 712 that may classify call intent and detect emotional tone from transcript and audio features. The intent and emotion detection agent 712 can use structured prompt templates, acoustic feature extraction, and large language model-based sentiment analysis to generate intent and emotion labels. For intent detection, the agent can use a zero-shot large language model classifier, and for emotion detection, the agent can process both paralinguistic and semantic features, for example, by using PyAudioAnalysis or Librosa for acoustic features. The data processing system can determine a first intent of the inbound call based on the first transcript generated from the inbound call, and can determine states of the caller and the call agent based on the first one or more acoustic features. The detected intents and emotions can be stored in short-term memory and used to inform agent guidance and compliance checks.

The data processing system can use data storage 714 to persist transcripts, features, agent outputs, and record logs for use by analytics agents and for compliance traceability.

The data storage 714 can include one or more databases or memory caches, such as a short-term memory cache, long-term memory, or an immutable record log. The data processing system can store the first transcript of the audio data and the first one or more acoustic features from the first time period in a short-term memory cache. In some implementations, the data storage 714 can use in-memory databases, persistent object storage, or search indexes, for example, Elasticsearch, object storage, or a vector database, to store and retrieve data as needed. Every decision generated by the data processing system can be recorded in a durable store, along with metadata such as question identifier, processing type, policy or model version, timestamp, utterance text, audio reference, and rationale.

The data processing system can execute an information extractor agent 716 that may extract personally identifiable information and other entities from the transcript. The information extractor agent 716 can use named entity recognition pipelines, domain-specific models, and pattern matching techniques, such as regular expression rules, to identify and tag sensitive entities for use in compliance and source validation. The agent can monitor the transcript for mentions of personally identifiable information, such as account numbers, names, or dates of birth, among others. The data processing system can detect the identifier of the caller using the information extractor agent 716 and store the extracted entities in memory for downstream processing. The extracted personally identifiable information can be used by the compliance verification agent and the source validation agent to perform further validation and compliance checks.

The data processing system can execute a compliance verification agent 718 that may check adherence to compliance guidelines using transcript and contextual data. The compliance verification agent 718 can retrieve quality assurance guidelines, reason over transcript context, and annotate compliance events using retrieval-augmented generation and large language model-based reasoning. The agent can evaluate compliance, log violations, and provide real-time feedback to the agent user interface 702. The compliance verification agent 718 can reference a quality assurance checklist and maintain a record trail of compliance events by storing them in short-term memory. The data processing system can use the outputs of the compliance verification agent 718 to generate actionable feedback and compliance alerts for the call agent.

The data processing system can execute a source validation agent 720 that may validate personally identifiable information and customer information against backend systems of record. The source validation agent 720 can format and send authenticated application programming interface queries to banking databases for account status, risk flags, or other attributes, among others. The data processing system can retrieve historical call data generated from historical inbound calls by the caller using an identifier of the caller to query a long-term memory cache. The source validation agent 720 can log application programming interface responses with transaction identifiers and cross-reference quality assurance guidelines to validate whether the agent has correctly communicated validated information to the customer. The outputs of the source validation agent 720 can be used by the data processing system to confirm customer identity and retrieve relevant data for compliance and processing.

The data processing system can execute a quality assurance guidelines retrieval process 722 that may fetch relevant quality assurance guidelines for compliance verification.

The quality assurance guidelines retrieval 722 can use embedding-based similarity search or direct lookup from a versioned registry, for example, by querying a vector store or policy database for guideline retrieval. The data processing system can query a vector database using an embedding generated from the first intent and the first one or more acoustic features to identify a set of guidelines relevant to the first transcript. The retrieved guidelines can provide the compliance verification agent 718 with up-to-date policy and procedural requirements for evaluating compliance during the call. The quality assurance guidelines retrieval 722 can enable the data processing system to dynamically adapt compliance checks to the evolving conversation context.

The data processing system can generate and update a short-term memory 724 (e.g., the short-term memory cache) as a memory cache that stores recent transcript segments, detected intents, emotions, and compliance events. The short-term memory 724 can be implemented as an in-memory database for current call context, capturing the most recent conversation context for real-time reasoning and feedback generation. The data processing system can store the first transcript of the audio data and the first one or more acoustic features from the first time period in the short-term memory cache. The short-term memory 724 can be updated continuously as new data is processed by the analytics agents, and can be indexed by timestamp and speaker. The short-term memory 724 can provide context for real-time analytics and agent guidance.

The data processing system can maintain a long-term memory 726 (e.g., the long-term memory cache) as a persistent data store containing historical customer data, prior transcripts, and processing outcomes. The long-term memory 726 can be implemented as a database or object storage for customer history, and may include prior transcripts, account history, and previous processing outcomes, among others. The data processing system can retrieve historical call data generated from historical inbound calls by the caller using an identifier of the caller to query the long-term memory cache. The long-term memory 726 can provide historical context for enhanced reasoning and compliance checks, and can be queried using customer identifiers or embeddings for relevant data retrieval. The data processing system can use the long-term memory 726 to inform agent guidance and compliance verification during live calls.

The data processing system 102 can execute a call end decision 728 by monitoring call metadata and/or transcript signals to determine when a live call session has concluded. The data processing system 102 can detect a call closure event by identifying a telephony disconnect signal, a conversational endpoint, or a period of extended silence, among others. Upon detection of the call closure event, the data processing system 102 can trigger the analyzer agent to exit its live loop and initiate a final summarization pass. The data processing system 102 can generate a structured summary of the call using records containing the intents and states of the speakers of the inbound call.

The data processing system 102 can generate feedback to agent user interface 730 by delivering real-time or post-call feedback and recommendations to the agent's interface. The data processing system 102 can stream actionable suggestions, compliance alerts, and/or coaching tips to the agent user interface 108 using streaming protocols such as WebSocket or by updating user interface notifications. The analyzer agent can continuously generate actionable feedback, identify missed questions, suggest corrective actions, and stream guidance to the agent user interface 108 as the call progresses or after call completion.

The data processing system 102 can generate a score for each applicable quality assurance guideline 732 by computing a quantitative or qualitative evaluation of agent adherence to each quality assurance guideline. The data processing system 102 can analyze the transcript, agent actions, and compliance events against quality assurance criteria to generate numeric scores or pass/fail indicators for each compliance criterion, among others. The user interface 108 can present scored evaluations for each applicable guideline, highlight any identified gaps or violations, and assign an overall performance score for the call.

The data processing system 102 can generate a suggestion or summary of improvement areas 734 by producing a set of actionable recommendations or a summary report highlighting areas where the agent can improve. The analyzer agent can generate coaching points, booster messages, or links to training materials based on performance data and compliance outcomes. The data processing system 102 can assign training videos or generate personalized coaching tips for the agent based on the overall performance of the agent, and can stream such content to the agent user interface 108.

The data processing system 102 can perform policy compliance and processing report storage 736 by storing structured compliance reports and record logs in a persistent storage solution. The data processing system 102 can archive all processing outcomes and supporting data in durable, versioned storage systems and/or structured data formats, such as Elasticsearch, object storage, or structured record logs, among others. The data processing system 102 can generate a structured summary of the call using the records containing the intents and states of the speakers of the inbound call, and can ensure traceability, transparency, and regulatory compliance by recording every decision in a durable store.

Referring now to FIG. 8, illustrated is a diagram of an example user interface 800 for agent improvement feedback, in accordance with one or more implementations. The user interface 800 can include at least one current call checklist section 802 and at least one last interaction summary section 804. A data processing system (e.g., the data processing system 102, shown and described with reference to FIG. 1) can generate the user interface 800.

The user interface 800 can be a graphical user interface that may present agent improvement feedback. The user interface 800 can present feedback, guidance, and performance data to a call agent, including actionable insights and improvement resources. In some implementations, the user interface 800 can be a web-based dashboard or an application screen presented to call center agents after a call. The user interface 800 can present structured feedback, checklist completion, and improvement resources to the agent. The user interface 800 can receive structured data and feedback from backend analytics engines and may present such data in a format that highlights areas of improvement, checklist progress, and prior call summaries. For example, the user interface 800 may display a checklist of required call actions, agent notes, and a summary of the last customer interaction, and may provide access to short training videos. The user interface 800 can display real-time feedback, recommended questions, compliance reminders, and emotion-based coaching tips to live agents. The user interface 800 can present scored evaluations, highlight gaps or violations, and assign overall performance scores post-call. In some implementations, the user interface 800 can display training video assignments for areas of improvement based on call performance. The user interface 800 can display a video stream to the computing device of the call agent based on the call performance score satisfying a criterion corresponding to the video stream. The user interface 800 can present a recommendation for the call agent to adjust a tone of speech for the inbound call responsive to the first one or more acoustic features satisfying a set of recommendation criteria, and may transmit the recommendation to the computing device of the call agent. The user interface 800 can present a structured summary of the call using records containing the intents and states of the speakers of the inbound call.

The current call checklist section 802 can be a display area that may show the agent's progress on required call actions and processing requirements. The current call checklist section 802 can present a structured list of required call actions, processing requirements, and completion status for the current interaction. For example, the current call checklist section 802 may display a checklist with items such as greeting, verification, customer objective, special offer, or goodbye message, among others, each with completion indicators. The current call checklist section 802 can display which procedural and compliance steps have been completed, may provide feedback on quality, and may indicate outstanding requirements. The current call checklist section 802 can be populated by backend analytics engines that process call transcripts, acoustic features, and compliance criteria, updating the checklist in real time or post-call. For example, the checklist may be updated as the agent completes each required action, and feedback such as "Great job!" may be displayed for completed items. The current call checklist section 802 can present checklist completion, call quality, call agent notes, score card, and last interaction details as structured outputs for agent feedback. The current call checklist section 802 can present a structured summary of the call using the records containing the intents and states of the speakers of the inbound call. The current call checklist section 802 can present a recommendation for the call agent to adjust a tone of speech for the inbound call responsive to the first one or more acoustic features satisfying a set of recommendation criteria, and may transmit the recommendation to the computing device of the call agent. The current call checklist section 802 can display a video stream to the computing device of the call agent based on the call performance score satisfying a criterion corresponding to the video stream.

The last interaction summary section 804 can be a display area that may show details of the agent's previous interaction with a specific customer. The last interaction summary section 804 can provide a summary of the most recent prior call with the customer, including compliance performance and call outcomes. For example, the last interaction summary section 804 may display a summary indicating which requirements were met or missed, call date and duration, or a brief description of the call resolution, among others. The last interaction summary section 804 can inform the agent of historical compliance, may highlight missed requirements, and may provide context for the current call. The last interaction summary section 804 can be generated by retrieving historical call data, processing results, and compliance records from backend systems, and presenting such data in a concise format for agent review. For example, the last interaction summary section 804 may list missed requirements and provide a summary of the last call's resolution, which may assist agents in preparing for the current interaction. The last interaction summary section 804 can present data from long-term memory, which may include prior transcripts, account history, or previous processing outcomes, among others. The real-time system can leverage historical processing data to inform agent guidance and compliance checks. The last interaction summary section 804 can present a structured summary of the call using the records containing the intents and states of the speakers of the inbound call. The last interaction summary section 804 can present results of querying a vector database using an embedding generated from the first intent and the first one or more acoustic features to identify a set of guidelines relevant to the first transcript, determining a deficiency in the first transcript in satisfying the set of guidelines, and generating the first question to correspond to satisfy the set of guidelines using a large language model. The last interaction summary section 804 can present account data associated with the caller retrieved from a data structure in the long-term memory cache, and may generate the first question string for presentation at the computing device accessed by the call agent based further on the account data.

Referring now to FIG. 9, illustrated is a diagram of a call processing summary user interface 900 for displaying a detailed summary of a call processing, in accordance with one or more implementations. The call processing summary user interface 900 can include at least one current call checklist section 902, at least one agent notes section 904, at least one score card section 906, and at least one last interaction section 908. A data processing system (e.g., the data processing system 102, shown and described with reference to FIG. 1) can generate the call processing summary user interface 900.

The call processing summary user interface 900 can include at least one current call checklist section 902. The current call checklist section 902 can present a structured list of processing requirements, checklist items, and completion indicators for a given call. The current call checklist section 902 can display checklist items such as greeting, processing requirements, customer objectives, special offers, or goodbye message, among others, each with a completion status and rating. The current call checklist section 902 can enable visualization of which processing requirements and procedural steps were completed during the call, providing a transparent record of compliance and agent performance. The current call checklist section 902 can display checklist items and completion status by retrieving structured processing results generated by the automated post-call processing system and mapping each requirement to a visual indicator. Checklist items can be marked as "Completed" or with star ratings based on processing engine outputs. The structured output can include call identifier, question, binary answer such as Yes or No, reasoning or provenance, and relevant transcript or audio references, among others. In some implementations, the current call checklist section 902 can display data generated by the server executing the task agent in memory, where the structured response object comprises the generated responses to the question strings.

The call processing summary user interface 900 can include at least one agent notes section 904. The agent notes section 904 can display freeform or structured notes entered by the call agent or generated by the system regarding the call. The agent notes section 904 can present a text field summarizing customer issues, resolutions, or any special actions taken during the call, among others. The agent notes section 904 can enable documentation of contextual details, agent observations, and call outcomes that may not be fully captured in structured processing fields. The agent notes section 904 can display notes by retrieving agent-entered data or automatically generated summaries from the processing system, and presenting them in a dedicated area of the user interface. Notes may be auto-populated based on detected call events or manually entered by the agent post-call. In some implementations, the agent notes section 904 can display data generated by the server executing the task agent in memory, where the structured response object comprises the generated responses to the question strings, or by the server generating a structured summary of the call using the records containing the intents and states of the speakers of the inbound call.

The call processing summary user interface 900 can include at least one score card section 906. The score card section 906 can present a summary of the agent's performance on the call, including metrics such as requirements met, missed items, or actionable feedback, among others. The score card section 906 can display information such as the number of requirements met, missed requirements, and recommendations for improvement, for example, by generating feedback based on processing outcomes. The score card section 906 can provide agents and supervisors with an at-a-glance evaluation of call quality and compliance, supporting continuous improvement and targeted coaching. The score card section 906 can display performance metrics by aggregating processing results and compliance checks, and formatting them into a concise summary with recommendations for improvement. In some implementations, the score card section 906 can display data generated by the server executing a call performance score for the call agent of the call based on states of the caller and the call agent from the structured memory, or by the server generating a structured summary of the call using the records containing the intents and states of the speakers of the inbound call.

The call processing summary user interface 900 can include at least one last interaction section 908. The last interaction section 908 can display details of the most recent prior customer interaction, including call metadata and outcomes, among others. The last interaction section 908 can present information such as the date and time of the last inbound call, length of the call, and a summary of the prior issue and resolution, among others. The last interaction section 908 can enable agents to quickly review historical context and outcomes for the customer, supporting continuity of service and informed decision-making. The last interaction section 908 can retrieve and display historical call data by querying the long-term memory cache or database for the customer's previous interactions and presenting relevant details in the user interface. The system can access stored processing summaries and call metadata to populate the last interaction section. In some implementations, the last interaction section 908 can display data generated by the server executing the task agent using an identifier of the caller to query a long-term memory cache, where the historical call data is generated from historical inbound calls by the caller, or by the server retrieving account data associated with the caller from a data structure in the long-term memory cache.

Referring now to FIG. 10, illustrated is a diagram of a call quality dashboard user interface 1000 for a call agent, in accordance with one or more implementations. The call quality dashboard user interface 1000 can include at least one average call quality summary section 1002, at least one positive performance feedback section 1004, and at least one areas for improvement section 1006. A data processing system (e.g., the data processing system 102, shown and described with reference to FIG. 1) can generate the call quality dashboard user interface 1000.

The call quality dashboard user interface 1000 can include at least one average call quality summary section 1002. The average call quality summary section 1002 can generate a summary of a call agent's average call quality score over a defined period. The average call quality summary section 1002 can display aggregate performance metrics and summary statistics to the call agent. In some implementations, the average call quality summary section 1002 can present a banner that displays a message such as "Great Job! Your average call quality is 90%." The average call quality summary section 1002 can present scored evaluations, highlight gaps or violations, and assign overall performance scores post-call. The average call quality summary section 1002 can display the agent's average call quality by aggregating and presenting the results of automated post-call or real-time analytics. The system can compute average scores based on structured processing results and display the scores in the dashboard. The structured output can include a call identifier, a question, a binary answer such as Yes or No, a rationale string that provides provenance, and references to relevant transcript or audio segments, among others.

The call quality dashboard user interface 1000 can include at least one positive performance feedback section 1004. The positive performance feedback section 1004 can generate and display feedback that highlights specific strengths or positive behaviors demonstrated by the call agent 140, as determined by automated analysis of call transcripts and acoustic features. The positive performance feedback section 1004 can reference structured processing outputs, detected positive behaviors, and system-generated recommendations to provide actionable, affirmative feedback to the call agent 140 based on compliance with best practices. For example, the positive performance feedback section 1004 can display messages such as "Your greeting is warm and welcoming. Great job!" or "Here is what you do well: . . . " in accordance with the outputs of the automated analysis. In some implementations, the positive performance feedback section 1004 can deliver coaching points and booster messages, such as "You're doing good so far," to the call agent 140 during or after a call session. The positive performance feedback section 1004 can reference the use of acoustic features along with text embeddings to generate informed decisions in quality processing processes, for example, by combining pitch, intensity, and speech rate with transcript-derived features to detect and affirm positive agent actions.

The call quality dashboard user interface 1000 can include at least one areas for improvement section 1006. The areas for improvement section 1006 can identify and display specific opportunities for the call agent 140 to enhance performance, based on automated quality analytics derived from structured processing data. The areas for improvement section 1006 can present targeted suggestions, reminders, or training prompts to the call agent 140 based on detected deficiencies or missed processing requirements. For example, the areas for improvement section 1006 can display improvement suggestions such as "Remember to confirm the customer information in the first 30 seconds of the call" or "Here is where you can level up: . . . " as determined by the automated analysis. The areas for improvement section 1006 can reference missed processing requirements and compliance gaps to generate and display targeted feedback or training assignments in the dashboard. In some implementations, the areas for improvement section 1006 can display structured feedback reports that are surfaced to the call agent 140 via the agent user interface, including scored evaluations for each applicable guideline, highlighted gaps or violations, and assigned overall performance scores for the call. The areas for improvement section 1006 can further provide actionable coaching points to reinforce strengths and suggest areas for improvement, and may assign training videos for the call agent 140 to review based on overall performance, thereby highlighting areas of improvement.

Figure 11:
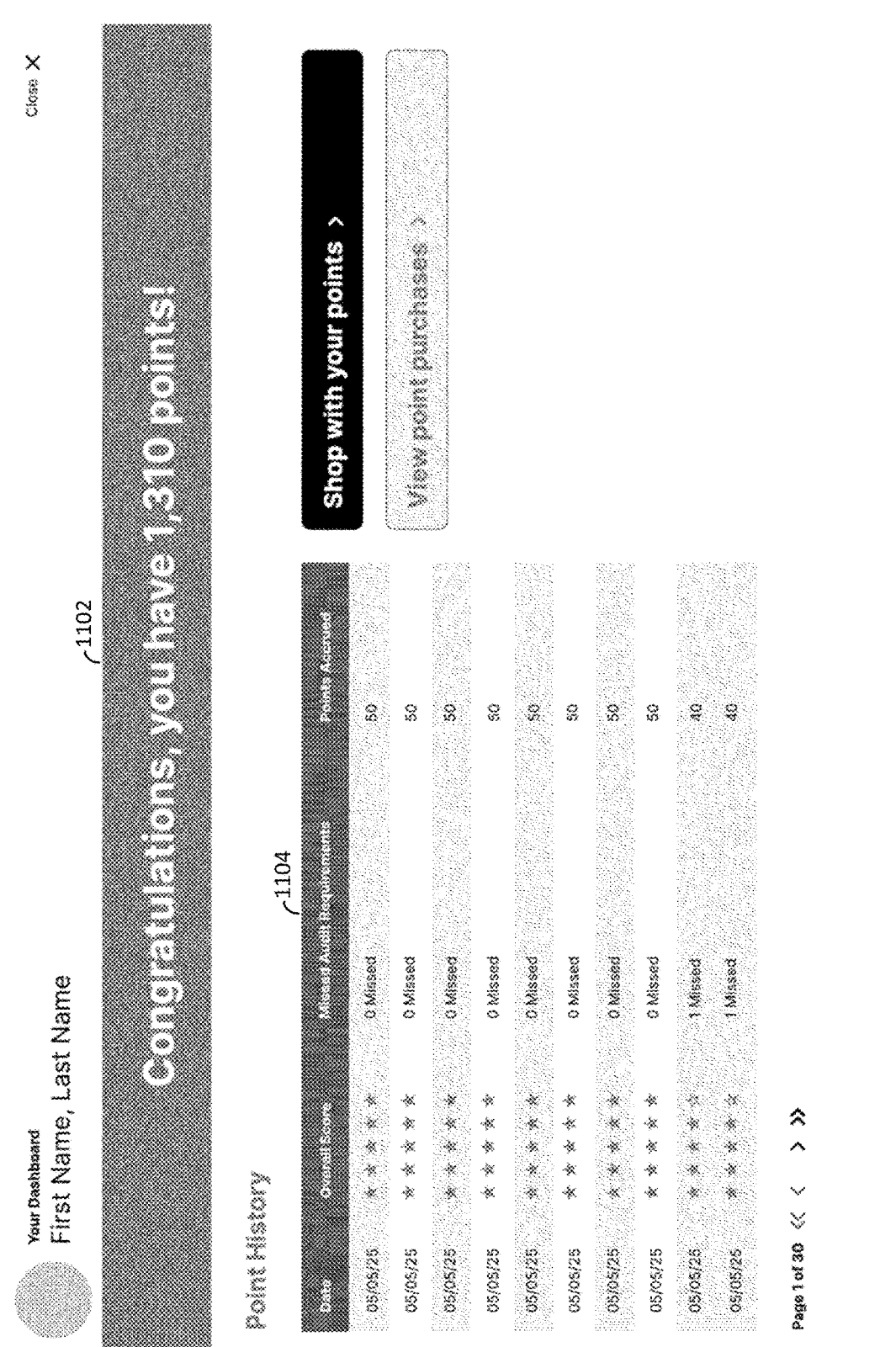
FIG. 11 is a screenshot view of a gamification dashboard displaying user point history and rewards, in accordance with one or more implementations.

Referring now to FIG. 11, illustrated is a screenshot view of a gamification dashboard interface 1100 for call agents, in accordance with one or more implementations. The dashboard interface 1100 can include at least one points summary banner 1102 and at least one point history table 1104. A data processing system (e.g., the data processing system 102, shown and described with reference to FIG. 1) can generate the gamification dashboard interface 1100.

The dashboard interface 1100 can include at least one points summary banner 1102. The points summary banner 1102 can generate a graphical user interface element that displays a total points value accumulated by a user, such as a call agent, as part of a gamification system for performance tracking and rewards. The points summary banner 1102 can display the current point total by aggregating performance metrics, processing results, and/or compliance adherence, and can update the interface in real time or after a call review or performance event. In some implementations, the points summary banner 1102 can present immediate feedback to the user regarding accumulated points, for example, by displaying a banner at the top of the dashboard stating "Congratulations, you have 1,310 points!" or similar messages. The points summary banner 1102 can incentivize engagement and performance improvement by providing real-time feedback, recommended questions, compliance reminders, and/or emotion-based coaching tips to the user. In some implementations, the points summary banner 1102 can generate and display coaching points or booster messages, such as "You're doing good so far," based on the call performance score or other performance criteria. The points summary banner 1102 can operate in conjunction with server-side logic that automatically streams a video stream to the computing device of the call agent based on the call performance score satisfying a criterion corresponding to the video stream, or generates a recommendation for the call agent to adjust a tone of speech for the inbound call responsive to the first one or more acoustic features satisfying a set of recommendation criteria, and transmits the recommendation to the computing device of the call agent.

The dashboard interface 1100 can include at least one point history table 1104. The point history table 1104 can generate a graphical user interface component that displays a detailed log of the user's point-earning activities, including dates, overall scores, missed processing requirements, and/or points accrued for each event or call. The point history table 1104 can present a tabular list showing each call's date, score, missed requirements, and/or points earned, among others. The point history table 1104 can enable users to review historical performance, track progress, and/or identify trends or areas for improvement by aggregating structured processing results, compliance checks, and/or performance scores generated by the system. In some implementations, the point history table 1104 can present structured output that includes a call identifier, question, binary answer such as Yes or No, reasoning or provenance, and/or relevant transcript or audio references. The point history table 1104 can be populated after each call by logging the score, missed requirements, and points to the table, allowing the agent to review historical data in a user-friendly, filterable format. The point history table 1104 can operate in conjunction with server-side logic that, responsive to detecting the termination of the inbound call, generates a structured summary of the call using the records containing the intents and states of the speakers of the inbound call, executes a call performance score for the call agent of the call based on states of the caller and the call agent from the structured memory, and automatically streams a video stream to the computing device of the call agent based on the call performance score satisfying a criterion corresponding to the video stream.

Figure 12:
FIG. 12 is a diagram of a user interface displaying call analytics and team call history scores for a call center, in accordance with one or more implementations.

Referring now to FIG. 12, illustrated is a diagram of a customer care analytics dashboard 1200 for a call center, in accordance with one or more implementations. The customer care analytics dashboard 1200 can include a call sessions bar chart 1202, a top performers list 1204, a low performers list 1206, and a team call history scores table 1208. A data processing system (e.g., the data processing system 102, shown and described with reference to FIG. 1) can generate the customer care analytics dashboard 1200.

The customer care analytics dashboard 1200 can include a call sessions bar chart 1202. The call sessions bar chart 1202 can generate a graphical representation of the number of call sessions handled by the call center over specified time intervals. The call sessions bar chart 1202 can display the volume of calls per hour throughout the day, for example, by aggregating call session data from the underlying analytics system and rendering the results in a visual format within the dashboard interface. The dashboard can query the call session database for call counts by hour and may update the chart in real time or on demand. The call sessions bar chart 1202 can provide a visual summary of call activity patterns, which may enable supervisors and managers to monitor call volumes and identify peak times.

The customer care analytics dashboard 1200 can include a top performers list 1204. The top performers list 1204 can generate a user interface element that displays the names of call agents with the highest performance metrics, such as processing scores or customer satisfaction ratings, among others. The top performers list 1204 can highlight agents who consistently meet or exceed performance standards, which may support recognition and incentivization programs. The top performers list 1204 can be populated by sorting agents based on aggregated performance data, such as processing scores, and displaying the highest-ranking agents in the dashboard. The dashboard can retrieve processing scores from the analytics backend and may dynamically update the list of top performers.

The customer care analytics dashboard 1200 can include a low performers list 1206. The low performers list 1206 can generate a user interface element that displays the names of call agents with the lowest performance metrics, such as processing scores or missed processing requirements, among others. The low performers list 1206 can identify agents who may require additional training, coaching, or intervention to improve their performance. The low performers list 1206 can be generated by sorting agents based on performance metrics and displaying those with the lowest scores, which may enable targeted coaching and compliance interventions. The dashboard can query the processing database for agents with the highest number of missed processing requirements and may update the list accordingly.

The customer care analytics dashboard 1200 can include a team call history scores table 1208. The team call history scores table 1208 can generate a tabular user interface component that displays detailed information about recent calls handled by the team, including date, time, agent name, overall score, missed processing requirements, quality of agent tone, length of call, and processing flag status, among others. The team call history scores table 1208 can provide granular visibility into individual and team performance, which may support processing traceability, compliance monitoring, and performance management. The team call history scores table 1208 can be populated by retrieving call processing data from the analytics system, processing the data to extract relevant metrics, and displaying the results in a structured, filterable table within the dashboard. The dashboard backend can aggregate call data, calculate scores and compliance metrics, and may update the table view for supervisor review.

Figure 13:
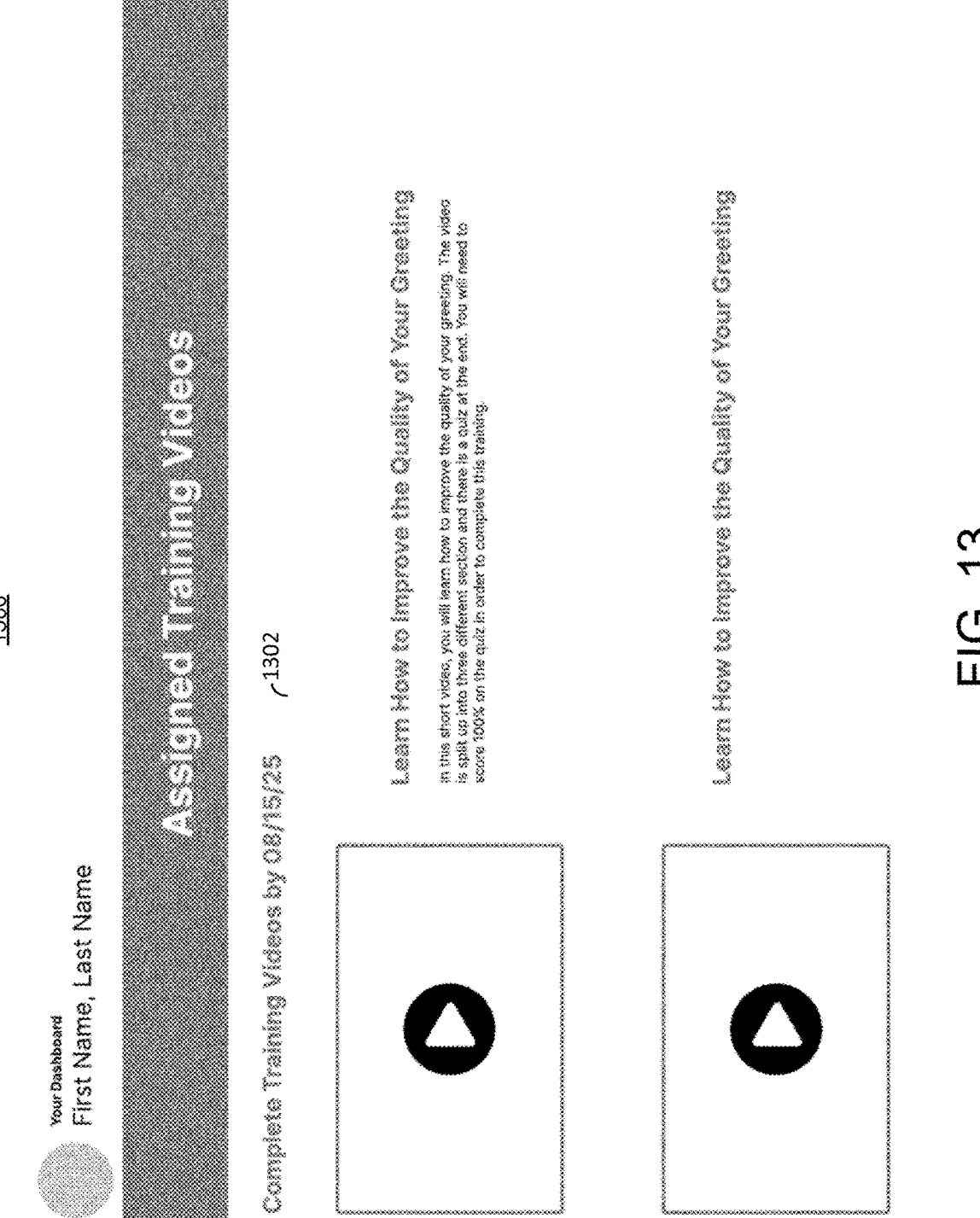
FIG. 13 is a diagram of a user interface for assigned training videos related to call agent performance improvement, in accordance with one or more implementations.

Referring now to FIG. 13, illustrated is a diagram of an assigned training videos user interface 1300 for call agent performance improvement, in accordance with one or more implementations. The assigned training videos user interface 1300 can include at least one training completion deadline 1302. A data processing system (e.g., the data processing system 102, shown and described with reference to FIG. 1) can generate the assigned training videos user interface 1300.

The assigned training videos user interface 1300 can be a graphical user interface that may display assigned training content to a call agent based on performance analytics. The assigned training videos user interface 1300 can be a component of an agent-facing dashboard that may present targeted training resources to the call agent. In some implementations, the assigned training videos user interface 1300 can be a web-based dashboard accessible by a call agent after login. The assigned training videos user interface 1300 can display a list of training videos, where each training video may be associated with a specific area of improvement identified by an analytics system, and may provide access to such resources for the call agent. The assigned training videos user interface 1300 can receive input from an analytics engine, which may determine areas of improvement from post-call or real-time analytics, and can dynamically populate the assigned training videos user interface 1300 with relevant training assignments. For example, the analytics engine can determine a deficiency in call performance metrics, such as greeting quality, and may assign a corresponding training video to the assigned training videos user interface 1300 for the call agent. The assigned training videos user interface 1300 can present actionable coaching points to reinforce strengths and suggest areas for improvement, supporting continuous agent development and alignment with organizational quality and compliance standards. In some implementations, the assigned training videos user interface 1300 can receive a video stream automatically streamed by a server to a computing device of the call agent based on a call performance score satisfying a criterion corresponding to the video stream.

The training completion deadline 1302 can be a user interface element that may specify a date by which assigned training videos must be completed by the call agent. The training completion deadline 1302 can be a displayed deadline or due date for completion of assigned training modules. For example, the training completion deadline 1302 can display a message such as "Complete Training Videos by Aug. 15, 2025" in the assigned training videos user interface 1300. The training completion deadline 1302 can provide a clear, actionable timeframe for the call agent to complete required training, supporting compliance and performance management. The training completion deadline 1302 can be generated by an analytics engine or a training assignment engine, which may calculate or retrieve the appropriate deadline based on organizational policy or a performance review cycle, and may render the deadline in the assigned training videos user interface 1300. For example, when a training video is assigned, the analytics engine can set a completion deadline, such as within seven days of assignment, and can display the deadline prominently in the assigned training videos user interface 1300. In some implementations, the training completion deadline 1302 can be associated with the automatic streaming of a video stream by a server to a computing device of the call agent based on a call performance score satisfying a criterion corresponding to the video stream.

At least one aspect relates to a method. The method can be performed, for example, by one or more processors coupled to non-transitory memory. The method can include receiving audio data of an inbound call from a caller. The method can include executing an acoustic feature extraction model using the audio data to generate one or more acoustic features selected from pitch, intensity, speech rate, spectral flux, energy, pause duration, jitter, shimmer, and/or prosodic contours for each of a plurality of frames of the audio data of the inbound call. The method can include executing an audio transcription model using the audio data to generate a transcript of utterances of the audio data of the inbound call segmented based on whether the caller is speaking. The method can include identifying a plurality of predetermined question strings from a data repository, each of the plurality of question strings corresponding to a question identifier and having been created prior to receiving the audio data of the inbound call. The method can include querying a mapping data structure comprising mappings of question identifiers to one or more machine learning classification models and one or more large language models using the question identifiers of each of the plurality of question strings to identify a particular machine learning classification model or a particular large language model for each of the plurality of question strings. The method can include segmenting a set of the one or more acoustic features for one or more of the plurality of frames generated from the audio data of the inbound call and a set of text from the transcript for the one or more of the plurality of frames of the audio data of the inbound call for each of the plurality of question strings. The method can include executing the identified particular machine learning classification model or the particular large language model for each of the plurality of question strings using the segmented set of acoustic features and set of text for the question string generated from the inbound call as input to generate a response to the question string. The method can include generating, in memory, a structured response object comprising the generated responses to the question strings.

In some implementations, querying the mapping data structure can include querying the mapping data structure to identify a plurality of machine learning classification models, each of the plurality of machine learning classification models trained to generate responses for a different question string. In some implementations, executing the particular machine learning model or the particular large language model for each of the plurality of question strings can include executing each of the plurality of machine learning classification models using a segmented set of acoustic features and a segmented set of text for the question string for which the machine learning model classification is trained to generate responses.

In some implementations, segmenting the set of the one or more acoustic features and the set of text from the transcript for a question string of the plurality of question strings can include determining a context of each of the one or more frames for the question string. In some implementations, segmenting can include identifying the one or more frames for the question string based on the context of the one or more frames matching a context of the question string.

In some implementations, determining the context of each of the one or more frames for the question string can include providing audio data of each of the one or more frames into a large language model in a first prompt formatted to cause the large language model to generate the context for the frame. In some implementations, determining the context for the question string can include providing the question string into the large language model in a second prompt formatted to cause the large language model to generate the context for the question string.

In some implementations, generating the context for each of the one or more frames can include executing the large language model using the input audio data of the frame to generate a frame embedding. In some implementations, determining the context for the question string can include executing the large language model using the input question string of the frame to generate a question string embedding.

In some implementations, the method can include receiving a revision to a criterion corresponding to one or more questions represented by question strings in the mapping data structure. In some implementations, the method can include determining the question strings representing the one or more questions corresponding to the criterion based on a context of each of the question strings matching a context of the criterion. In some implementations, the method can include revising the question strings based on the revision to the criterion.

In some implementations, the method can include determining the context of each of the question strings and the context of the criterion using a large language model. In some implementations, the method can include determining the question strings representing the one or more questions corresponding to the criterion based on a similarity of the context of each of the question strings with the context of the criterion.

In some implementations, the method can include identifying a second plurality of question strings from the data repository, each of the second plurality of question strings corresponding to a second question identifier. In some implementations, querying the mapping data structure can include querying the mapping data structure further comprising mappings of question identifiers to one or more criteria-based models using the second question identifiers of each of the second plurality of question strings to identify a criteria-based model for each of the second plurality of question strings. In some implementations, the method can include executing the criteria-based models to apply Boolean logic or pattern match to search for one or more keywords, phrase structures, or contextual windows from the audio data for the inbound call.

In some implementations, executing a particular machine learning classification model or a particular large language model for a plurality of question strings can include concatenating a segmented set of acoustic features and set of text for the question string generated from the inbound call into a feature vector or prompt. In some implementations, the method can include providing the feature vector or prompt into the particular machine learning classification model or the particular large language model.

In some implementations, the method can include generating an embedding from the set of text. In some implementations, the method can include concatenating the embedding with the set of acoustic features for the question string for input into the particular machine learning classification model or the particular large language model.

In some implementations, the method can include training a machine learning classification model to generate responses for a question string by determining a time period of inbound calls that is relevant to answering the question string. In some implementations, the method can include identifying a plurality of training transcripts for a plurality of inbound calls. In some implementations, the method can include extracting a portion from each of the plurality of training transcripts that corresponds to the determined time period. In some implementations, the method can include generating an embedding for each extracted portion of the plurality of training transcripts. In some implementations, the method can include labeling each embedding with a binary value corresponding to an answer to the question string. In some implementations, the method can include training the machine learning classification model using the labeled embeddings.

In some implementations, determining the time period can include determining the time period as a predefined percentage of the beginning or end of inbound calls.

In some implementations, the method can include concatenating the embedding for each extracted portion of the plurality of training transcripts with acoustic features corresponding to the extracted portion. In some implementations, labeling each embedding can include labeling the concatenated embedding for each extracted portion of the plurality of training transcripts. In some implementations, training the machine learning classification model can include training the machine learning classification model using the labeled concatenated embeddings.

In some implementations, executing a large language model for a question string of the plurality of question strings can include retrieving one or more policy excerpts corresponding to the question string. In some implementations, the method can include constructing a prompt comprising the segmented set of acoustic features and set of text for the question string generated from the inbound call. In some implementations, the method can include instructing the large language model via the prompt to generate a binary or categorical response selected from Yes, No, No Data Found, or Not Applicable, based solely on the segmented set of acoustic features, the set of text, and policy excerpts. In some implementations, the method can include providing, via the large language model, a structured response to the question string according to the instructions.

In some implementations, the method can include identifying a third question string from the data repository, the third question string corresponding to a third question identifier. In some implementations, querying the mapping data structure can include querying the mapping data structure further comprising mappings of question identifiers to an agentic pipeline using the third question identifier of the third question string to identify the agentic pipeline for use to generate a response to the third question string. In some implementations, the method can include executing the agentic pipeline using the audio data of the inbound call to generate a response to the third question string.

At least one aspect relates to a system. The system can include one or more processors. The system can receive audio data of an inbound call from a caller. The system can execute, using a task agent, an acoustic feature extraction model using the audio data to generate one or more acoustic features selected from pitch, intensity, speech rate, spectral flux, energy, pause duration, jitter, shimmer, and/or prosodic contours for each of a plurality of frames of the audio data of the inbound call. The system can execute, using the task agent, an audio transcription model using the audio data to generate a transcript of utterances of the audio data of the inbound call segmented based on whether the caller is speaking. The system can identify, using the task agent, a plurality of question strings from a data repository, each of the plurality of question strings corresponding to a question identifier. The system can query, using the task agent, a mapping data structure comprising mappings of question identifiers to one or more machine learning classification models and one or more large language models using the question identifiers of each of the plurality of question strings to identify a particular machine learning classification model or a particular large language model for each of the plurality of question strings. The system can segment, using the task agent, a set of the one or more acoustic features for one or more of the plurality of frames generated from the audio data of the inbound call and a set of text from the transcript for the one or more of the plurality of frames of the audio data of the inbound call for each of the plurality of question strings. The system can execute, using the task agent, the identified particular machine learning classification model or the particular large language model for each of the plurality of question strings using the segmented set of acoustic features and set of text for the question string generated from the inbound call as input to generate a response to the question string. The system can generate, using the task agent and in memory, a structured response object comprising the generated responses to the question strings.

In some implementations, the system can query the mapping data structure by querying the mapping data structure to identify a plurality of machine learning classification models, each of the plurality of machine learning classification models trained to generate responses for a different question string. In some implementations, the system can execute the particular machine learning model or the particular large language model for each of the plurality of question strings by executing each of the plurality of machine learning classification models using a segmented set of acoustic features and a segmented set of text for the question string for which the machine learning model classification is trained to generate responses.

In some implementations, the system can segment the set of the one or more acoustic features and the set of text from the transcript for a question string of the plurality of question strings by determining a context of each of the one or more frames for the question string. In some implementations, the system can identify the one or more frames for the question string based on the context of the one or more frames matching a context of the question string.

At least one other aspect relates to a non-transitory computer-readable medium. The non-transitory computer-readable medium can include instructions that, when executed by one or more processors, cause the one or more processors to receive audio data of an inbound call from a caller. The instructions can cause the one or more processors to execute, using a task agent, an acoustic feature extraction model using the audio data to generate one or more acoustic features selected from pitch, intensity, speech rate, spectral flux, energy, pause duration, jitter, shimmer, and/or prosodic contours for each of a plurality of frames of the audio data of the inbound call. The instructions can cause the one or more processors to execute, using the task agent, an audio transcription model using the audio data to generate a transcript of utterances of the audio data of the inbound call segmented based on whether the caller is speaking. The instructions can cause the one or more processors to identify, using the task agent, a plurality of question strings from a data repository, each of the plurality of question strings corresponding to a question identifier. The instructions can cause the one or more processors to query, using the task agent, a mapping data structure comprising mappings of question identifiers to one or more machine learning classification models and one or more large language models using the question identifiers of each of the plurality of question strings to identify a particular machine learning classification model or a particular large language model for each of the plurality of question strings. The instructions can cause the one or more processors to segment, using the task agent, a set of the one or more acoustic features for one or more of the plurality of frames generated from the audio data of the inbound call and a set of text from the transcript for the one or more of the plurality of frames of the audio data of the inbound call for each of the plurality of question strings. The instructions can cause the one or more processors to execute, using the task agent, the identified particular machine learning classification model or the particular large language model for each of the plurality of question strings using the segmented set of acoustic features and set of text for the question string generated from the inbound call as input to generate a response to the question string. The instructions can cause the one or more processors to generate, using the task agent and in memory, a structured response object comprising the generated responses to the question strings.

In some implementations, execution of the instructions can cause the one or more processors to query the mapping data structure by querying the mapping data structure to identify a plurality of machine learning classification models, each of the plurality of machine learning classification models trained to generate responses for a different question string. In some implementations, the one or more processors can execute the particular machine learning model or the particular large language model for each of the plurality of question strings by executing each of the plurality of machine learning classification models using a segmented set of acoustic features and a segmented set of text for the question string for which the machine learning model classification is trained to generate responses.

At least one other aspect relates to a method. The method can be performed, for example, by one or more processors coupled to non-transitory memory. The method can include receiving audio data of an inbound call from a caller with a call agent accessing a computing device during the inbound call. The method can include executing an acoustic feature extraction model using the audio data to generate, for a first time period of the inbound call, first one or more acoustic features selected from pitch, intensity, speech rate, spectral flux, energy, pause duration, jitter, shimmer, and/or prosodic contours from the audio data of the inbound call. The method can include executing an audio transcription model using the audio data to generate a first transcript of utterances from the first time period of the audio data of the inbound call. The method can include storing the first transcript of the audio data and the first one or more acoustic features from the first time period in a short-term memory cache. The method can include retrieving, using an identifier of the caller to query a long-term memory cache, historical call data generated from historical inbound calls by the caller. The method can include determining a first intent of the inbound call based on the first transcript generated from the inbound call. The method can include determining states of the caller and the call agent based on the first one or more acoustic features. The method can include generating a first question string for presentation at the computing device being accessed by the call agent based on the historical call data, the intent of the inbound call, and the states of the caller and the call agent. The method can include executing the acoustic feature extraction model using the audio data to generate, for a second time period of the inbound call subsequent to the first time period, second one or more acoustic features from the audio data of the inbound call. The method can include executing the audio transcription model using the audio data to generate a second transcript of utterances from the second time period of the audio data of the inbound call. The method can include identifying an answer to the first question string from the second time period. The method can include, responsive to determining the answer to the first question string does not satisfy a criterion, generating a second question string for presentation at the computing device in place of the first question string using the second transcript, the second one or more acoustic features, and the answer to the first question string.

In some implementations, the method can further include retrieving account data from a data structure associated with the caller from the long-term memory cache. In some implementations, the method can further include generating the first question string based further on the account data for presentation at the computing device accessed by the call agent.

In some implementations, the method can further include executing a large language model using the first transcript retrieved from the short-term memory cache as input to generate the first intent. In some implementations, the first intent can correspond to performing an action with an application hosted by the server.

In some implementations, determining the states of the call agent and the caller can include executing a computing model using the first one or more acoustic features to generate a first set of states of the call agent and caller. In some implementations, determining the states can further include concurrently executing a large language model using the first transcript as input to generate a second set of states of the call agent and the caller.

In some implementations, the method can include determining a first set of intents for the caller and a second set of intents for the call agent, each intent of the first set of intents and the second set of intents corresponding to a different timestamp of the first transcript. In some implementations, the method can include determining a first set of states for the caller and a second set of states for the call agent, the states of the first set of states and the second set of states corresponding to matching timestamps of the first transcript. In some implementations, the method can include generating a record for each timestamp of the different timestamps in structured memory, each record containing an intent and a state of a speaker at a time of the timestamp of the record.

In some implementations, the method can further include detecting termination of the inbound call. In some implementations, responsive to detecting the termination of the inbound call, the method can include generating a structured summary of the call using the records containing the intents and states of the speakers of the inbound call.

In some implementations, the method can further include executing a call performance score for the call agent of the call based on states of the caller and the call agent from the structured memory. In some implementations, the method can further include automatically streaming a video stream to the computing device of the call agent based on the call performance score satisfying a criterion corresponding to the video stream.

In some implementations, the method can further include detecting the identifier of the caller using a personal information extraction agent stored on the first transcript.

In some implementations, the method can further include querying a vector database using an embedding generated from the first intent and the first one or more acoustic features to identify a set of guidelines relevant to the first transcript. In some implementations, the method can further include determining a deficiency in the first transcript in satisfying the set of guidelines. In some implementations, the method can further include generating the first question to correspond to satisfy the set of guidelines using a large language model.

In some implementations, querying the vector database can include generating the embedding by inputting the first intent and first one or more acoustic features into an embedding generation neural network. In some implementations, querying can include identifying the set of guidelines based on an embedding generated from the set of guidelines satisfying a similarity threshold with the embedding generated from the first intent and the first one or more acoustic features.

In some implementations, the method can further include determining the first one or more acoustic features satisfy a set of recommendation criteria. In some implementations, the method can further include generating a recommendation for the call agent to adjust a tone of speech for the inbound call responsive to the first one or more acoustic features satisfying the set of recommendation criteria. In some implementations, the method can further include transmitting the recommendation to the computing device of the call agent.

In some implementations, the method can further include detecting a compliance risk based at least on the answer to the first question. In some implementations, the method can further include generating the second question based on the detection of the compliance risk.

At least one other aspect relates to a system. The system can include one or more processors configured by machine-readable media to receive audio data of an inbound call between a caller and a call agent, wherein the call agent accesses a computing device during the inbound call. The system can execute a task agent configured to apply an acoustic feature extraction model to the audio data to generate, for a first time period of the inbound call, first one or more acoustic features selected from pitch, intensity, speech rate, spectral flux, energy, pause duration, jitter, shimmer, and/or prosodic contours. The system can execute an audio transcription model using the audio data to generate a first transcript of utterances corresponding to the first time period. The system can store the first transcript and the first one or more acoustic features from the first time period in a short-term memory cache. The system can retrieve, using the task agent and an identifier of the caller, historical call data from a long-term memory cache, the historical call data comprising data generated from historical inbound calls by the caller. The system can determine, using the task agent, a first intent of the inbound call based on the first transcript. The system can determine, using the task agent, states of the caller and the call agent based on the first one or more acoustic features. The system can generate a first question string for presentation at the computing device accessed by the call agent, wherein the first question string is generated based on the historical call data, the intent of the inbound call, and the states of the caller and the call agent. The system can execute the acoustic feature extraction model using the audio data to generate, for a second time period of the inbound call subsequent to the first time period, second one or more acoustic features from the audio data. The system can execute the audio transcription model using the audio data to generate a second transcript of utterances corresponding to the second time period. The system can identify an answer to the first question string from the second time period. The system can, responsive to determining that the answer to the first question string does not satisfy a criterion, generate a second question string for presentation at the computing device in place of the first question string, using the second transcript, the second one or more acoustic features, and the answer to the first question string.

In some implementations, the system can retrieve account data associated with the caller from a data structure in the long-term memory cache. In some implementations, the system can generate the first question string for presentation at the computing device accessed by the call agent based further on the account data.

In some implementations, the system can execute a large language model using the first transcript retrieved from the short-term memory cache as input to generate the first intent. In some implementations, the first intent can correspond to performing an action with an application hosted by the one or more processors.

In some implementations, in determining the states of the call agent and caller, the system can execute a computing model using the first one or more acoustic features to generate a first set of states for the call agent and the caller. In some implementations, the system can concurrently execute a large language model using the first transcript as input to generate a second set of states for the call agent and the caller.

In some implementations, the system can determine a first set of intents for the caller and a second set of intents for the call agent, each intent of the first and second sets corresponding to distinct timestamps of the first transcript. In some implementations, the system can determine a first set of states for the caller and a second set of states for the call agent, the states of the first and second sets corresponding to matching timestamps of the first transcript. In some implementations, the system can generate, for each timestamp, a record in structured memory, each record containing an intent and a state of a speaker at the time of the timestamp of the record.

At least one other aspect relates to a non-transitory computer-readable medium. The non-transitory computer-readable medium can include instructions that, when executed by one or more processors, cause the one or more processors to receive audio data of an inbound call between a caller and a call agent, wherein the call agent accesses a computing device during the inbound call. The instructions can cause the one or more processors to execute a task agent configured to apply an acoustic feature extraction model to the audio data to generate, for a first time period of the inbound call, first one or more acoustic features selected from pitch, intensity, speech rate, spectral flux, energy, pause duration, jitter, shimmer, and/or prosodic contours. The instructions can cause the one or more processors to execute an audio transcription model using the audio data to generate a first transcript of utterances corresponding to the first time period. The instructions can cause the one or more processors to store the first transcript and the first one or more acoustic features from the first time period in a short-term memory cache. The instructions can cause the one or more processors to retrieve, using the task agent and an identifier of the caller, historical call data from a long-term memory cache, the historical call data comprising data generated from historical inbound calls by the caller. The instructions can cause the one or more processors to determine, using the task agent, a first intent of the inbound call based on the first transcript. The instructions can cause the one or more processors to determine, using the task agent, states of the caller and the call agent based on the first one or more acoustic features. The instructions can cause the one or more processors to generate a first question string for presentation at the computing device accessed by the call agent, wherein the first question string is generated based on the historical call data, the intent of the inbound call, and the states of the caller and the call agent. The instructions can cause the one or more processors to execute the acoustic feature extraction model using the audio data to generate, for a second time period of the inbound call subsequent to the first time period, second one or more acoustic features from the audio data. The instructions can cause the one or more processors to execute the audio transcription model using the audio data to generate a second transcript of utterances corresponding to the second time period. The instructions can cause the one or more processors to identify an answer to the first question string from the second time period. The instructions can cause the one or more processors, responsive to determining that the answer to the first question string does not satisfy a criterion, to generate a second question string for presentation at the computing device in place of the first question string, using the second transcript, the second one or more acoustic features, and the answer to the first question string.

In some implementations, execution of the instructions can further cause the one or more processors to retrieve account data associated with the caller from a data structure in the long-term memory cache. In some implementations, execution of the instructions can further cause the one or more processors to generate the first question string for presentation at the computing device accessed by the call agent based further on the account data.

In some implementations, execution of the instructions can further cause the one or more processors to execute a large language model using the first transcript retrieved from the short-term memory cache as input to generate the first intent. In some implementations, the first intent can correspond to performing an action with an application hosted by the one or more processors.

Computing Environment

Figure 14:
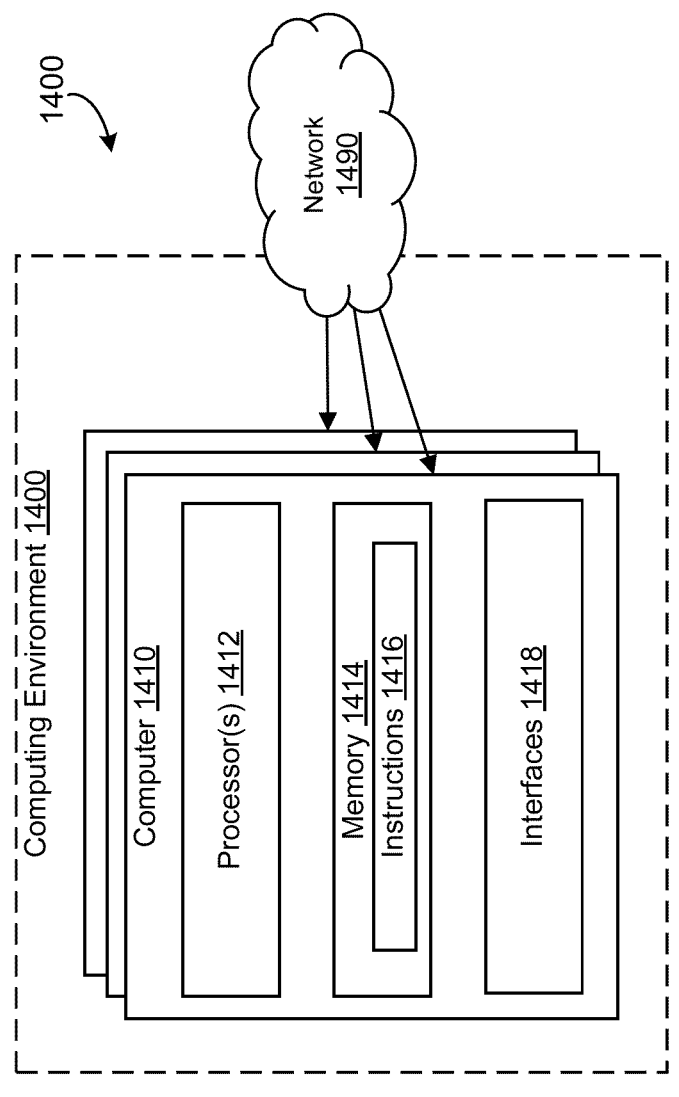
FIG. 14 discloses a computing environment in which aspects of the present disclosure may be implemented, in accordance with an implementation.

FIG. 14 discloses a computing environment 1400 in which aspects of the present disclosure may be implemented. A computing environment 1400 is a set of one or more virtual or physical computers 1410 that individually or in cooperation achieve tasks, such as implementing one or more aspects described herein. The computers 1410 have components that cooperate to cause output based on input. Example computers 1410 include desktops, servers, mobile devices (e.g., smart phones and laptops), payment terminals, wearables, virtual/augmented/expanded reality devices, spatial computing devices, virtualized devices, other computers, or combinations thereof. In particular example implementations, the computing environment 1400 includes at least one physical computer.

The computing environment 1400 may specifically be used to implement one or more aspects described herein. In some examples, one or more of the computers 1410 may be implemented as a user device, such as a mobile device, and others of the computers 1410 may be used to implement aspects of a machine learning framework useable to train and deploy models exposed to the mobile device or provide other functionality, such as through exposed application programming interfaces.

The computing environment 1400 can be arranged in any of a variety of ways. The computers 1410 can be local to or remote from other computers 1410 of the environment 1400. The computing environment 1400 can include computers 1410 arranged according to client-server models, peer-to-peer models, edge computing models, other models, or combinations thereof.

In many examples, the computers 1410 are communicatively coupled with devices internal or external to the computing environment 1400 via a network 1490. The network 1490 is a set of devices that facilitate communication from a sender to a destination, such as by implementing communication protocols. Example networks 1490 include local area networks, wide area networks, intranets, or the Internet.

In some implementations, computers 1410 can be general-purpose computing devices (e.g., consumer computing devices). In some instances, via hardware or software configuration, computers 1410 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1410 include one or more processors 1412, memory 1414, and one or more interfaces 1418. Such components can be virtual, physical, or combinations thereof.

The one or more processors 1412 are components that execute instructions, such as instructions that obtain data, process the data, and provide output based on the processing. The one or more processors 1412 often obtain instructions and data stored in the memory 1414. The one or more processors 1412 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1412 include at least one physical processor implemented as an electrical circuit. Example providers processors 1412 include INTEL, AMD, QUALCOMM, TEXAS INSTRUMENTS, and APPLE.

The memory 1414 is a collection of components configured to store instructions 1416 and data for later retrieval and use. The instructions 1416 can, when executed by the one or more processors 1412, cause execution of one or more operations that implement aspects described herein. In many examples, the memory 1414 is a non-transitory computer-readable medium, such as random access memory, read only memory, cache memory, registers, portable memory (e.g., enclosed drives or optical disks), mass storage devices, hard drives, solid state drives, other kinds of memory, or combinations thereof. In certain circumstances, transitory memory 1414 can store information encoded in transient signals.

The one or more interfaces 1418 are components that facilitate receiving input from and providing output to something external to the computer 1410, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors, such as those using the Global Positioning System), other input components, or combinations thereof (e.g., a touch sensitive display). The one or more interfaces 1418 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as WI-FI, cellular, BLUETOOTH, ZIGBEE, or other protocols). One or more of the one or more interfaces 1418 can facilitate connection of the computing environment 1400 to a network 1490.

The computers 1410 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 15:
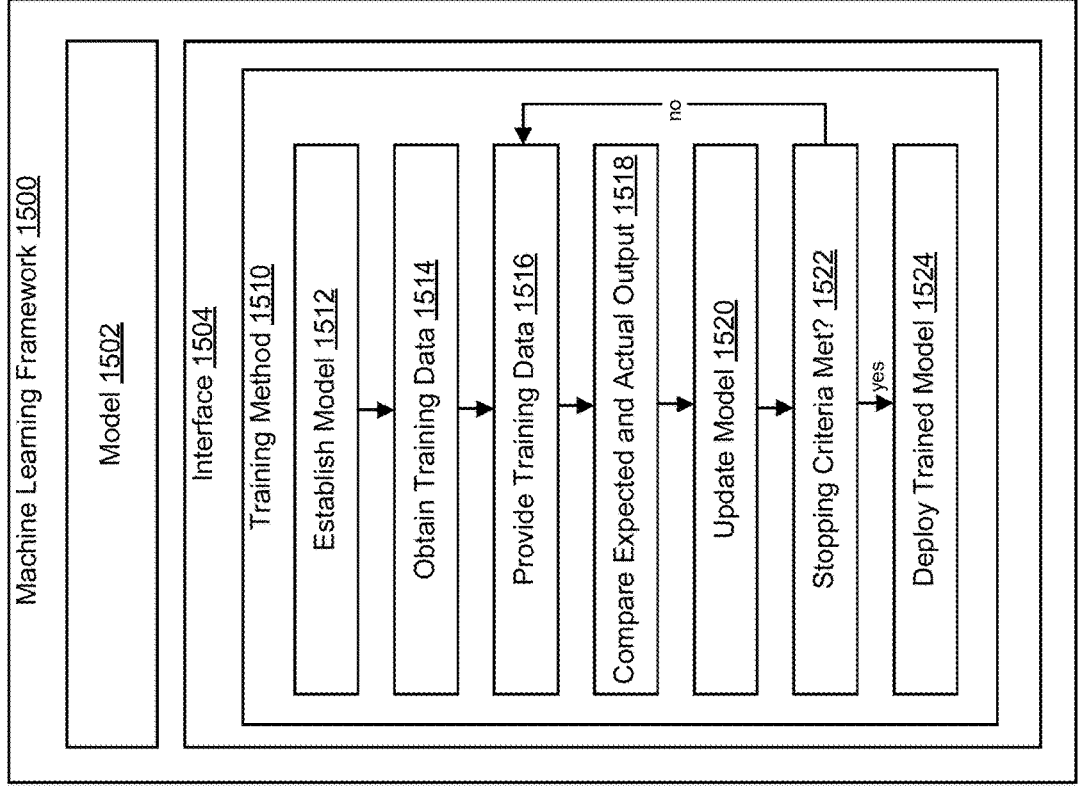

FIG. 15 illustrates an example machine learning framework 1500 that techniques described herein may benefit from. A machine learning framework 1500 is a collection of software and data that implements artificial intelligence trained to provide output, such as predictive data, based on input. Examples of artificial intelligence that can be implemented with machine learning ways include neural networks (including recurrent neural networks), language models (including so-called "large language models"), generative models, natural language processing models, adversarial networks, decision trees, Markov models, support vector machines, genetic algorithms, others, or combinations thereof. A person of skill in the art, having the benefit of this disclosure, will understand that these artificial intelligence implementations need not be equivalent to each other and may instead select from among them based on the context in which they will be used. Machine learning frameworks 1500 or components thereof are often built or refined from existing frameworks, such as TENSORFLOW by GOOGLE, INC. or PYTORCH by the PYTORCH community.

The machine learning framework 1500 can include one or more models 1502 that are the structured representation of learning and an interface 1504 that supports use of the model 1502.

The model 1502 can take any of a variety of forms. In many examples, the model 1502 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1502 can include a representation of memory (e.g., providing long short-term memory functionality). Where the set includes more than one model 1502, the models 1502 can be linked, cooperate, or compete to provide output.

The interface 1504 can include software procedures (e.g., defined in a library) that facilitate the use of the model 1502, such as by providing a way to establish and interact with the model 1502. For instance, the software procedures can include software for receiving input, preparing input for use (e.g., by performing vector embedding, such as using Word2Vec, BERT, or another technique), processing the input with the model 1502, providing output, training the model 1502, performing inference with the model 1502, fine tuning the model 1502, other procedures, or combinations thereof.

In an example implementation, interface 1504 can be used to facilitate a training method 1510 that can include operation 1512. Operation 1512 includes establishing a model 1502, such as initializing a model 1502. The establishing can include setting up the model 1502 for further use (e.g., by training or fine tuning). The model 1502 can be initialized with values. In examples, the model 1502 can be pre-trained. Operation 1514 can follow operation 1512. Operation 1514 includes obtaining training data. In many examples, the training data includes pairs of input and desired output given the input. In supervised or semi-supervised training, the data can be prelabeled, such as by human or automated labelers. In unsupervised learning the training data can be unlabeled.

The training data can include validation data used to validate the trained model 1502. Operation 1516 can follow operation 1514. Operation 1516 includes providing a portion of the training data to the model 1502. This can include providing the training data in a format usable by the model 1502. The framework 1500 (e.g., via the interface 1504) can cause the model 1502 to produce an output based on the input. Operation 1518 can follow operation 1516. Operation 1518 includes comparing the expected output with the actual output. In an example, this can include applying a loss function to determine the difference between expected and actual. This value can be used to determine how training is progressing. Operation 1520 can follow operation 1518. Operation 1520 includes updating the model 1502 based on the result of the comparison. This can take any of a variety of forms depending on the nature of the model 1502. Where the model 1502 includes weights, the weights can be modified to increase the likelihood that the model 1502 will produce correct output given an input. Depending on the model 1502, backpropagation or other techniques can be used to update the model 1502. Operation 1522 can follow operation 1520. Operation 1522 includes determining whether a stopping criterion has been reached, such as based on the output of the loss function (e.g., actual value or change in value over time). In addition to, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1514. If the stopping criterion has been satisfied, the flow can move to operation 1522. Operation 1522 includes deploying the trained model 1502 for use in production, such as providing the trained model 1502 with real-world input data and produce output data used in a real-world process. The model 1502 can be stored in memory 1414 of at least one computer 1410, or distributed across memories of two or more such computers 1410 for production of output data (e.g., predictive data).

Application of Techniques

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for, and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims

What is claimed is:

1. A method for improved machine learning-based inbound call monitoring and structured response generation, comprising:

receiving, by a server, audio data of an inbound call from a caller;

executing, by the server executing a task agent, an acoustic feature extraction model using the audio data to generate one or more acoustic features selected from pitch, intensity, speech rate, energy, spectral flux, pause duration, jitter, shimmer, or prosodic contours for each of a plurality of frames of the audio data of the inbound call;

executing, by the server executing the task agent, an audio transcription model using the audio data to generate a transcript of utterances of the audio data of the inbound call segmented based on whether the caller is speaking;

identifying, by the server executing the task agent, a plurality of predetermined question strings from a predetermined repository of call quality or compliance audit question strings, wherein the predetermined repository was created prior to receiving the audio data of the inbound call, and wherein each of the plurality of predetermined question strings corresponds to a question identifier;

querying, by the server executing the task agent, a versioned mapping registry comprising mappings of question identifiers to one or more processing engine types, wherein the processing engine types include machine learning classification models and large language models, using the question identifiers of each of the plurality of predetermined question strings to identify a particular processing engine type comprising a particular machine learning classification model or a particular large language model for each of the plurality of predetermined question strings;

segmenting, by the server executing the task agent, for each of the plurality of predetermined question strings based on a contextual time window relevant to the predetermined question string, a set of the one or more acoustic features for one or more of the plurality of frames generated from the audio data of the inbound call and a set of text from the transcript for the one or more of the plurality of frames of the audio data of the inbound call;

executing, by the server executing the task agent, the identified particular machine learning classification model or the particular large language model for each of the plurality of predetermined question strings using the segmented set of acoustic features and set of text for the predetermined question string generated from the inbound call as input to generate a response to the predetermined question string; and generating, by the server executing the task agent in memory, a structured response object comprising the generated responses to the predetermined question strings.

2. The method of claim 1, wherein querying the versioned mapping registry comprises:

querying, by the server, the versioned mapping registry to identify a plurality of machine learning classification models, each of the plurality of machine learning classification models trained to generate responses for a different predetermined question string, and wherein executing the particular machine learning model or the particular large language model for each of the plurality of predetermined question strings comprises:

executing, by the server, each of the plurality of machine learning classification models using a segment set of acoustic features and a segmented set of text for the predetermined question string for which the machine learning model classification is trained to generate responses.

3. The method of claim 1, further comprising:

identifying, by the server executing the task agent, a second plurality of predetermined question strings from the predetermined repository of call quality or compliance audit question strings, each of the second plurality of predetermined question strings corresponding to a second question identifier, wherein querying the versioned mapping registry comprises:

querying, by the server executing the task agent, the versioned mapping registry further comprising mappings of question identifiers to one or more criteria-based models using the second question identifiers of each of the second plurality of predetermined question strings to identify a criteria-based model for each of the second plurality of predetermined question strings; and executing, by the server executing the task agent, the criteria-based models to apply Boolean logic or pattern match to search for one or more keywords, phrase structures, or contextual windows from the audio data for the inbound call.

4. The method of claim 1, wherein executing a large language model for a predetermined question string of the plurality of predetermined question strings comprises:

retrieving, by the server, one or more policy excerpts corresponding to the predetermined question string;

constructing, by the server, a prompt comprising the segmented set of acoustic features and set of text for the predetermined question string generated from the inbound call;

instructing, by the server, the large language model via the prompt to generate a binary or categorical response selected from Yes, No, No Data Found, or Not Applicable, based solely on the segmented set of acoustic features, the set of text, and policy excerpts; and providing, by the server via the large language model, a structured response to the predetermined question string according to the instructions.

5. The method of claim 1, further comprising:

identifying, by the server executing the task agent, a third predetermined question string from the predetermined repository of call quality or compliance audit question strings, the third predetermined question string corresponding to a third question identifier, wherein querying the versioned mapping registry comprises:

querying, by the server executing the task agent, the versioned mapping registry further comprising mappings of question identifiers to an agentic pipeline using the third question identifier of the third predetermined question string to identify the agentic pipeline for use to generate a response to the third predetermined question string; and executing, by the server executing the task agent, the agentic pipeline using the audio data of the inbound call to generate a response to the third predetermined question string.

6. The method of claim 1, wherein the plurality of predetermined question strings relate to call quality or compliance evaluation and were created prior to receiving the audio data of the inbound call, and wherein the predetermined repository of call quality or compliance audit question strings comprises the plurality of predetermined question strings.

7. The method of claim 1, wherein the versioned mapping registry comprises a versioned registry that associates each question identifier with a specific processing engine type selected from a rule-based engine, a machine learning classification model, a large language model, or an agentic pipeline.

8. The method of claim 1, wherein segmenting comprises determining, for each predetermined question string, a relevant time window of the inbound call based on a contextual time window relevant to the predetermined question string.

9. The method of claim 1, further comprising:

receiving, by the server, a revision to a criterion corresponding to one or more questions represented by predetermined question strings in the versioned mapping registry;

determining, by the server, the predetermined question strings representing the one or more questions corresponding to the criterion based on a context of each of the predetermined question strings matching a context of the criterion; and revising, by the server, the predetermined question strings based on the revision to the criterion.

10. The method of claim 9, further comprising:

determining, by the server, the context of each of the predetermined question strings and the context of the criterion using a large language model; and determining, by the server, the predetermined question strings representing the one or more questions corresponding to the criterion based on a similarity of the context of each of the predetermined question strings with the context of the criterion.

11. The method of claim 1, wherein executing a particular machine learning classification model or a particular large language model for a each of the plurality of predetermined question strings comprises:

concatenating, a segmented set of acoustic features and set of text for the predetermined question string generated from the inbound call into a feature vector or prompt; and providing the feature vector or prompt into the particular machine learning classification or the particular large language model.

12. The method of claim 11, further comprising:

generating, by the server, an embedding from the set of text; and concatenating, by the server, the embedding with the set of acoustic features for the predetermined question string for input into the particular machine learning classification or the particular large language model.

13. The method of claim 1, wherein segmenting the set of the one or more acoustic features and the set of text from the transcript for a predetermined question string of the plurality of predetermined question strings comprises:

determining, by the server, a context of each of the one or more frames for the predetermined question string;

identifying, by the server, the one or more frames for the predetermined question string based on the context of the one or more frames matching a context of the predetermined question string.

14. The method of claim 13, wherein determining the context of each of the one or more frames for the predetermined question string comprises:

providing, by the server, audio data of each of the one or more frames into a large language model in a first prompt formatted to cause the large language model to generate the context for the frame, and further comprising:

determining, by the server, the context for the predetermined question string by providing the predetermined question string into the large language model in a second prompt formatted to cause the large language model to generate the context for the predetermined question string.

15. The method of claim 14, wherein generating the context for each of the one or more frames comprises:

executing, by the server, the large language model using the input audio data of the frame to generate a frame embedding; and wherein determining the context for the predetermined question string comprises:

executing, by the server, the large language model using the input predetermined question string of the frame to generate a question string embedding.

16. The method of claim 1, further comprising:

training, by the server, a machine learning classification model, to generate responses for a predetermined question string by:

determining, by the server, a time period of inbound calls that is relevant to answering the predetermined question string;

identifying, by the server, a plurality of training transcripts for a plurality of inbound calls;

extracting, by the server, a portion from each of the plurality of training transcripts that corresponds to the determined time period;

generating, by the server, an embedding for each extracted portion of the plurality of training transcripts;

labeling, by the server, each embedding with a binary value corresponding to an answer to the predetermined question string; and training, by the server, the machine learning classification model using the labeled embeddings.

17. The method of claim 16, wherein determining the time period comprises:

determining, by the server, the time period as a predefined percentage of the beginning or end of inbound calls.

18. The method of claim 16, further comprising:

concatenating, by the server, the embedding for each extracted portion of the plurality of training transcripts with acoustic features corresponding to the extracted portion, wherein labeling each embedding comprises labeling, by the server, the concatenated embedding for each extracted portion of the plurality of training transcripts; and wherein training the machine learning classification model comprises training, by the server, the machine learning classification model using the labeled concatenated embeddings.

19. A system for improved machine learning-based inbound call monitoring and structured response generation, comprising:

one or more processors configured by computer-readable media to:

receive audio data of an inbound call from a caller;

execute, using a task agent, an acoustic feature extraction model using the audio data to generate one or more acoustic features selected from pitch, intensity, speech rate, energy, spectral flux, pause duration, jitter, shimmer, or prosodic contours for each of a plurality of frames of the audio data of the inbound call;

execute, using the task agent, an audio transcription model using the audio data to generate a transcript of utterances of the audio data of the inbound call segmented based on whether the caller is speaking;

identify, using the task agent, a plurality of predetermined question strings from a predetermined repository of call quality or compliance audit question strings, wherein the predetermined repository was created prior to receiving the audio data of the inbound call, and wherein each of the plurality of predetermined question strings corresponds to a question identifier;

query, using the task agent, a versioned mapping registry comprising mappings of question identifiers to one or more processing engine types, wherein the processing engine types include machine learning classification models and large language models, using the question identifiers of each of the plurality of predetermined question strings to identify a particular processing engine type comprising a particular machine learning classification model or a particular large language model for each of the plurality of predetermined question strings;

segment, using the task agent, for each of the plurality of predetermined question strings based on a contextual time window relevant to the predetermined question string, a set of the one or more acoustic features for one or more of the plurality of frames generated from the audio data of the inbound call and a set of text from the transcript for the one or more of the plurality of frames of the audio data of the inbound call;

execute, using the task agent, the identified particular machine learning classification model or the particular large language model for each of the plurality of predetermined question strings using the segmented set of acoustic features and set of text for the predetermined question string generated from the inbound call as input to generate a response to the predetermined question string; and generate, using the task agent and in memory, a structured response object comprising the generated responses to the predetermined question strings.

20. The system of claim 19, wherein the one or more processors are configured to query the versioned mapping registry by:

querying the versioned mapping registry to identify a plurality of machine learning classification models, each of the plurality of machine learning classification models trained to generate responses for a different predetermined question string, and wherein the one or more processors are configured to execute the particular machine learning model or the particular large language model for each of the plurality of predetermined question strings by:

executing each of the plurality of machine learning classification models using a segment set of acoustic features and a segmented set of text for the predetermined question string for which the machine learning model classification is trained to generate responses.

21. The system of claim 19, wherein the one or more processors are configured to segment the set of the one or more acoustic features and the set of text from the transcript for a predetermined question string of the plurality of predetermined question strings by:

determining a context of each of the one or more frames for the predetermined question string;

identifying the one or more frames for the predetermined question string based on the context of the one or more frames matching a context of the predetermined question string.

22. Non-transitory computer-readable media comprising instructions that, when executed by one or more processors, cause the one or more processors to receive audio data of an inbound call from a caller;

execute, using a task agent, an acoustic feature extraction model using the audio data to generate one or more acoustic features selected from pitch, intensity, speech rate, energy, spectral flux, pause duration, jitter, shimmer, or prosodic contours for each of a plurality of frames of the audio data of the inbound call;

execute, using the task agent, an audio transcription model using the audio data to generate a transcript of utterances of the audio data of the inbound call segmented based on whether the caller is speaking;

identify, using the task agent, a plurality of predetermined question strings from a predetermined repository of call quality or compliance audit question strings, wherein the predetermined repository was created prior to receiving the audio data of the inbound call, and wherein each of the plurality of predetermined question strings corresponds to a question identifier;

query, using the task agent, a versioned mapping registry comprising mappings of question identifiers to one or more processing engine types, wherein the processing engine types include machine learning classification models and large language models, using the question identifiers of each of the plurality of predetermined question strings to identify a particular processing engine type comprising a particular machine learning classification model or a particular large language model for each of the plurality of predetermined question strings;

segment, using the task agent, for each of the plurality of predetermined question strings based on a contextual time window relevant to the predetermined question string, a set of the one or more acoustic features for one or more of the plurality of frames generated from the audio data of the inbound call and a set of text from the transcript for the one or more of the plurality of frames of the audio data of the inbound call;

execute, using the task agent, the identified particular machine learning classification model or the particular large language model for each of the plurality of predetermined question strings using the segmented set of acoustic features and set of text for the predetermined question string generated from the inbound call as input to generate a response to the predetermined question string; and generate, using the task agent and in memory, a structured response object comprising the generated responses to the predetermined question strings.

23. The non-transitory computer-readable media of claim 22, wherein execution of the instructions causes the one or more processors to query the versioned mapping registry by:

querying the versioned mapping registry to identify a plurality of machine learning classification models, each of the plurality of machine learning classification models trained to generate responses for a different predetermined question string, and wherein the one or more processors are configured to execute the particular machine learning model or the particular large language model for each of the plurality of predetermined question strings by:

executing each of the plurality of machine learning classification models using a segment set of acoustic features and a segmented set of text for the predetermined question string for which the machine learning model classification is trained to generate responses.

* * * * *